United States Patent [19]
Kozinski

[11] Patent Number: 5,901,750
[45] Date of Patent: May 11, 1999

[54] VARIABLE FLOW ORIFICE VALVE ASSEMBLY

[75] Inventor: Richard C. Kozinski, Warren, Mich.

[73] Assignee: Nartron Corporation, Reed City, Mich.

[21] Appl. No.: 08/598,646

[22] Filed: Feb. 6, 1996

[51] Int. Cl.[6] .................................................. F15D 55/00
[52] U.S. Cl. .............................. 138/45; 138/46; 137/504
[58] Field of Search ....................... 138/45, 46; 137/497, 137/504

[56] References Cited

U.S. PATENT DOCUMENTS

| | | | |
|---|---|---|---|
| 3,431,944 | 3/1969 | Sakuma | 138/45 |
| 3,805,824 | 4/1974 | Robbins, Jr. | 137/504 |
| 4,009,592 | 3/1977 | Boerger | 62/222 |
| 4,075,294 | 2/1978 | Saito et al. | 261/34 A |
| 4,375,228 | 3/1983 | Widdowson | 138/46 |
| 4,412,432 | 11/1983 | Brendel | 62/504 |
| 4,437,493 | 3/1984 | Okuda et al. | 138/45 |
| 4,951,478 | 8/1990 | McDonald | 62/222 |
| 5,081,847 | 1/1992 | Anderson, Jr. | 62/222 |
| 5,170,638 | 12/1992 | Koenig et al. | 62/204 |

*Primary Examiner*—Patrick F. Brinson
*Attorney, Agent, or Firm*—Lon H. Romanski

[57] ABSTRACT

A valve assembly is shown having a valving member situated generally in the path of flow of a fluid which varies in pressure and urges the valving member in generally the same direction as the flow of the fluid; a spring is shown resiliently resisting the movement of the valving member by the flow of fluid; as the valving member is urged in the direction of the flow of the fluid the valving member reduces the effective flow area of the valve assembly through which area the fluid is to flow; the valve assembly features low hysteresis, resistance to plugging by debris in system, is flow sensitive activating at higher pressure differential as flow is increased and it may incorporate a fail safe feature reopening in case of spring failure; flow noise attenuation is also a feature.

79 Claims, 24 Drawing Sheets

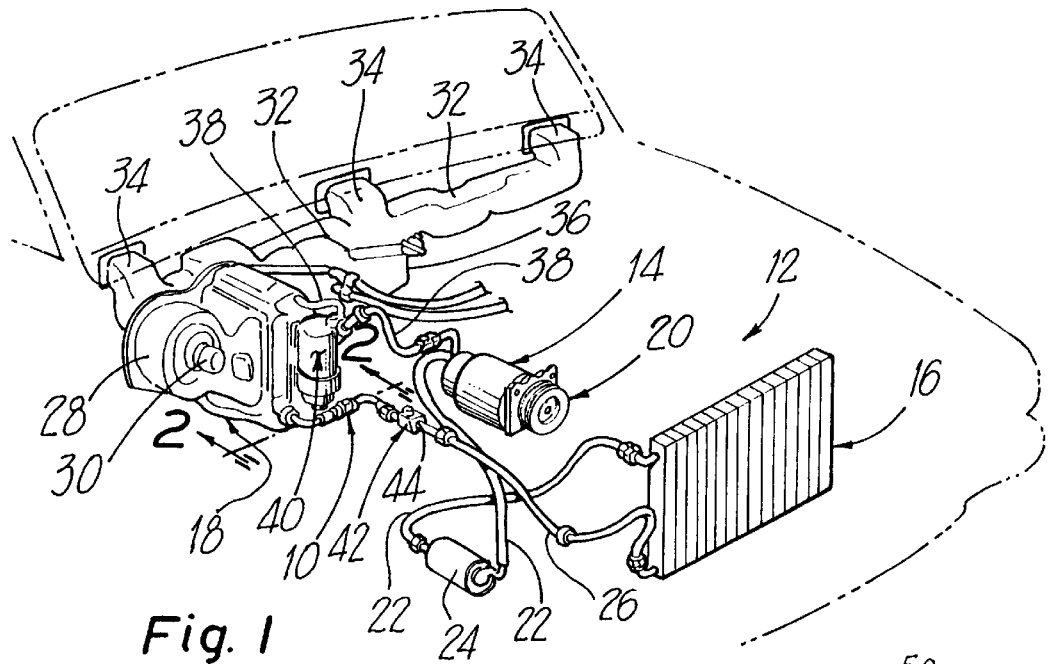
Fig. 1
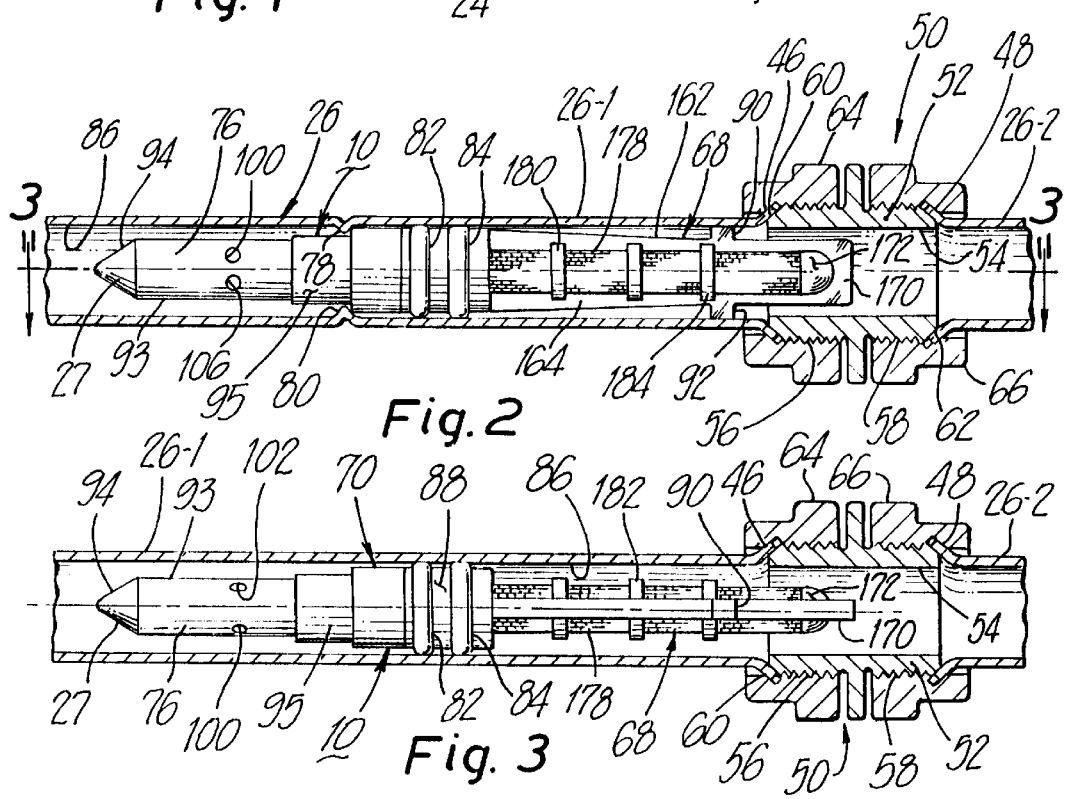
Fig. 2
Fig. 3

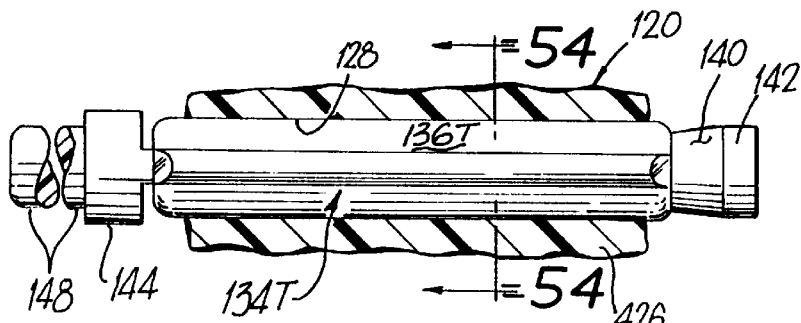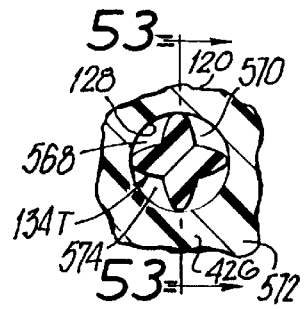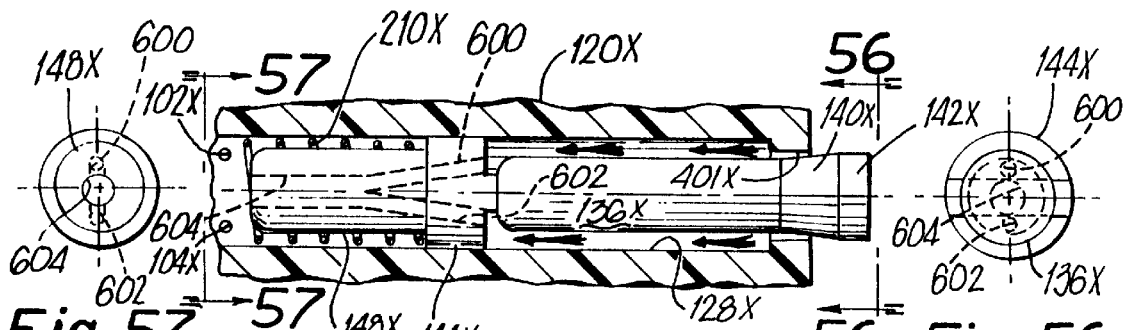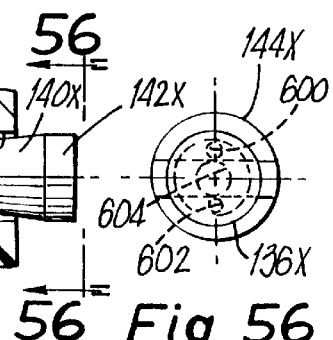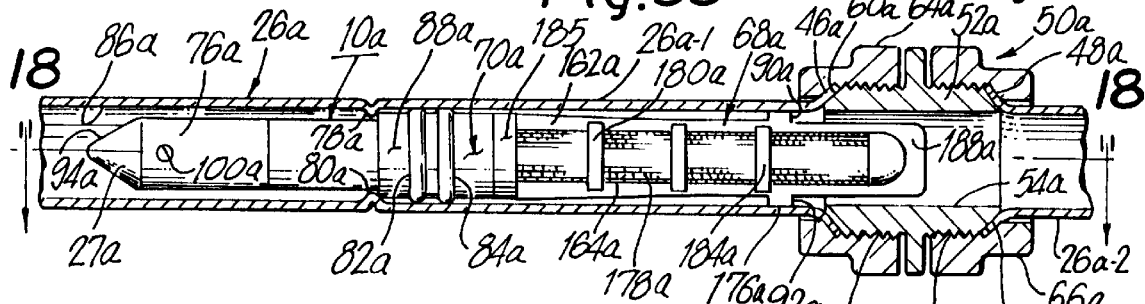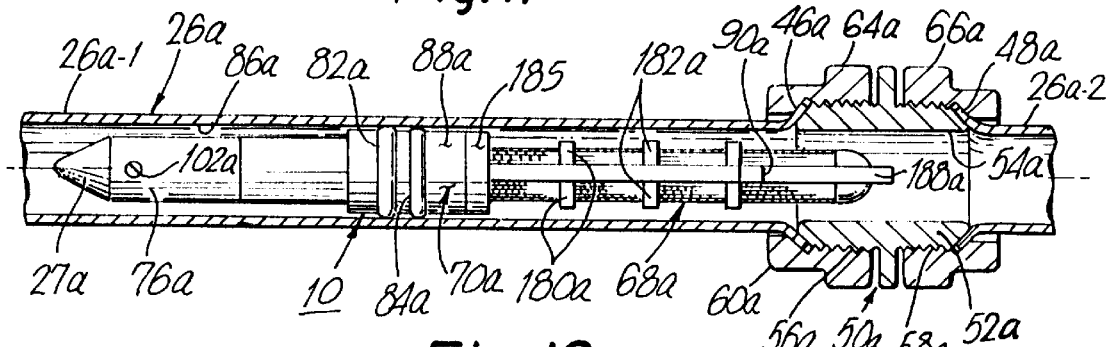

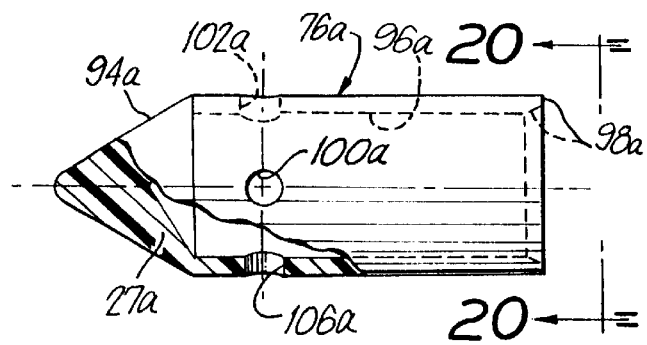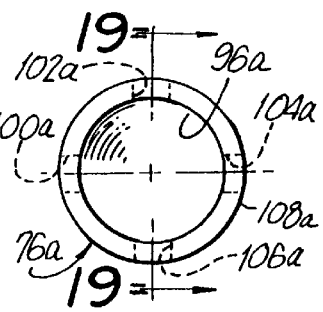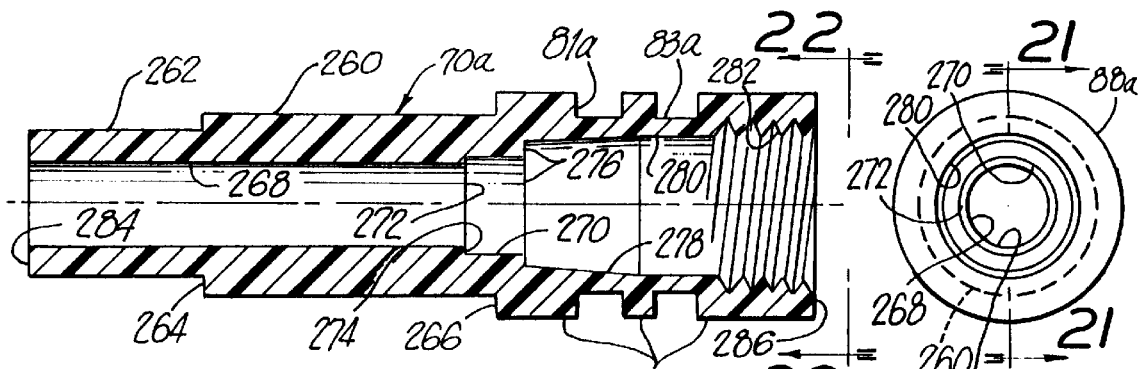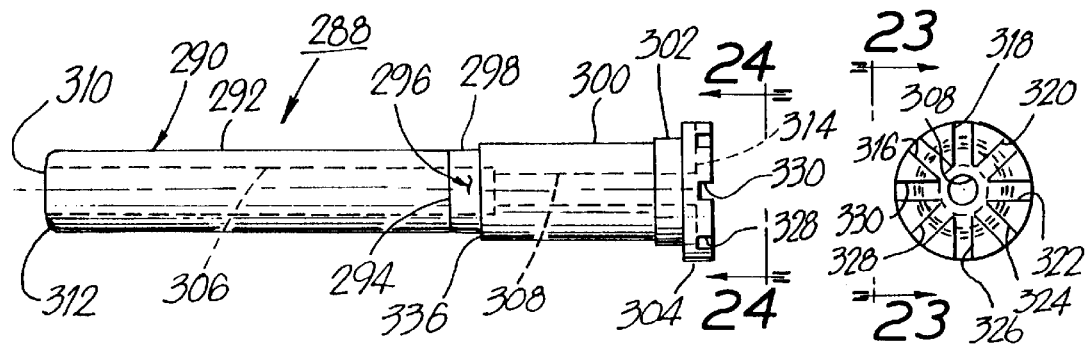

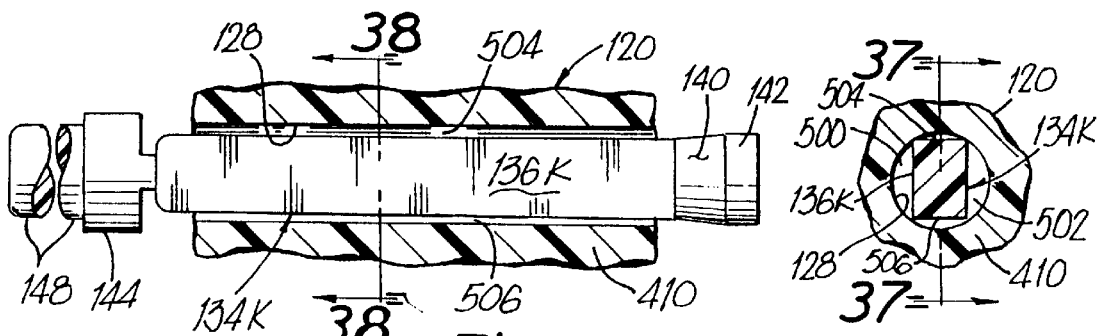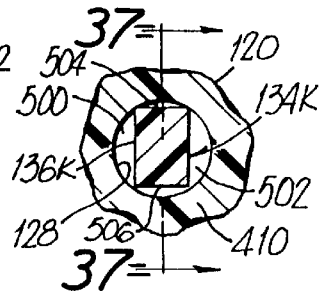
Fig. 37  Fig. 38
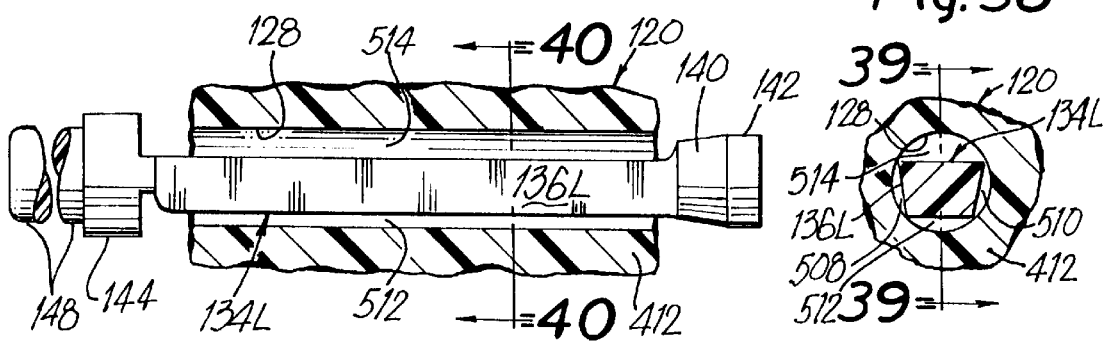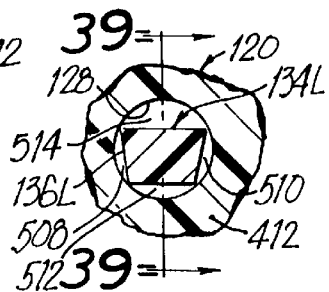
Fig. 39  Fig. 40
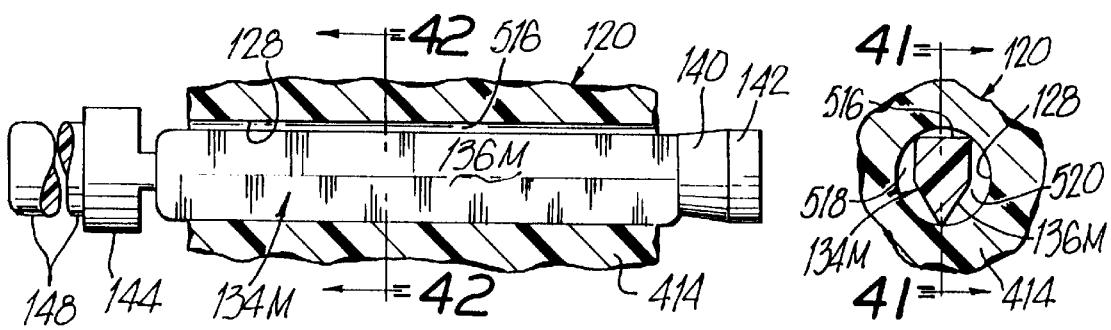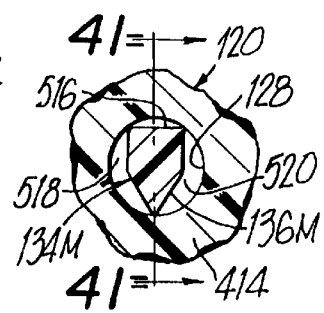
Fig. 41  Fig. 42
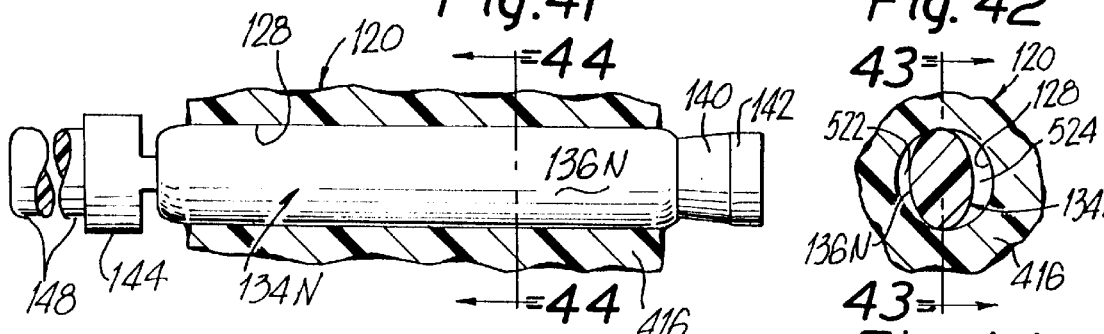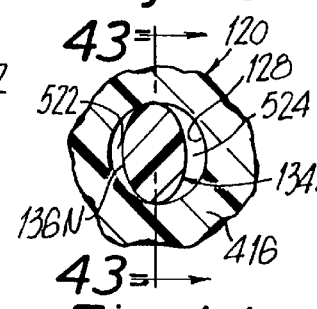
Fig. 43  Fig. 44

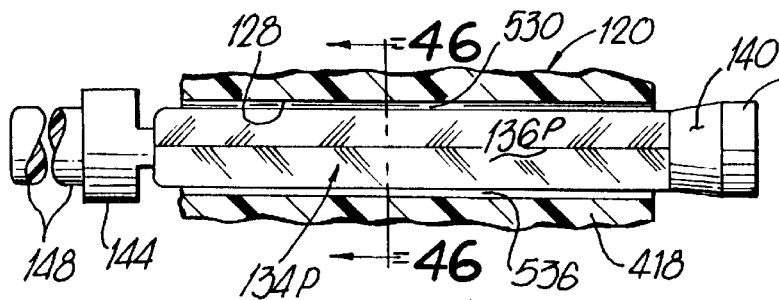 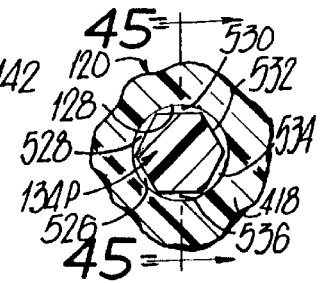
Fig. 45  Fig. 46
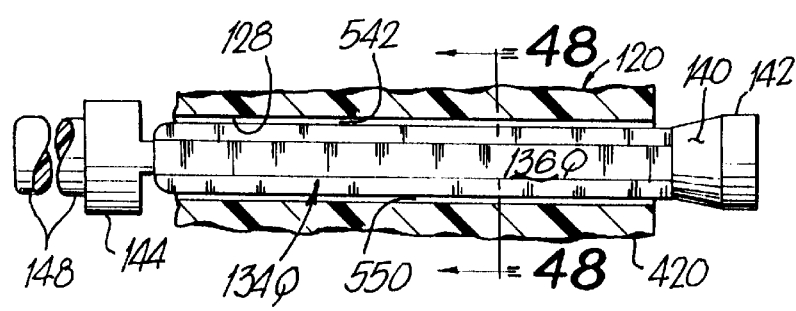 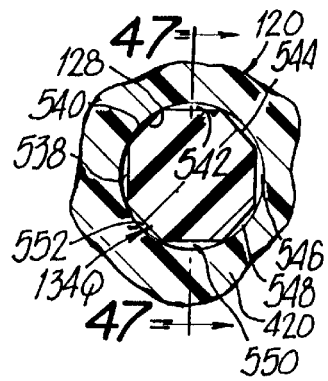
Fig. 47  Fig 48
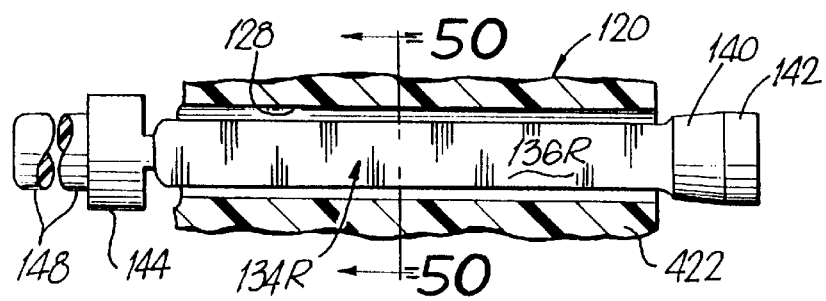 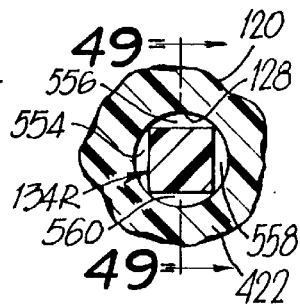
Fig. 49  Fig. 50
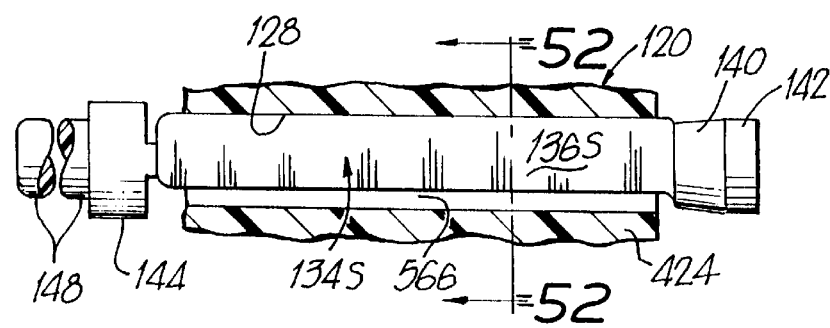 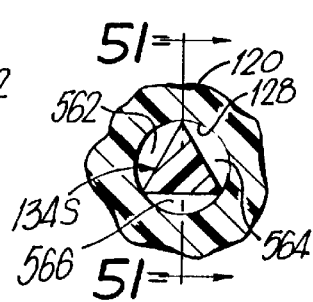
Fig. 51  Fig. 52

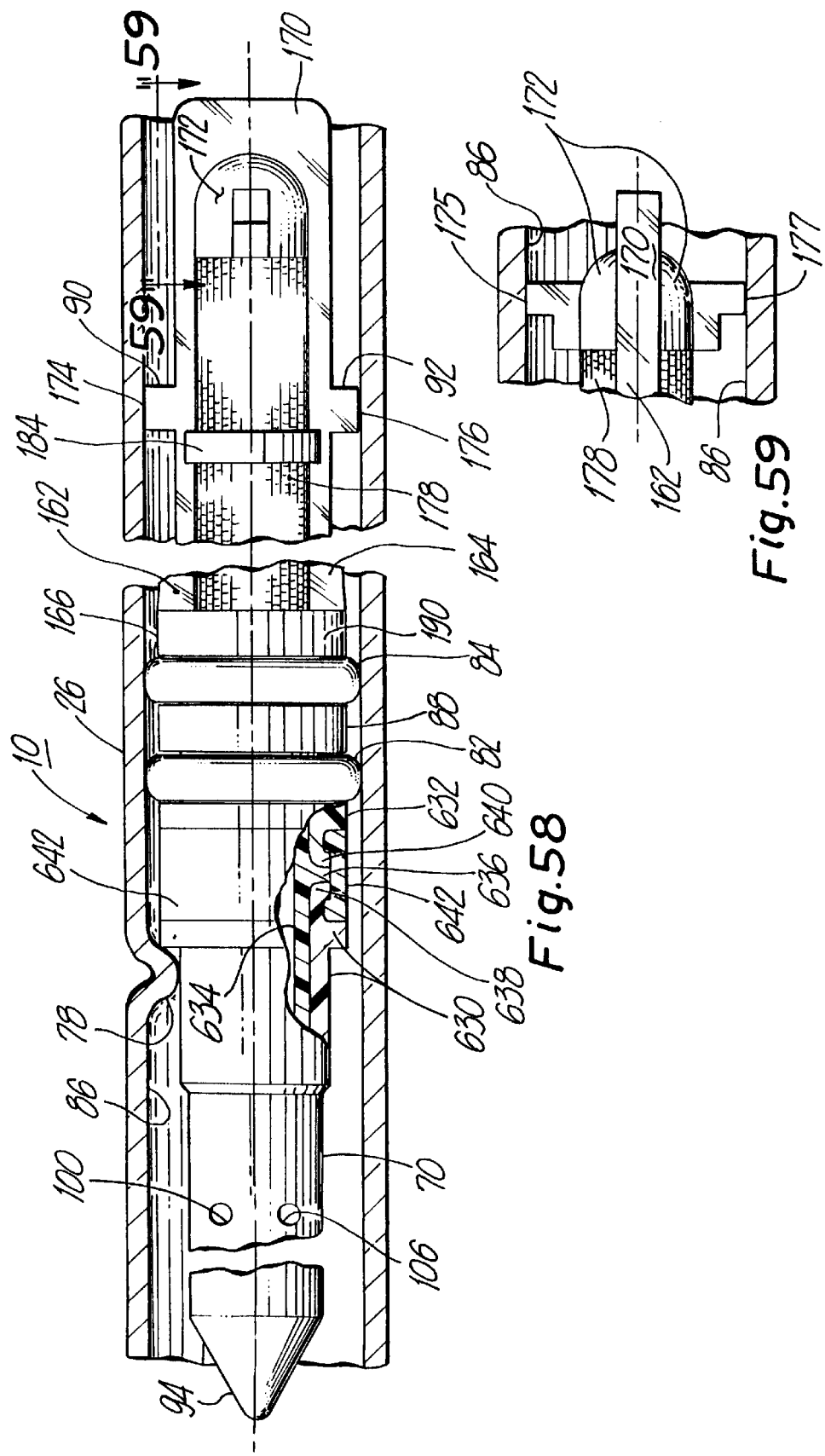

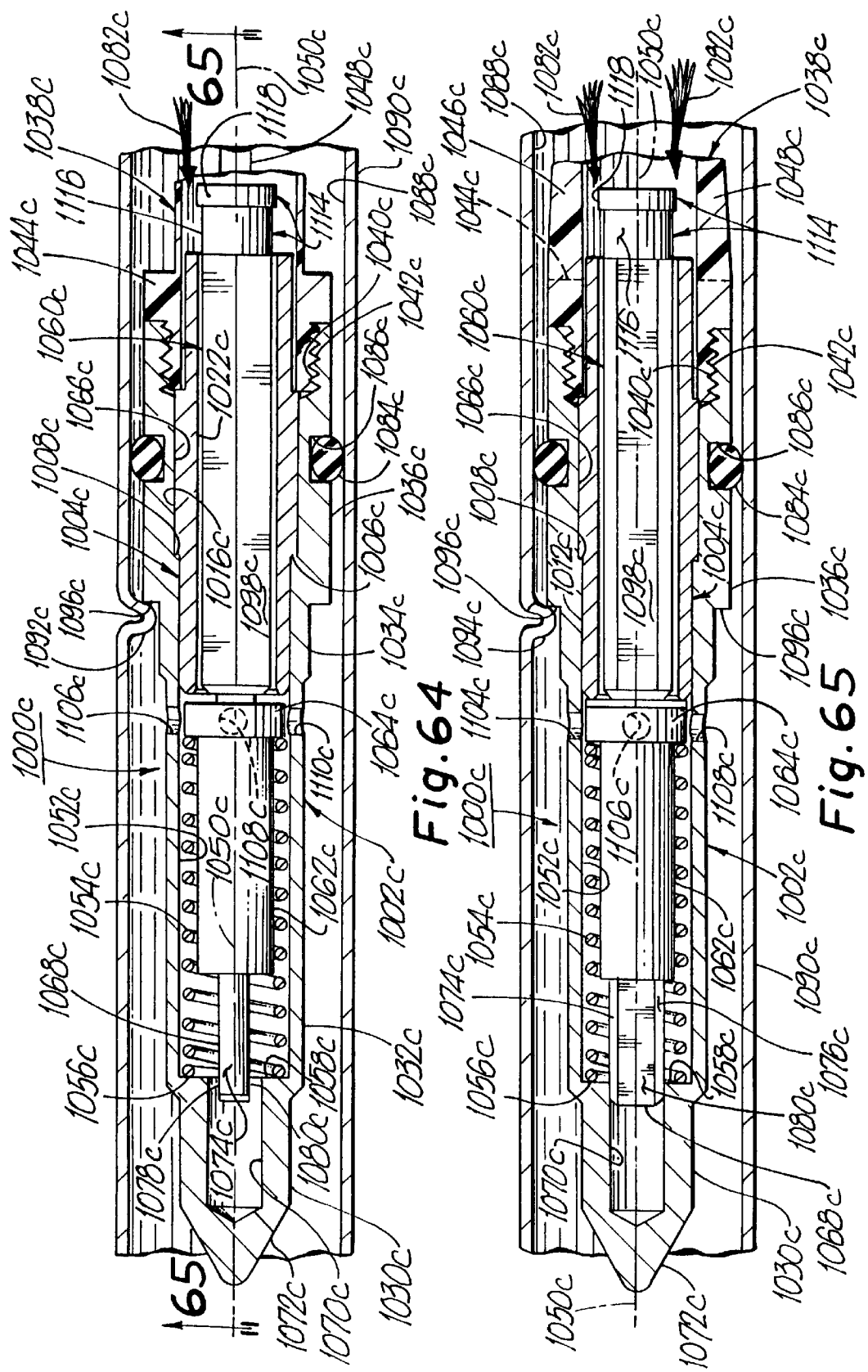

PRESSURE-ENTHALPY DIAGRAM
FOR SIMPLE SATURATION CYCLE

LEGEND

1. SIMPLE SATURATION CYCLE  — — — — — — — — —
2. SUBCOOLED CYCLE          ——— — — ——— — —
3. QUALITY CYCLE            ——— — ——— — ———

VARIABLE FLOW ORIFICE VALVE ASSEMBLY

FIELD OF THE INVENTION

This invention relates generally to variable orifice fluid valve assemblies and more particularly to such variable orifice fluid valve assemblies which are generally responsive to the differential of pressure of such fluid across the valve assembly and still more particularly wherein the effective flow area of the variable orifice is at least in part reflective of said pressure differential.

BACKGROUND OF THE INVENTION

Heretofore, in fluid flow systems wherein it was desired to restrict the flow in a line, it was common practice by the prior art to employ a simple fixed area flow restrictor, where possible, for such reasons as reduction or elimination of moving parts, the ability for exact sizing, simplicity and comparatively low cost. However, this approach by the prior art, usually required undesirable compromises when in comparison substantially improved system efficiency would result if a practical, low-cost, variable size flow restriction were available.

For example, in automotive air conditioning systems, it has been common practice in the prior art to employ a fixed restriction, such as an orifice or capillary tube in the high-pressure liquid line (conduit) between the condenser and evaporator. The refrigerant flow is primarily dependent on the inlet pressure at the orifice and the amount of liquid subcooling or quality. Quality, here, is defined as the percentage of gas in the refrigerant at the orifice inlet. Since the orifice tube flow is sonic, or "choked", suction pressure generally is not a factor in determining flow during normal system operation. Increasing inlet pressure or subcooling increases flow while increasing gas at the inlet decreases flow. These characteristics make the fixed orifice tube or capillary tube self regulating and produces adequate performance in a wide range of conditions encountered in normal automotive air conditioner operation. However, since the introduction of this type of refrigerant flow control in automobiles in 1973, efforts have continued to develop a viable variable orifice valve in an effort to improve its performance during periods of idle and low speed vehicular engine operation. Current systems use an orifice tube 1.5 inches (3.81 cm.) long by 0.060 in. (1.524 mm.) to 0.072 in. (1.83 mm.) in diameter. This size generally provides good highway speed performance at reasonable compressor head pressures.

Using an orifice tube having a diameter in the range of 0.040 in. (1.016 mm.) to 0.050 in. (1.270 mm) at idle has been shown to increase air conditioner discharge air performance by 7° F. while reducing compressor power requirements by 10.0% at certain high ambient conditions. This as compared to the larger size.

To fully understand why this occurs consider that the orifice tube is sized for reasonable head pressures at high speed high load engine conditions. At these conditions (100° F. to 110° F. ambient) compressor discharge pressure at vehicular highway speeds is on the order of 250.0 psig. Subcooling is in the range of 15° F. and refrigerant flow is 10.0 lbs. per minute of R-12 (Dichlorodifluoro Methane) or R-134A (Tetrafluord Ethane). As the vehicle is then idled condenser airflow is decreased substantially and head pressure rises to the range of 350.0 psig. Because the compressor is pumping much less refrigerant (5.0 lbs. per minute) the orifice tube must only produce this flow to again balance. This is accomplished by the condenser not condensing all of the gas entering it from the compressor. This uncondensed gas enters the orifice inlet and, as discussed previously, reduces flow in this case to 5.0 lbs. per minute and the refrigeration cycle goes from an efficient subcooled cycle to an inefficient quality cycle. A thermostatic expansion valve cycle would be a saturated liquid cycle and much more efficient. It is an established fact that subcooling increases system capacity by approximately 1.0% per degree of subcooling at no increase in compressor flow requirements while quality significantly decreases performance. FIG. 80 illustrates this more explicitly.

In FIG. 80, note the gain in evaporator capacity for the subcooled cycle versus the loss for the quality cycle. This is per quantity of refrigerant circulated. A too large of orifice tube results in the less efficient quality cycle occurring at low speed and idle conditions in an automobile system.

By reducing orifice size at the idle condition liquid refrigerant will back up in the condenser and if backed up enough subcooling will result and the performance can exceed the TXV saturated cycle. (Thermostatic Expansion Valves, commonly called TXV valves, control the flow rate of liquid refrigerant entering the evaporator as a function of the temperature of the refrigerant gas leaving the compressor. Some vehicles still use this relatively expensive type of expansion device since it exhibits performance advantages at low speed and idle over the fixed area orifice tube.) The back-up must be designed so as not to exceed design head pressures as condensing surface is lost with this back-up. If this small orifice were then used at the high load high speed condition more refrigerant would be required in the system as more back up of liquid occurs until enough subcooling and head pressure are available to again flow enough to satisfy evaporator requirements. Unfortunately the head pressure rises into the range of 300.0 to 400.0 psi. substantially reducing compressor life. For these reasons it is imperative that a successful variable flow orifice not be engaged into the minimum flow area at high speed high load conditions.

If the refrigerant charge is not increased at small orifice-high speed-high load then the head pressure will rise significantly but not as high as the above but the evaporator will be starved. This results in high refrigerant superheat in and out of the compressor again reducing compressor life along with an increase in evaporator out air temperature. From the above it can be seen that a variable orifice would be very desirable for increased efficiency and performance.

Flow noise of the prior art fixed orifice tube has been and is a continuing problem in many automotive installations. Start-up, running and shut down noise is somewhat attenuated by use of a diffusion screen at the orifice tube outlet but is not satisfactory in many applications. This noise is principally a function of the quality of the refrigerant entering the expansion device.

Numerous patents have been issued relating to two stage or variable flow orifices which utilize pressure differential to actuate the device. U.S. Pat. Nos. 4,375,228 and 5,081,847 teach that a 175 lb differential between suction and head is a desirable trigger point (R-12). This differential is much too low in certain soak and cool down conditions and would result in the small orifice staying in at the high load-high speed condition. Also, the hysteresis of these designs is so great that once triggered the small orifice would stay in until the system pressures were almost equalized. Again, compressor life would be reduced due to the significantly higher pressures and gas temperatures.

Two other U.S. Pat. Nos. 4,951,478 and 5,170,638 use a sliding O-ring seal. The small size debris circulating in the system and the long shut down period possible in automotive air conditioning systems could lead to sticking of this seal. In fact tight tolerance slideable fits could lead to sticking due to dirt accumulation on these surfaces. The patents mentioned above use this type of fit. A sliding O-ring seal would also undesirably increase hysteresis and be susceptible to wear.

It is noteworthy that to date there is no commercially available variable flow orifice valve which is pressure actuated for refrigeration applications in spite of almost twenty-five years of developmental effort.

An object of the invention is to provide a variable flow orifice valve assembly which is effective and reliable in its operation and low cost to manufacture and designed as to be inserted into a fluid line or conduit.

Another object of the invention is the construction of a variable flow orifice valve assembly which will engage the minimum orifice size at sufficiently high pressure differential to preclude staying in at high speed high load conditions.

A further object of the invention is the construction of a variable flow orifice valve assembly which will have a middle range orifice size infinitely variable or constant between maximum and minimum sizes small enough to obtain significant performance gains at low speed and idle but large enough to not have adverse effects at high speed high load conditions.

Another object of the invention is the construction of a variable flow orifice valve assembly which will possess or exhibit very low actuating hysteresis (in the range of 0.0 to 20.0 psi.)

Another object of the invention is the construction of a variable flow orifice valve assembly which will engage the minimum orifice size at significantly higher pressure differential during high load high flow conditions as compared to idle and low speed low refrigerant flow conditions.

Another object of the invention is the construction of a variable flow orifice valve assembly which will have internal flow passages large enough to pass therethrough debris which may have been permitted to flow into such flow passages by said inlet screen.

A further object of the invention is the construction of a variable flow orifice valve assembly which will re-open to the maximum or larger than minimum orifice size in case of spring failure or abnormally high pressure differential.

Another object of the invention is to construct a variable flow orifice valve assembly which will be commercially acceptable for low noise.

A still further object of the invention is to construct a variable flow orifice valve assembly which will have the spring isolated from the majority of refrigerant flow to preclude undesirable spring vibration caused by such flow.

SUMMARY OF THE INVENTION

According to the invention, a variable flow orifice valve assembly comprises a valve body having a generally longitudinally extending passage formed therethrough, a valving member at least partly received in said passage and axially movable, resilient means for resiliently urging the valving member in one direction relative to said passage, a valve contoured portion capable of being brought into juxtaposition with a portion of said valve body which at least partly defines said longitudinally extending passage, and means operatively carried by said valving member situated generally in the path of flow of fluid flowing toward and intended to flow into and through said longitudinally extending passage.

The flow area is infinitely varied via pressure differential across the assembly over a relatively large pressure range. The design is flow rate sensitive triggering at higher differential at high speed high load over low load low speed. Noise attenuation is accomplished by use of a multifaceted piston, an integral muffler, and the use of a member which covers and uncovers exit holes in the muffler depending on pressure differential. An optional fail safe design is disclosed which re-opens the valve in case of spring failure or abnormally high pressure differential. Flow passages are large enough to pass through debris allowed in by the inlet screen. The spring is isolated from the majority of flow to preclude vibration from flow bubbles shortening spring life.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views:

FIG. 1 is a perspective view of an automotive air conditioning system having a variable flow orifice valve assembly employing teachings of the invention;

FIG. 2 is a relatively enlarged longitudinal cross-sectional view, of a portion of the refrigerant conduit, taken generally on the plane of line 2—2 of FIG. 1 and looking in the direction of the arrows but showing the variable flow orifice valve assembly, within such conduit, in elevation;

FIG. 3 is a cross-sectional view of the refrigerant conduit, taken generally on the plane of line 3—3 of FIG. 2 and looking in the direction of the arrows but showing the variable flow orifice valve assembly, within such conduit, in elevation;

FIG. 17 is a view similar to that of FIG. 2 but depicting a modification of the invention;

FIG. 18 is an elevational view of the apparatus of FIG. 17 taken generally on the plane of line 18—18 of FIG. 17 and looking in the direction of the arrows;

FIG. 19 is an enlarged view, fragmentarily in axial cross-section, taken generally on the plane of line 19—19 of FIG. 20 and looking in the direction of the arrows, of one of the elements shown in FIGS. 17 and 18;

FIG. 20 is an elevational view taken generally on the plane of line 20—20 of FIG. 19 and looking in the direction of the arrows;

FIG. 21 is a generally similarly enlarged axially extending cross-sectional view, of the valve housing shown in FIGS. 17 and 18, taken generally on the plane of line 21—21 of FIG. 22 and looking in the direction of the arrows;

FIG. 22 is an end elevational view taken generally on the plane of line 22—22 of FIG. 21 and looking in the direction of the arrows;

FIG. 23 is a side elevational view, taken generally on the plane of line 23—23 of FIG. 24 and looking in the direction of the arrows, of a movable valving member situated generally within the variable flow orifice valve assembly as, for example, by being operatively situated within the passage means of the valve housing of FIG. 21;

FIG. 24 is an end elevational view, of the valve member of FIG. 23, taken generally on the plane of line 24—24 of FIG. 23 and looking in the direction of the arrows;

FIG. 37 is a generally axially extending cross-sectional view, of a modified form of a valving member and cooperating valving passage means, with such view being taken generally on the plane of line 37—37 of FIG. 38 and looking in the direction of the arrows;

FIG. 38 is a cross-sectional view taken generally on the plane of line 38—38 of FIG. 37 and looking in the direction of the arrows;

FIG. 39 is a generally axially extending cross-sectional view of an other modified form of a valving member and cooperating valving passage means, with such view being taken generally on the plane of line 39—39 of FIG. 40 and looking in the direction of the arrows;

FIG. 40 is a cross-sectional view taken generally on the plane of line 40—40 of FIG. 39 and looking in the direction of the arrows;

FIG. 41 is a generally axially extending cross-sectional view of still an other modified form of a valving member and cooperating valving passage means, with such view being taken generally on the plane of line 41—41 of FIG. 42 and looking in the direction of the arrows;

FIG. 42 is a cross-sectional view taken generally on the plane of line 42—42 of FIG. 41 and looking in the direction of the arrows;

FIG. 43 is a generally axially extending cross-sectional view of still an other modified form of a valving member and cooperating valving passage means, with such view being taken generally on the plane of line 43—43 of FIG. 44 and looking in the direction of the arrows;

FIG. 44 is a cross-sectional view taken generally on the plane of line 44—44 of FIG. 43 and looking in the direction of the arrows;

FIG. 45 is a generally axially extending cross-sectional view of still an other modified form of a valving member and cooperating valving passage means, with such view being taken generally on the plane of line 45—45 of FIG. 46 and looking in the direction of the arrows;

FIG. 46 is a cross-sectional view taken generally on the plane of line 46—46 of FIG. 45 and looking in the direction of the arrows;

FIG. 47 is a generally axially extending cross-sectional view of still an other modified form of a valving member and cooperating valving passage means, with such view being taken generally on the plane of line 47—47 of FIG. 48 and looking in the direction of the arrows;

FIG. 48 is a cross-sectional view, somewhat relatively enlarged to better depict details thereof, taken generally on the plane of line 48—48 of FIG. 47 and looking in the direction of the arrows;

FIG. 49 is a generally axially extending cross-sectional view of still an other modified form of a valving member and cooperating valving passage means, with such view being taken generally on the plane of line 49—49 of FIG. 50 and looking in the direction of the arrows;

FIG. 50 is a cross-sectional view taken generally on the plane of line 50—50 of FIG. 49 and looking in the direction of the arrows;

FIG. 51 is a generally axially extending cross-sectional view of still an other modified form of a valving member and cooperating valving passage means, with such view being taken generally on the plane of line 51—51 of FIG. 52 and looking in the direction of the arrows;

FIG. 52 is a cross-sectional view taken generally on the plane of line 52—52 of FIG. 51 and looking in the direction of the arrows;

FIG. 53, on the same sheet of drawings as FIGS. 17 and 18, is a generally axially extending cross-sectional view of still an other modified form of a valving member and cooperating valving passage means, with such view being taken generally on the plane of line 53—53 of FIG. 54 and looking in the direction of the arrows;

FIG. 54 is a cross-sectional view taken generally on the plane of line 54—54 of FIG. 53 and looking in the direction of the arrows;

FIG. 55, also on the same sheet of drawings as FIGS. 17 and 18, is a generally longitudinally extending elevational view of yet an other valving member shown in a cooperating valving passage means which means is shown in longitudinally extending cross-section;

FIG. 56 is an end elevational view taken generally on the plane of line 56—56 of FIG. 55 and looking in the direction of the arrows;

FIG. 57 is an end elevational view taken generally on the plane of line 57—57 of FIG. 55 and looking in the direction of the arrows;

FIG. 58 is, in the main, an elevational view of a valving assembly employing teachings of the invention with a particular housing joining process;

FIG. 59 is a fragmentary view taken generally on the plane of line 59—59 of FIG. 58 and looking in the direction of the arrows;

FIG. 64 is a view similar to, for example, FIG. 62 showing in axial cross-section, an other valving assembly employing teachings of the invention;

FIG. 65 is a cross-sectional view taken generally on the plane of line 65—65 of FIG. 64 and looking in the direction of the arrows;

DETAILED DESCRIPTION OF THE PREFERRED EMBODIMENT OF THE INVENTION

Figures 4, 5:
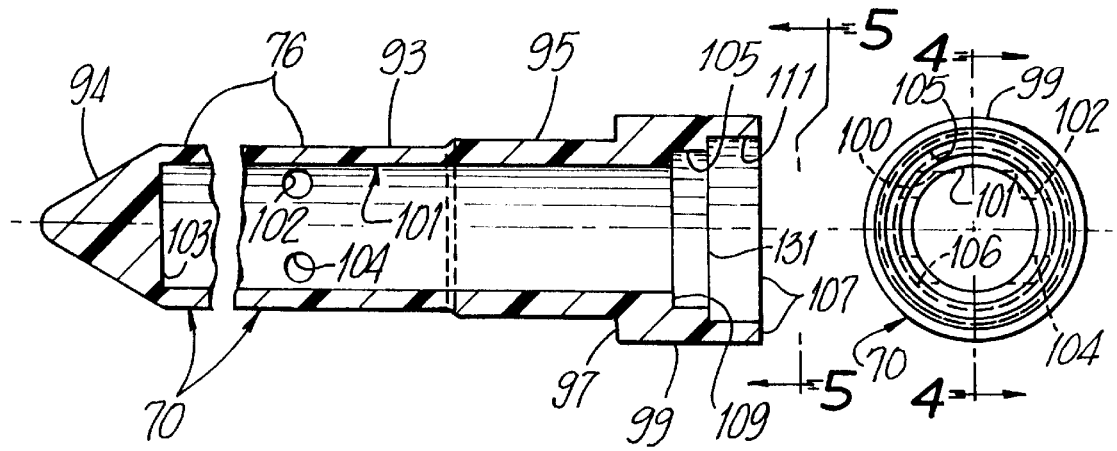
FIG. 4 is a still further enlarged view in axial cross-section, with a portion thereof broken away and removed, of one of the elements comprising the valving assembly of FIGS. 2 and 3.
FIG. 5 is an elevational view taken generally on the plane of line 5—5 of FIG. 4 and looking in the direction of the arrows.

Referring now in greater detail to the drawings, FIG. 1 in a somewhat simplistic manner, depicts a variable orifice flow restrictor valve assembly 10, employing teachings of the invention, comprising a portion of the overall vehicular air conditioning system 12.

The automotive air conditioning system 12 is shown as comprising a compressor 14, a condenser 16 and an evaporator 18. The compressor 14 may be driven as through an electromagnetic clutch 20 by the vehicular engine (not shown) so as to deliver refrigerant as high pressure vapor to the inlet of the condenser 16 via a compressor 14 discharge line 22 and a muffler 24. The refrigerant is cooled by ram air flow and by engine fan air flow across tube and fin components of the condenser 16, in a known manner, and is then discharged as high pressure refrigerant liquid to a high-pressure liquid line or conduit 26 in which the valve assembly 10 of the invention is located. The valve assembly 10 has its outlet end 27 (FIG. 2 & 3) in communication with the inlet of the evaporator 18. Ambient air is directed across the tubes and fins of the evaporator 18 by a blower fan 28 driven as by an electric motor 30. Air, cooled by the evaporator 18, is directed from the discharge of the blower fan 28 and is directed into the vehicular passenger compartment as through a duct 32 then as through air distribution ports 34 which may be under the control of a mode control system 36.

Low pressure refrigerant vapor exits the evaporator 18 through a suction or low pressure line 38 containing an accumulator dehydrator unit 40 and is returned by this line or conduit to the suction side of the compressor 14. The air conditioning system further preferably includes a suitable safety pressure switch 42 for controlling the clutch 20 and a high pressure gauge connection 44 both of which are connected in the high pressure liquid line or conduit 26 between the condenser 16 and the evaporator 18. A low pressure switch located on the suction accumulator is generally used for antifreeze control.

The air conditioning system thus far described is representative of a cycling clutch orifice tube system of a conventional (prior art) type except that the valve assembly 10 of the present invention replaces a fixed orifice expansion device for reasons to be discussed. In such prior art conventional systems, a fixed orifice expansion device has been provided consisting of an inlet screen, a brass tube of a precise inside diameter and precise length and a diffuser screen on the outlet end of the fixed orifice expansion is provided to reduce noise. In such prior art systems the precise size of the fixed orifice is selected to provide satisfactory performance under most conditions of engine speeds and cooling load on the evaporator; often in such situations the orifice size and system charge are such to cause the evaporator to operate under slightly flooded conditions.

As discussed previously, the orifice is generally sized for reasonable compressor discharge pressure at high load high speed conditions and is thus much too large at idle and low speed conditions resulting in a significant loss of performance and efficiency at these conditions.

In comparison the invention herein disclosed, at least in the main, overcomes the foregoing problems and such will become more clearly understood from the following detailed description of the invention. In this regard, reference at this point, will be made not only to FIG. 1 but also to FIGS. 2, 3, 4, 5, 6, 7, 8, 9, 10, 11, 12, 13, 14, 15 and 16.

Referring now in particular to FIGS. 2 and 3, the variable flow orifice valve assembly 10, embodying teachings of the invention, is shown as being contained within conduit 26 and, as depicted in FIG. 1, generally between condenser 16 and evaporator 18.

Conduit 26 may be comprised of conduit sections 26-1 and 26-2 respectively provided with outwardly conically flared ends 46 and 48 which are functionally and operatively joined or connected to each other as by a coupling assembly 50. As depicted, the coupling assembly 50 may comprise a generally medially situated connecting member 52 having a central cylindrical passage 54 and outer threaded portions 56 and 58. Generally conical end surfaces 60 and 62 of the member 52 have respectively seated thereagainst the flared ends 46 and 48 of conduit sections 26-1 and 26-2. The flared ends 46 and 48 are tightly and sealingly seated against the conical portions 60 and 62 by respective threaded nuts 64 and 66.

Generally as depicted in FIGS. 2 and 3, the preferred embodiment of the invention is shown comprising an inlet filter structure 68 operatively axially connected to a cooperating valve housing 70 which is provided with an axially extending muffler portion 76. As will be seen, a valve piston 134 is situated generally in the valve housing 70. Various stop means may be employed; however, in the embodiment disclosed conduit section 26-1 is formed with radially inwardly extending segments 78 and 80 which prevent the further movement of the valve assembly 10 generally downstream. As also depicted in FIGS. 2 and 3, in the preferred embodiment a plurality of fluid sealing O-rings 82 and 84 are carried by cooperating annular grooves formed in the outer surface 88 of the housing or body portion as to thereby prevent any fluid flow past such O-rings 82 and 84 and between the inner surface 86 of conduit section 26-1 and the outer surface 88 of the filter structure body portion. Generally, the inlet filter structure 68 is preferably a slip fit.

Referring now in greater detail to FIGS. 4–9, the relatively enlarged muffler portion 76 preferably is comprised of an outer cylindrical configuration 93 leading to the conical surface 94 and to the diametrically enlarged cylindrical surface 95 which, in turn, joins to an outwardly radiating flange-like portion 97 and a further diametrically enlarged outer cylindrical surface 99.

Preferably, the housing 70 is formed with an axially extending cylindrical passage or chamber 101 closed by end wall means 103 and in communication with a diametrically enlarged counterbore or recess 105 and a second counterbore 111. In the preferred embodiment, the end of the housing 70 next to the counterbore 111 is formed with a suitable surface 107 enabling the joining thereof to associated structure as by ultrasonic welding.

As shown in FIGS. 2, 3, 4 and 5, the housing 70 is preferably provided with passages or apertures 100, 102, 104 and 106 each of which, through the cylindrical wall, communicates between the inner chamber 101 and the area outwardly of cylindrical portion 93. Further, in the embodiment disclosed, the respective axes of passages 100, 102, 104 and 106 are skew with respect to the longitudinal axis and, further, preferably the axis of passage 100 is colinear with the axis of passage 102 while the axes of passages 104 and 106 are colinear. In the preferred embodiment housing 70 is comprised of 33.0% glass filled nylon.

Figures 6, 7:
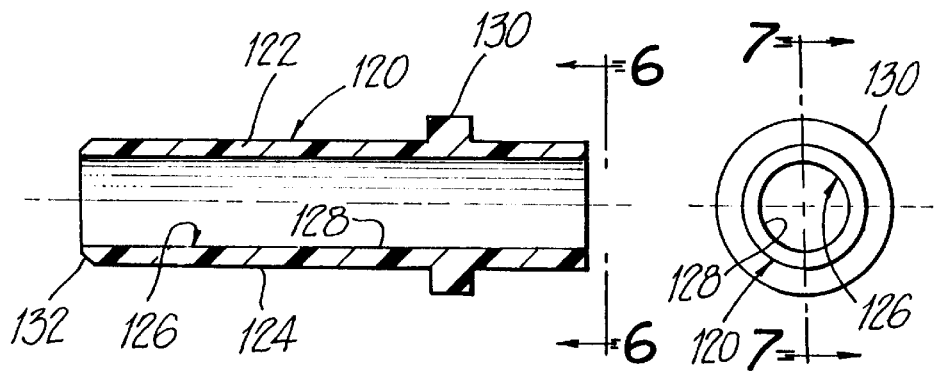
FIG. 6 is an end elevational view taken generally on the plane of line 6—6 of FIG. 7 and looking in the direction of the arrows.
FIG. 7 is an axial cross-sectional view taken generally on the plane of line 7—7 of FIG. 6 and looking in the direction of the arrows.

Preferably, a tubular bushing 120, as in FIGS. 6 and 7, is comprised of metal or suitable plastics material and is operatively carried generally within housing 70 of FIGS. 4 and 5. The bushing 120 comprises an axially elongated body 122 which has an outer cylindrical surface 124 and a centrally formed passage 126 defined as by an inner cylindrical surface 128. An annular radially outwardly extending flange 130 is preferably integrally formed with body 122. The respective ends of the tubular body may be rounded or chamfered as generally indicated at 132.

The valving assembly 10 further comprises a form of piston or valving member 134 as generally depicted in FIGS. 8, 9, 10, 11 and 12. The member 134 may be comprised of any suitable material with one of such being heat stabilized 33.0% glass filled nylon. The preferred embodiment 134, is preferably of unitary construction comprising an axially elongated main body portion 136 which, at its one end is integrally joined to a valving portion 138 which, as generally depicted, comprises a tapering or conical-like surface 140 which increases in cross-sectional diameter as it becomes closer to the integral preferable cylindrical portion 142.

The opposite end of the valving member 134 is integrally formed to a cylindrical guide-like portion 144 as by means of a transversely extending joining portion 146. The extreme left end of member 134 (as viewed) comprises an integrally formed cylindrical body 148 which, as will be seen, functions as a spring pilot and travel stop.

Figures 8, 9:
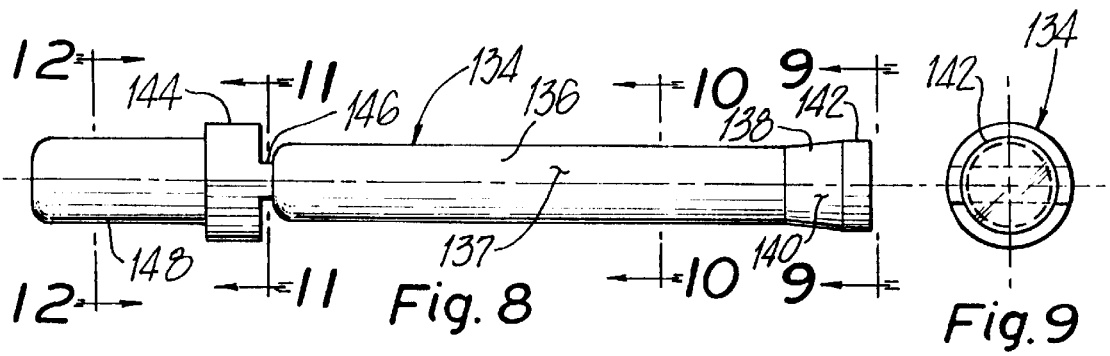
FIG. 8 is an elevational view of a valving member, comprising the assembly of FIGS. 2 and 3, drawn in a scale generally compatible to that of FIGS. 4 and 7.
FIG. 9 is an end elevational view taken generally on the plane of line 9—9 of FIG. 8 and looking in the direction of the arrows.
Figure 10:
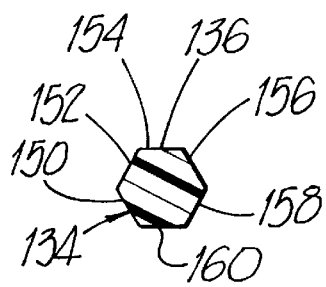
FIG. 10 is a transverse cross-sectional view taken generally on the plane of line 10—10 of FIG. 8 and looking in the direction of the arrows.

As best seen in FIGS. 8 and 10, the preferred embodiment of the piston-valve member 134 has its elongated body portion of a transverse hexagonal cross-section having longitudinally extending side surfaces 150, 152, 154, 156, 158 and 160. Benefits of such a cross-sectional configuration will become apparent.

Figure 13:
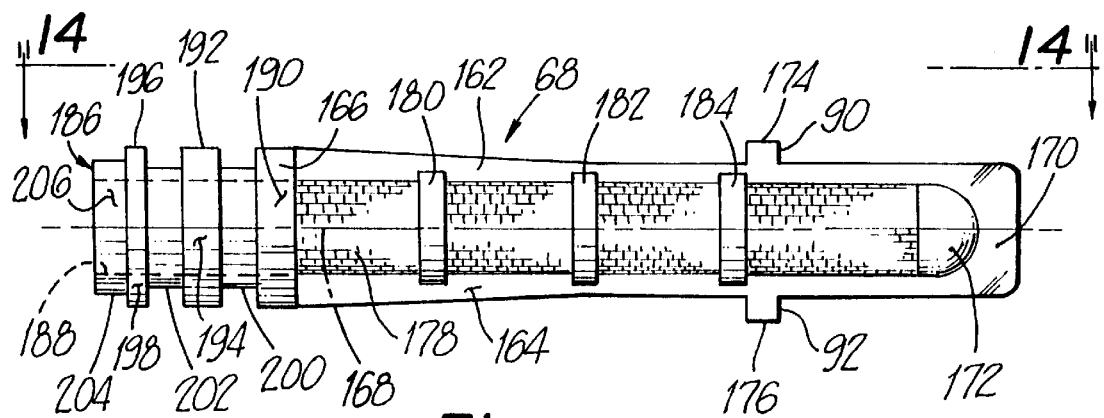
FIG. 13 is a side elevational view of a filter assembly, shown in assembly in FIGS. 2 and 3, with such filter assembly being drawn to a scale larger than the scale of FIGS. 2 and 3 but slightly smaller than the scale used in FIGS. 4–12.
Figure 14:
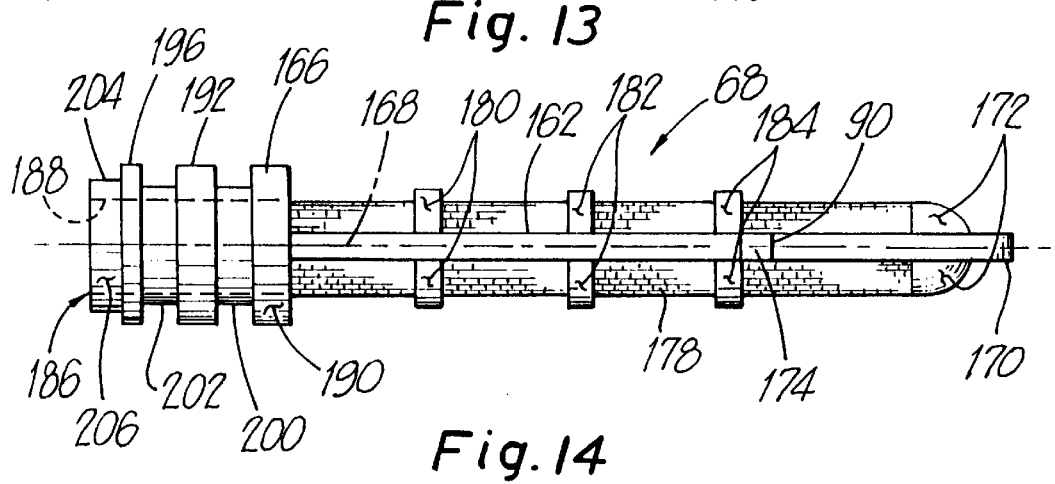
FIG. 14 is an elevational view taken generally on the plane of line 14—14 of FIG. 13 and looking in the direction of the arrows.
Figure 12:
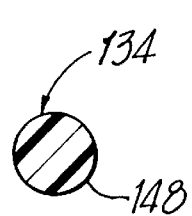
FIG. 12 is a transverse cross-sectional view taken generally on the plane of line 12—12 of FIG. 8 and looking in the direction of the arrows.
Figure 11:
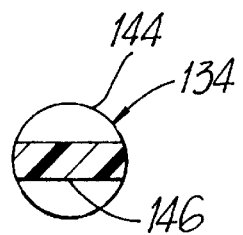
FIG. 11 is a transverse cross-sectional view taken generally on the plane of line 11—11 of FIG. 8 and looking in the direction of the arrows.

In FIGS. 13 and 14, the size of the filter assembly 68 has been drawn to a scale considerably larger than that employed in the drawings of FIGS. 2 and 3, but slightly less than the scale by which the housing 70 of FIGS. 4 and 5 were drawn.

Referring in greater detail to FIGS. 13 and 14, a filter type inlet assembly 68 is depicted as comprising a frame or main body portion preferably formed of 33.0% glass reinforced nylon comprising a pair of generally longitudinally extending ribs or body portions 162 and 164 preferably molded as to each be integrally formed with and to a generally cylindrical end wall 166 extending transversely of the axis 168 of the inlet assembly 68. At the opposite ends, the body portions 162 and 164 are preferably integrally joined to each other as by a bight portion 170 which, as depicted, may also carry a generally cylindrical bullet-like portion 172. As shown in both FIGS. 13 and 2 the structural support members 162 and 164 are similarly and respectively provided with integrally formed and radially outwardly extending abutment portions 90 and 92, the radially outermost surfaces 174 and 176 of which are such as to slidingly abut against the interior surface of conduit or passage 86 as best seen in FIG. 2.

Further, in the preferred embodiment, the inlet filter screen 178, in its free state, is tubular and is assembled to the struts 162 and 164, and to the generally circular or annular supports 180, 182 and 184, as well as the bullet-like body portion 172 by having the screen 178 be over-molded, as is well known in the art, by such struts 162 and 164 and supports 180, 182 and 184 thereby holding the screen 178 in a desired fixed location relative to the other elements of assembly 68. The screen 178 may be comprised and formed of any material compatible with the refrigerant. The screen 178 therefore, may be formed of, for example: nylon, polyester or any compatible plastics material and it could be comprised of a ferrous or non-ferrous metal mesh.

End 186 is formed to be tubular and to comprise portions for operative connection to the cooperating valve housing 70 (FIGS. 4 and 5). More particularly, end portion 186 comprises a passage 188, opening at the left (as shown in FIGS. 13 and 14), and at its right end communicates with the inner passage of the generally tubular filter 178. Also, end portion 186 may be considered as comprising: (a) annular or cylindrical wall 166 having an outer cylindrical surface 190; (b) an axially spaced radially outwardly extending annular flange 192 preferably having an outer cylindrical surface 194 of the same diametrical dimension of wall 166; and (c) a second axially spaced radially outwardly extending annular flange 196 also preferably having an outer cylindrical surface 198 of the same diametrical dimension of wall 166. Preferably, a cylindrical portion 200, of an outer diameter less than that of walls 166, 192 or 196, is situated axially between and integrally joined to annular or cylindrical walls 166 and 192. A second cylindrical portion 202, of an outer diameter substantially equal to the outer diameter of cylindrical portion 200 is similarly situated axially between and integrally joined to annular or cylindrical walls 192 and 196. At the very end of portion 186, cylindrical portion 204 has an outer cylindrical surface 206 which is of a diameter somewhat larger than that of intermediate cylindrical portions 200 and 202 but somewhat smaller than that of 166, 192 or 196.

Figure 15:
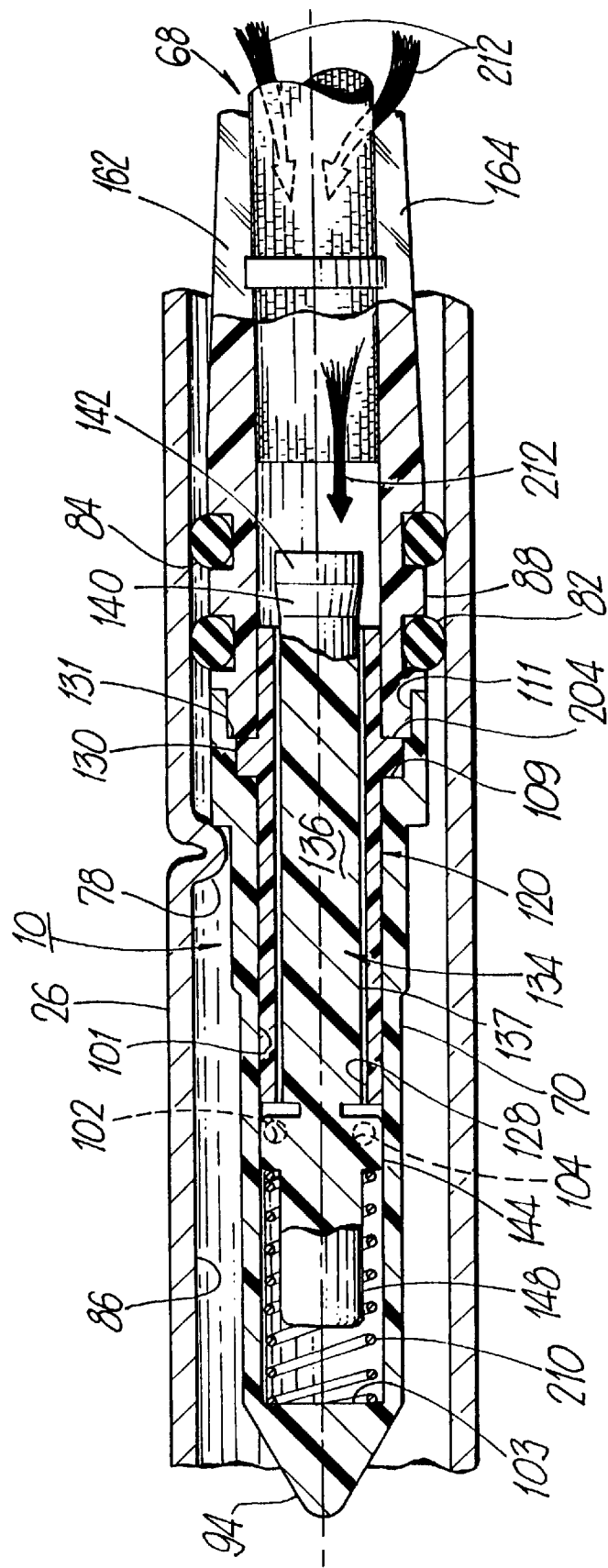
FIG. 15, in the main, is an axially extending cross-sectional view of the assembly of the elements of FIGS. 4, 7, 8 and 13 (as well as some from FIGS. 2 or 3) with the movable elements thereof being depicted in one of the operating positions thereof.

FIG. 15, drawn to a scale which is enlarged as compared to that of FIGS. 2 and 3 depicts the assembly of the valve housing 70, bushing 120, valve or piston member 134, inlet filter assembly 68 and outer conduit 26 with such being shown primarily in axially extending cross-section.

Referring primarily to FIG. 15 along with FIGS. 2, 3, 4, 7, 8 and 13, the overall assembly 10 is shown as being comprised of valve housing 70 (FIGS. 4 and 5), closely receiving therein the cylindrical bushing 120 in a manner whereby the radially outwardly extending annular flange 130 is in abutting engagement with annular seat 109.

Actually, the sequence of assembling the valve assembly 10 would require first the insertion of a calibrated coiled compression spring 210 and next the close sliding insertion of the piston-valve 134 in a manner whereby the spring 210 would become piloted about extension 148 and axially contained between the diametrically enlarged portion 144 and chamber end 103. Thereafter, the sleeve 120 is slid about and axially along the piston-valve 134 and axially along the inner surface 101 of valve housing 70 until, as previously mentioned, annular flange 130 abuts against annular stop 109. In the preferred embodiment the diameter 142 of the piston-valve 134 may be in the order of 0.007 inch (0.178 mm.) smaller in diameter than the internal diameter of the sleeve 134. The filter assembly 68 (FIGS. 13 and 14) may then be operatively fixedly connected to the valve housing 70 by inserting cylindrical portion 204 into the valve housing counterbore 111, thereby having the end of portion 204 juxtaposed to flange 130 and to annular abutment surface 131 of valve housing 70.

Figure 16:
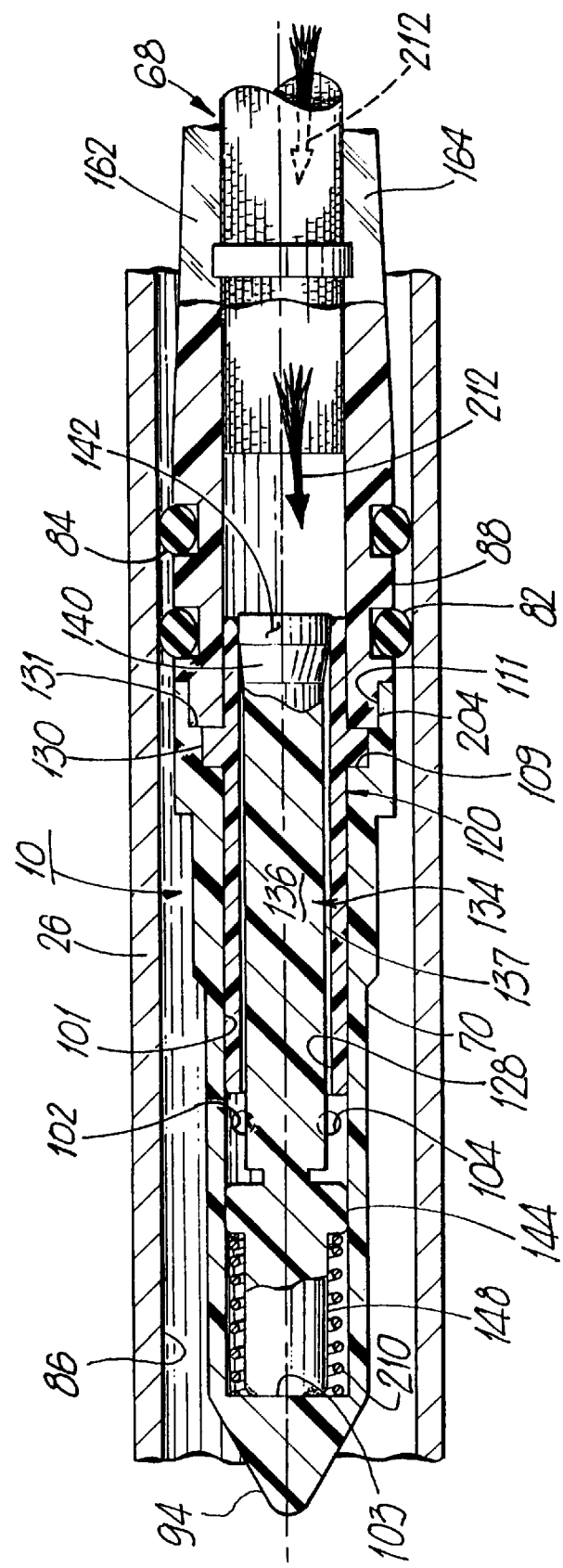
FIG. 16 is another view like that of FIG. 15 but depicting the movable elements thereof in an other of the operating positions thereof.

Referring to FIGS. 15 and 16, the arrows 212—212 depict the flow of, in this illustration, refrigerant. The portion of the arrows shown in hidden line indicates that such refrigerant represented thereby has passed through and into the interior of the filter 178 from where it flows toward valve member 134. The refrigerant is, of course, prevented from flowing generally about and past valve assembly 10 because of O-rings 82 and 84.

FIG. 15, as previously indicated, depicts valving member 134 in what may be considered its most open position. In one embodiment of the invention, as generally depicted by FIGS. 1–16, the clearance, on the diameter, between the outer diameter of portion 142 and the inner diameter of cylindrical surface 128, giving consideration to manufacturing tolerances, could range from 0.006 inch (0.1524 mm.) to 0.008 inch (0.2032 mm.).

In the embodiment shown by FIGS. 1–16, the flow of refrigerant must be, generally, through the clearance between valve member 134 and cooperating valve sleeve or valve housing 120. Further, still referring primarily to FIG. 15 the relatively higher pressure of the refrigerant (represented by arrows 212—212) causes a pressure differential generally axially across valve member 134, including portion 148, which urges valve member 134 to the left, as viewed in FIG. 15. As such valve member 134 thusly moves to the left, the generally conical valving surface or portion 140 starts to be accepted within the passage 128 and, thereby, functioning generally as an increasing flow restrictor, starts to decrease the rate of flow of said refrigerant because of the increasing closure of the passage 128 by the generally conical surface 140. All of this time, of course, the resilient means 210, shown as being a coiled compression spring, provides an increasing resilient resistent force axially against valving member 134 and against the movement thereof by said upstream refrigerant 212—212. This may continue until portion 148 abuts against end wall 103 of the housing 70.

Whatever flow of refrigerant occurs, for example starting with the valving member 134 being in the depicted maximum open condition of FIG. 15, and continuing through the axially changing position of the valving member 134 until it reaches its maximum closed condition depicted in FIG. 16, whatever refrigerant flow is experienced past valve member 134 is, in turn, exhausted through apertures or passages 100, 102, 104 and 106 (FIGS. 2, 3, 15 and 16) for further downstream flow through conduit 26.

FIG. 15 may convey the impression that the relatively enlarged portion 144 actually shuts-off flow through apertures or passages 102 and 104 and, therefore, passages 100 and 106. That is not the case.

In one embodiment of the invention, as generally depicted by FIGS. 1–16, the clearance, on the diameter, between the outer diameter of cylindrical portion 144 and the inner diameter of cylindrical surface 101, giving consideration to manufacturing tolerances, could range from 0.020 inch (0.508 mm.) to 0.034 inch (0.8636 mm.). Such clearance is quite sufficient to permit the venting or flow of the refrigerant through the out-flow passages 100, 102, 104 and 106 even when such out-flow passages appear to be closed by valve member portion 144 as depicted in FIG. 15. The partial closure of the outflow passages reduce flow noise on start-up and shut-down of the system. As the movable piston is moved downstream the passages are further uncovered. This occurs during the higher head pressure operational conditions.

Operation of the Preferred Embodiment of FIGS. 1–16

During operation the vehicular engine is operating and therefore the engine driven compressor 14 causes the flow of relatively high pressure refrigerant to flow from compressor 14 and through conduit or passage means 22 causing such to flow into and through the condenser 16. The pressurized refrigerant becomes cooled by ram air flow and by engine fan air flow across the tube and fin components comprising condensor 16.

The condensed refrigerant exiting condensor 16 is in effect condensed to a relatively high pressure refrigerant liquid. Such then flows from the condenser 16 and through conduit means 26, and into and through the variable flow orifice valve assembly 10 of the invention and, having flowed through orifice valve assembly 10, continues to and into the evaporator 18 then flows through conduit or passage 38 back to the compressor 14 completing one of its work cycles.

The flow through the variable orifice valve assembly is varied directly by the pressure differential across the movable member 134 as shown in FIG. 15. Up to a predetermined pressure differential across member 134 the flow is metered only by the passage restriction formed between the internal diameter 128 of sleeve member 120 and the hex portion 136 of member 134.

As pressure differential increases such as could occur at idle member 134 moves to the left and causes the tapered portion 140 of 134 to decrease its flow area between 140 and 128. As pressure differential is further increased the minimum orifice is reached when member 142 is into the inner diameter of 128. Movement is stopped when spring guide 148 abuts surface 103.

First Modification of the Invention

FIGS. 17, 18, 19, 20, 21, 22, 23, 24, 25 and 26 may be considered as illustrating a first modification of the invention.

In FIGS. 17–26 all elements which are like or functionally similar to those of FIGS. 1–16 are identified with like reference numbers provided with a suffix "a".

Further, the structure of FIG. 1 is not again repeated since doing so would not add anything to the disclosure and teachings. However, if the reader should prefer, the modified embodiment of FIGS. 17–26 may be read in combination with the disclosure of FIG. 1, and, the reference number 10a in FIGS. 17–26 may be considered as being reference number 10 of FIG. 1.

Referring now in greater detail to the drawings, FIG. 17 in a somewhat simplistic manner, depicts a modified embodiment of a variable orifice flow restrictor valve assembly 10a, employing teachings of the invention and comprising a portion of the overall vehicular air conditioning system 12 as previously described and shown in FIG. 1. The operation of such overall air conditioning system 12, in which the embodiment of 10a were to be employed may be considered as being that of FIG. 1.

Referring now in particular to FIGS. 17 and 18, the modified variable flow orifice valve assembly 10a, embodying teachings of the invention, is shown as being contained within conduit 26a and, as depicted in FIG. 1, generally between condenser 16 and evaporator 18.

Conduit 26a is shown as being comprised of conduit sections 26a-1 and 26a-2 respectively provided with outwardly conically flared ends 46a and 48a which are functionally and operatively joined or connected to each other as by a coupling assembly 50a. As depicted, the coupling assembly 50a may comprise a generally medially situated connecting member 52a having a central cylindrical passage 54a and outer threaded portions 56a and 58a.

Generally conical end surfaces 60a and 62a of the member 52a have respectively seated thereagainst the flared ends 46a and 48a of conduit sections 26a-1 and 26a-2. The flared ends 46a and 48a are tightly and sealingly seated against the conical portions 60a and 62a by respective internally threaded nuts 64a and 66a.

Generally as depicted in FIGS. 17 and 18, the modified embodiment of the invention is shown comprising an inlet filter structure 68a operatively axially connected to a cooperating valve housing 70a which is provided with an axially extending muffler 76a. As will be seen, a valve piston 74a is situated generally in the valve housing 70a. Various stop means may be employed; however, in the embodiment disclosed conduit section 26a-1 is formed with radially inwardly extending segments 78a and 80a which prevent the further movement of the valve assembly 10a generally downstream. As also depicted in FIGS. 17 and 18, in the preferred embodiment a plurality of fluid sealing "O" rings 82a and 84a are carried by cooperating annular grooves formed in the exterior of the valve housing 70a as to thereby prevent any fluid flow past such O-rings 82a and 84a, and between the inner surface 86a of of conduit section 26a-1 and the outer surface 88a of valve housing 70a.

Referring now in greater detail to FIGS. 19, 20, 21, 22, 23 and 24, the relatively enlarged muffler member 76a may be comprised of 33.0% glass filled nylon and is generally cylindrical in configuration leading to what may be considered a forward end 27a which is preferably formed with an outer taper or conical surface 94a. Further, in the modified embodiment, the muffler portion or section 76a is provided with a cylindrical recess or passage portion 96a having an end opening 98a for operatively receiving the end of the cooperating valve housing 70a. A plurality of passages 100a, 102a, 104a and 106a, formed generally radially through the general cylindrical wall of muffler 76a, serve to communicate between the chamber 96a and the exterior of the outer surface 108a of the body of muffler 76a.

The drawing in FIG. 21, drawn to a scale as that of FIGS. 19 and 20, illustrates the valve housing 70a as comprising 33.0% glass filled nylon. Referring in greater detail to FIGS. 21 and 22, the valve housing 70a is of generally stepped cylindrical configuration having relatively largest outer cylindrical surfaces 88a into which are formed circumferentially circular recesses 81a and 83a which as generally depicted in FIGS. 17 and 18, respectively receive O-ring seals 82a and 84a. A first step-down outer cylindrical surface 260 extends to the left, as shown in FIGS. 21, 17 and 18, and a second step-down outer cylindrical surface 262 extends concentrically therefrom. A generally annular radiating shoulder-like portion 264 generally joins cylindrical surfaces 262 and 260 while an annular radiating shoulder-like portion 266 generally joins cylindrical surfaces 260 and 88a.

A central longitudinally extending cylindrical passage or conduit 268 is formed in valve housing 70a and, as depicted in FIG. 21, opens into or communicates with a diametrically enlarged substantially concentric opening 270 which, in cooperation with transverse annular surface 272, defines an annular extending corner-like fluid metering surface 274. The substantially concentric opening or enlarged passage 270 has a transverse annular surface 276 which, preferably, meets a tapered inner generally cylindrical wall 278. The passage or chamber portion 278 meets a concentric conduit portion 280 leading to an internally threaded portion 282. Also, as depicted, the valve housing 70a has opposite axial transversely extending end surfaces 284 and 286.

FIG. 23 depicts a valving member or valve 288 intended to be operatively contained by the housing 70a. In the embodiment disclosed the valve 288 comprises an axially elongated body or stem portion 290 which may be of cylindrical configuration. At the right end (as viewed in FIG. 23) the outer cylindrical surface 292 of stem portion 290 joins, as at axial location 294, into a valving portion 296 which has an outer surface 298 that is generally an axial conical sector increasing in transverse size as such outer surface increases in its distance from the depicted starting location 294.

Further, a cylindrical body portion 300 continues to the right (as viewed in FIG. 23) and carries a diametrically enlarged portion 302 which, in turn, carries a still further diametrically enlarged head-like portion 304. The valve or valve piston 288, has formed therein an axially extending passage 306 which may have a reduced diametrical portion 308. The left end (as viewed in FIG. 23) of passage or conduit 306 has an open end 310 in the (shown) left axial end 312 of the valve piston 288 while the shown right end of passage or conduit 308 opens at generally the transverse level indicated in hidden line at 314. As shown in both of FIGS. 23 and 24, the head portion 304 has a plurality of radiating grooves or recesses 316, 318, 320, 322, 324, 326, 328 and 330 which, generally are at a groove depth as that of the opening of passage 308 as shown in both FIGS. 23 and 24.

Figure 25:
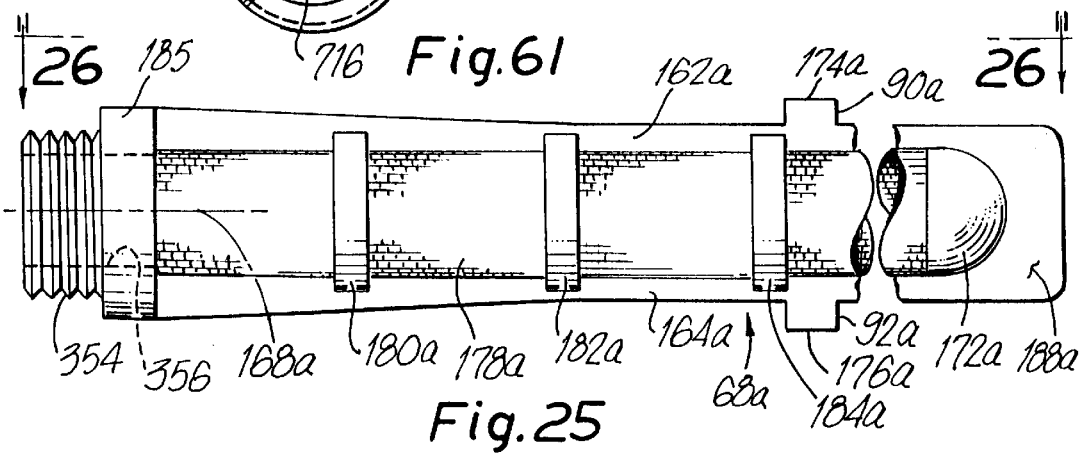
FIG. 25 is a similarly enlarged elevational view of an other element shown in FIGS. 17 and 18.
Figure 26:
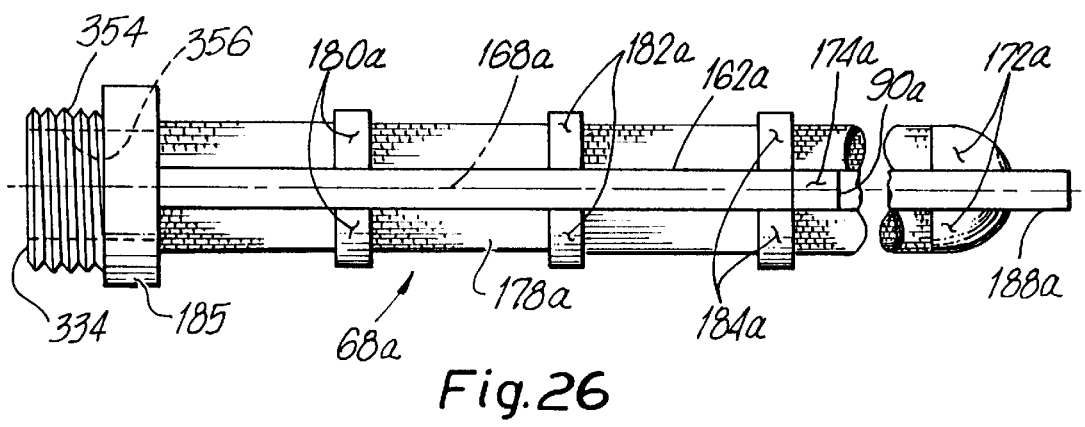
FIG. 26 is an elevational view taken generally on the plane of line 26—26 of FIG. 25 and looking in the direction of the arrows.

FIGS. 25 and 26 depict the filter type inlet assembly 68a drawn to a scale generally as that used in the drawings of FIGS. 19, 20, 21, 22, 23 and 24. Also, a portion of the assembly 68a is broken away and removed as to enable the placement of the views in FIGS. 25 and 26 as depicted.

The filter assembly 68a, in its preferred embodiment, is very similar to the filter inlet assembly 68 of FIGS. 2, 3, 13 and 14. In the main, the major difference between such two embodiments is the method and structure for operatively securing the respective filter inlet assemblies to the downstream valving assemblies.

As generally illustrated, the frame or main body portion of assembly 68a is preferably formed of 33.0% glass reinforced nylon. A pair of generally longitudinally extending ribs or body portions 162a and 164a are preferably molded as to each be integrally formed with and to a generally cylindrical end wall 185 extending transversely of the axis 168a of the inlet assembly 68a. At the opposite ends, the body portions 162a and 164a are preferably integrally joined to each other as by a bight portion 188a which, as depicted, may also carry a generally cylindrical bullet-like portion 172a. As shown in both FIGS. 25 and 26 the structural support members 162a and 164a are similarly and respectively provided with integrally formed and radially outwardly extending abutment portions 90a and 92a, the radially outermost surfaces 174a and 176a of which are such as to slidingly abut against the interior surface of conduit or passage 86a as best seen in FIG. 17.

Further, the filter screen 178a, in its free state, is tubular and is assembled to the struts 162a and 164a, the annular supports 180a, 182a and 184a as well as the bullet-like body portion 172a by having the screen 178a be over-molded by such struts and supports thereby holding the screen 178a in a desired fixed location relative to the other elements of assembly 68a. The screen 178a may be formed of any material compatible with the refrigerant. The screen 178a therefore, may be formed of, for example: nylon, polyester or any compatible plastics material and it could be comprised of a ferrous or non-ferrous metal mesh.

End 185 is also provided with an externally threaded extension 354 which is intended for operative threadable connection with internal threaded portion 282 of housing 70a as possibly best depicted in FIG. 21. As shown in hidden line at 356 a passage or conduit is formed through extension 354 as to provide for communication from the filter 346 to the inlet end of valve housing 70a as shown generally in FIGS. 17 and 18 and in comparatively enlarged but fragmentary views in FIGS. 27 and 28.

Figure 27:
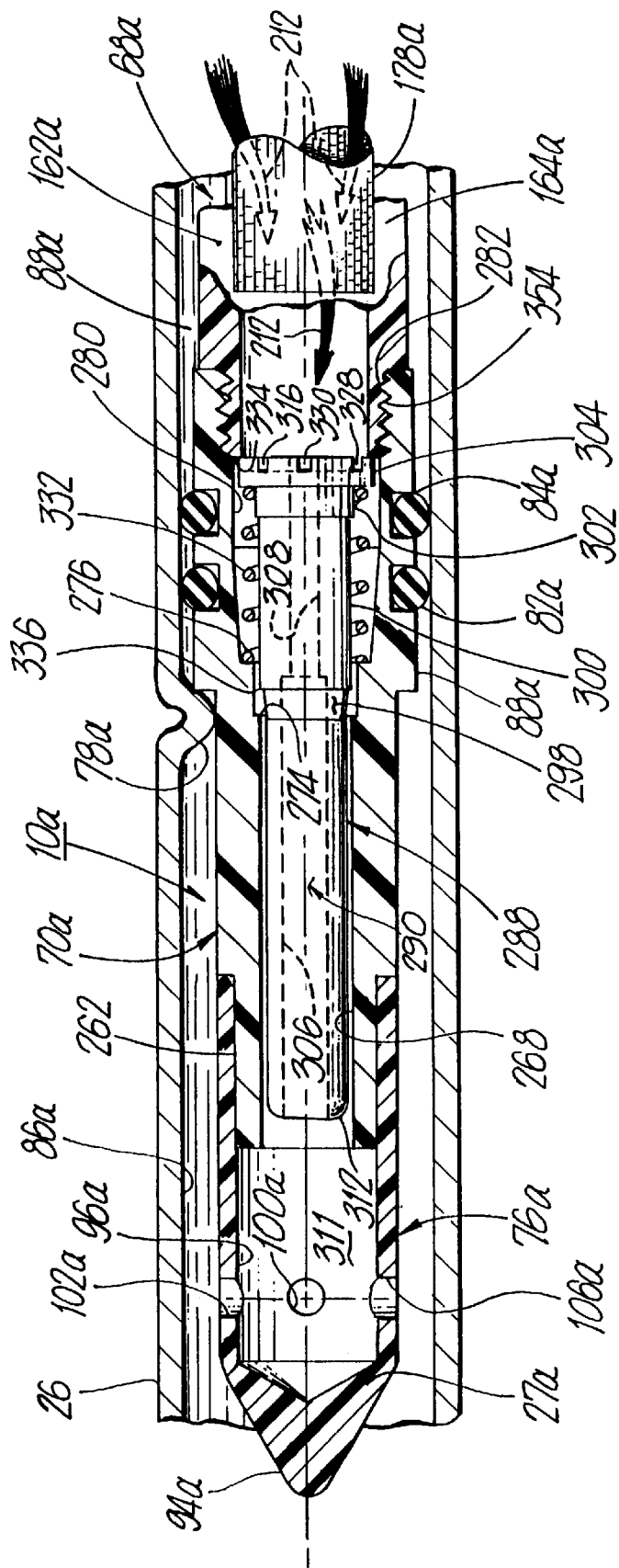
FIG. 27 is, in the main, an enlarged axial cross-sectional view of the variable flow orifice valve assembly, as of FIG. 17 and/or FIG. 18, depicting generally, the valving member in one extreme position of operation.
Figure 28:
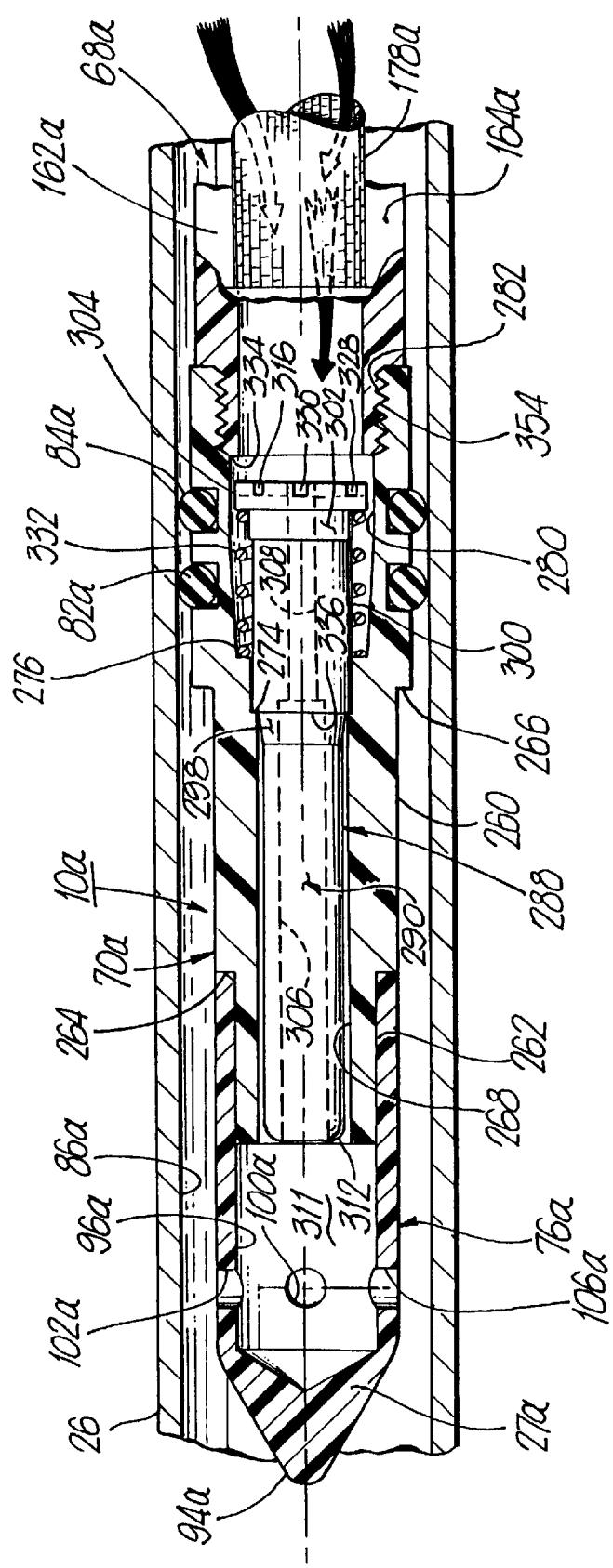
FIG. 28 is, in the main, an enlarged axial cross-sectional view of the variable flow orifice valve assembly, as of FIG. 17 and/or FIG. 18, depicting generally, the valving member in an other extreme position of operation.

Referring in greater detail to FIGS. 27 and 28 (which are also enlarged generally to the same scale as used in FIGS. 19–24), the elements therein which have been previously identified in all or any of FIGS. 17–26 are, except as possibly noted to the contrary, identified with like reference numbers. FIGS. 27 and 28 illustrate resilient deflectable means, such as a coiled compression spring 332, which normally resiliently urges the valving member 288 toward the right as viewed in FIGS. 27 and 28. In the embodiment disclosed, spring 332 is situated generally about valve body portion 300 and axially contained between annular spring perch 276 and movable valve head portion 304. In the embodiment disclosed, as in FIG. 27, the maximum distance that such valving member 288 is able to be moved to the right is determined by the presence of axial end 334, of the inlet filter assembly 68a, which serves as an operative abutment means.

FIG. 28 depicts, in effect, the maximum distance that valve member 288 can be moved toward the left, as viewed in FIG. 28, with such being brought about, generally, by a sufficient pressure differential axially across valve member 288.

As best shown in FIGS. 21 and 22, the metering housing, body or bushing 70a is provided with an annular metering edge 274 while valving member or means 288 is preferably formed with an annular seating or sealing surface means 336.

FIGS. 27 and 28, drawn to a scale generally as used in the drawings of FIGS. 15 and 16, depict the assembly of the valve housing, body or bushing 70a, valve or piston member 288, inlet filter assembly 68a and outer conduit 26 with such being shown primarily in axially extending cross-section.

Referring primarily to FIG. 27 along with FIGS. 17, 18, 19, 20, 21, 22, 23 and 24, the overall assembly 10a is shown as comprised of valve housing, body or bushing 70a (FIGS. 19, 20, 21 and 22), closely receiving, preferably as by a light press-fit, the muffler or discharge member 76a. If desired, the cylindrical wall surface 96a may be cemented to the juxtaposed cylindrical surface 262 of member 70a. Also, if desired, the axial end 98a (FIG. 19) may be ultrasonically welded to the annular face 264 (FIG. 21).

Generally, the sequence of assembling the valve assembly 10a might require first the subassembly of 76a and 70a, and then passing the spring 332 about the valving member 288 so that the end next to the valving member head 304 is rather closely piloted about cylindrical portion 302.

The valving member 288, with the spring 332 about it, as described, may then be inserted into the various aligned passage means of 70a. More particularly, as depicted in FIG. 27, the cylindrical longitudinally extending body 288 is generally closely received within passage 268 of body 70a.

Thereafter, the filter 68a may be secured to the valving body or bushing 70a as by the cooperating threadable engagement of outer threaded portion 354 of filter assembly 68a with the inner threaded portion 282 of body 70a.

Referring to both FIGS. 24 and 27, let it be assumed that the pressure differential axially across the valve member 288 (i.e., the force of the pressure depicted by the upstream arrows 212—212) is insufficient to axially move the valve head 304 away from the annular abutment portion 334 and against the preload force of resilient or spring means 332. However, in the embodiment disclosed, the fact that the valve head 304 remains against annular surface 334 does not mean that fluid flow from the inlet filter 178a and to the outlet orifices or passages 100a, 102a, 104a and 106a is stopped or prevented.

On the contrary, the fluid flow, depicted by arrows 212—212, which in this case is assumed to be fluid refrigerant, flows as into and through radial slots 316, 318, 320, 322, 324, 326, 328 and 330 (FIGS. 24 and 27) and into the generally centrally situated and formed first axial extending passage 308 (FIG. 23) which, in turn, flowingly connects with and into axially extending passage or conduit 306.

As can best be seen by FIGS. 27 and 17 or 18 and FIG. 1, the fluid referred to flows out of passage 306 and into chamber 311 from where the fluid flows out through generally transverse passages 100a, 102a, 104a and 106a and into flow through outer conduit 26 downstream to evaporator 18 (FIG. 1).

In addition to the above-described flow, at this time with the head 304 against the annular abutment 334, the annular metering edge 274 and tapered metering valving surface 298 may be considered as defining the most wide-open position for the flow of fluid therethrough. This may be better understood when a close inspection of the valve head 304 and chamber 280 is made.

Such a close inspection made in FIG. 27 shows that the circumferentially outermost surface of the valve head 304 is spaced radially away and inwardly of the generally juxtaposed surface defining chamber 280. This spacing permits fluid flow through the grooves or slots 316, 318, 320, 322, 324, 326, 328 and 330 radially outwardly and out of the radial outward open ends of such slots and generally between the annular space between the cylindrical outer surface of the valve head 304 and radially juxtaposed chamber surface 280. The fluid then flows to the left (as viewed in FIG. 27) and passes through the annular metering space between metering edge 274 and tapered metering surface 298 and continues to flow in the annular space between the valve cylindrical body 290 and juxtaposed cylindrical surface 268 thereby becoming discharged into chamber 311 and flow from there outwardly through passage means 100a, 102a, 104a and 106a into outer conduit 26 and downstream toward the evaporator 18 (FIG. 1).

Still referring to FIG. 27, as the upstream pressure of the fluid, depicted by arrows 212—212, continues to increase the force developed thereby becomes sufficient to start to move valve head 304 to the left (as viewed in FIG. 27) away from the annular stop 333 and thereby move the entire valving member 288 with it (head 304).

As the magnitude of the generated force of the upstream fluid pressure continues to increase, the entire valving member 288 continues to move to the left (in FIG. 27) in accordance and in response to such increase in force. During this time, the rate of fluid flow is still metered between the annular metering edge 274 and the cooperating tapered metering surface 298 which continues, under such assumed conditions, to more closely approach the annular metering edge 274.

When the magnitude of the generated force of the upstream fluid pressure sufficiently increases, the valving member 288 will be moved its maximum distance to the left (FIG. 27) causing the annular sealing or seating surface or portion to seatingly abut against the juxtaposed annular surface 272 (FIGS. 21 and 22) which carries and effectively defines the annular metering edge 274. At this time, fluid flow between 274 and tapered metering surface 298 is stopped because of annular seating surface 336 being shut against the annular portion 272 (best seen in FIGS. 21 and 22). However, flow of the fluid will still continue from and through conduit portion 308 into conduit 306 and into chamber 311 from where, as previously described, the fluid flows out of apertures or passages 100a, 102a, 104a and 106a into outer conduit 26 and downstream to evaporator 18 (FIG. 1). FIG. 28 depicts the position of the valving member 288 when it reaches the hereinbefore described condition of having the valve annular area 336 seated against the annular surface 272 which effectively carries the annular metering edge 274.

Figure 29:
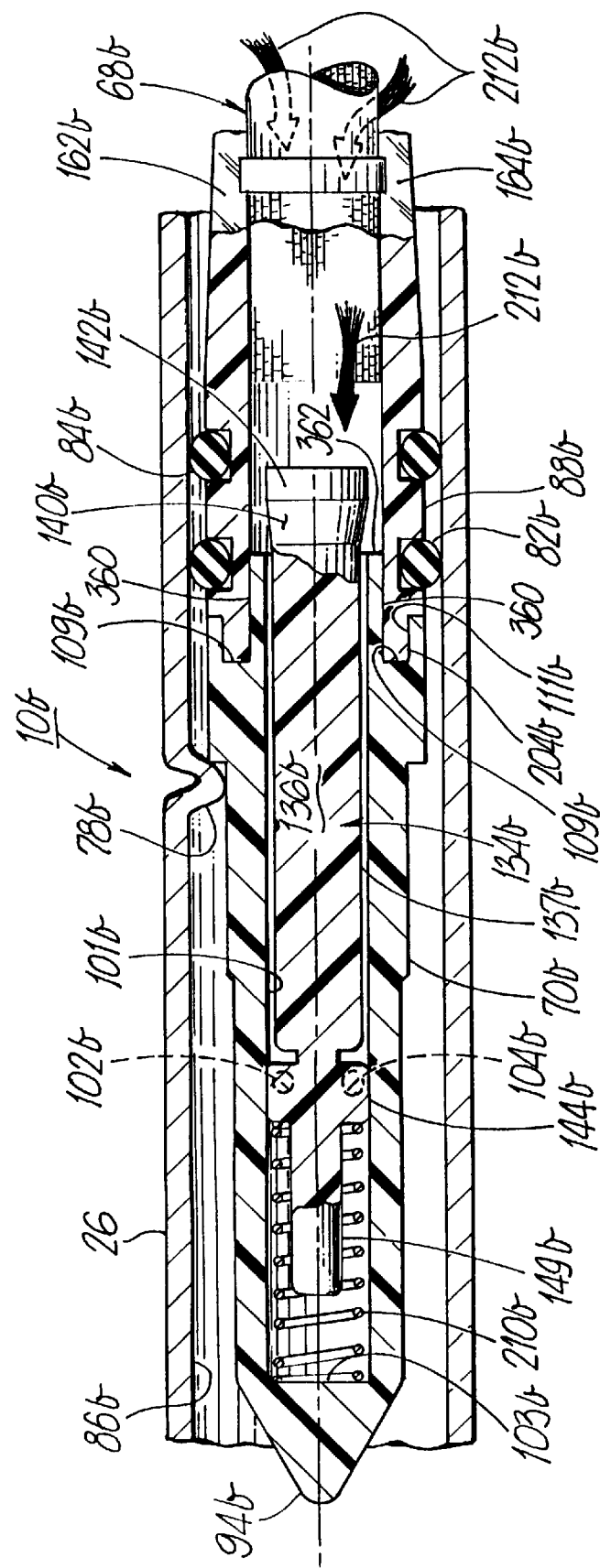
FIG. 29 is a view similar to that of any of FIGS. 15, 16, 27 or 28 but illustrating a modification thereof.

FIG. 29 illustrates an other modification of the invention. In FIG. 29 all elements which are like or similar to, for example, those of FIG. 15 are, with possible noted exceptions, identified with like reference numbers provided with a suffix "b".

The general operation of the embodiment of FIG. 29 may be assumed to be as that of, for example, heretofore described operations of the embodiments of FIGS. 15 and 16. The distinctions that are shown to exist, for example, as between the modified embodiment of FIG. 29 and the embodiment of FIGS. 15 and 16 are, generally, as follow.

The embodiment of FIG. 29 does not employ an intermediate metering sleeve as does the embodiment of FIG. 15 at 120 thereof. Instead, in FIG. 29, the housing 70b somewhat slidably receives the elongated body 136b so that, in effect, the housing 70b cooperates with the valving member 134b in metering fluid flow through the annular space defined between cylindrical surface 101b, of housing 70b, and the cylindrical surface 137b of the valving member 134b.

A review of the embodiment of FIG. 29, shows that the housing 70b is preferably formed with an axially extending cylindrical portion 360 the annular end 362 thereof functioning with respect to the tapered metering surface 140b and cylindrical surface 142b in the manner already heretofore described as with respect to FIGS. 15 and 16.

The valve housing 70b may be secured to the filter inlet assembly 68b by or through any suitable means. For example, the cylindrical extension 204b of the filter inlet assembly 68b may be suitably received in the radial space from 360 to 111b and axially abutted against annular wall 109b.

The flow of fluid, because of clearances and as previously described as with respect to FIGS. 15 and 16, will flow out of passages as 102b and 104b and from there flow through the outer conduit in its flow to the evaporator 18 FIG. 1.

Figure 30:
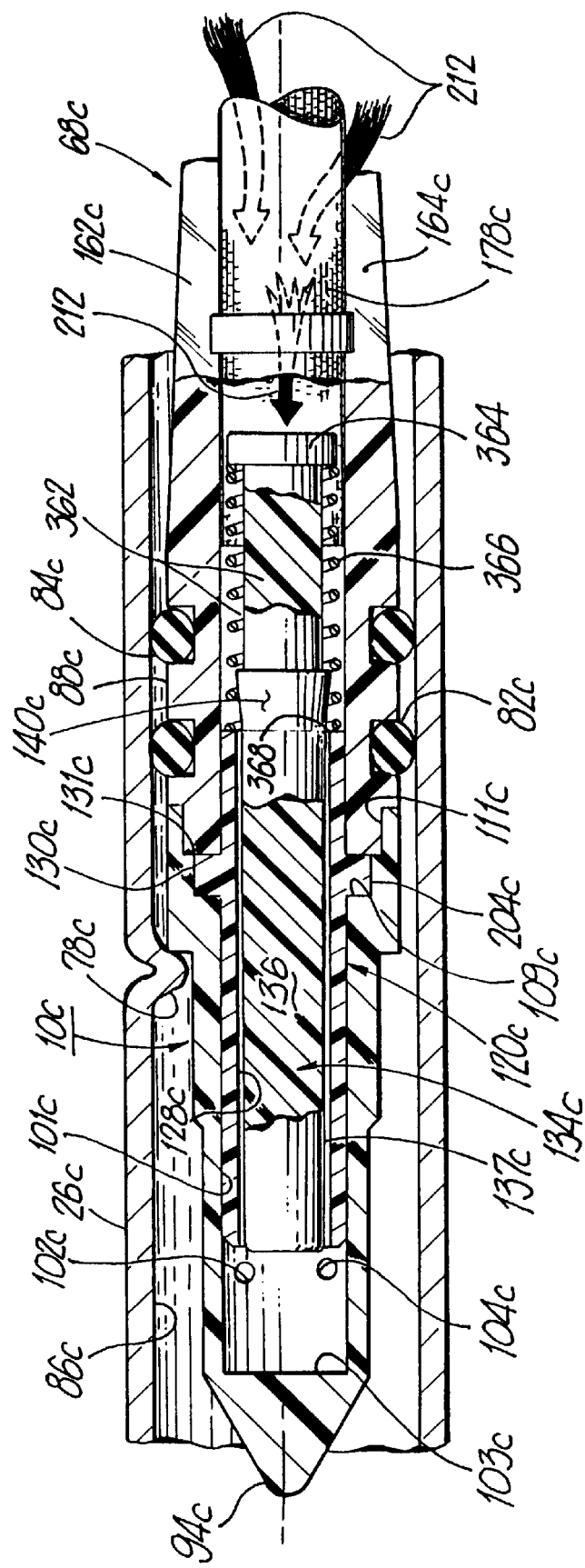
FIG. 30 is a view similar to that of FIG. 29 but depicting an other modification of the valving assembly of the invention.

FIG. 30 illustrates another modification of the invention and is in some respects similar to the embodiment of, for example, FIG. 15. The elements in FIG. 30 which are like or similar to those of FIG. 15, with possibly noted exceptions, are identified with like reference numbers provided with a suffix "c".

In the embodiment of FIG. 30, the fluid flow will occur in and through the annular clearance between opposed spaced cylindrical surfaces 128c and 137c and, eventually such fluid will flow out through ports or passages 102c and 104c into the conduit 26c from where it flows downstream to the evaporator 18 of FIG. 1.

In the main, the modified valving assembly 10c differs from the previously disclosed assemblies in that the valve member 134c is provided with a body-like axial extension 362 which may be integrally formed with and to the remainder of the valve assembly 134c. As generally depicted, the outermost projecting end of body portion 362 is provided with suitable abutment means 364 which may be integrally formed with body 362 or suitably secured thereto. A coiled compression spring 366 situated generally about the body 362 has one end situated against an axially non-moving bushing-like member 120c and has its other spring-end situated against the spring abutment or perch 364. In the embodiment of FIG. 30 the resilient means 366 continually resiliently urges the body 362 to the right (viewed in FIG. 30) and seeks to axially position the contoured valving surface 140c in a most wide open flow position.

As previously disclosed as with regard to the embodiment of FIGS. 27 and 28, as the upstream pressure depicted by arrows 212—212 increases, with a consequent increase in force, the flow of such increased pressure fluid will bear against the end member or end means 364 to start to urge the body 362 to the left, against the resilient resistance of the spring means 366. At this time, of course, an increment of axial movement to the left by body 362 results in the same increment of axial movement of the valve body 136 and tapered or contoured valving surface 140c resulting in a reduction of annular area between annular metering edge 368 and the tapered or contoured valving surface 140c.

It should, of course, be understood that as the valving surface 140c is being moved from its most wide-open position toward its most nearly closed position, that the fluid, represented by arrows 212—212, would not only impinge upon end member or end surface 364, but also flow around member 364 through the radially outward clearance and then flow through the annular opening defined by metering edge 368 and juxtaposed contoured metering surface 140c. The fluid would then flow through the annular space between the inner cylindrical surface 128c and the outer cylindrical surface 137c and after exiting such flowing through passage 102c and 104c into conduit 26c and from there continuing downstream to the evaporator means 18 of FIG. 1.

Figure 31:
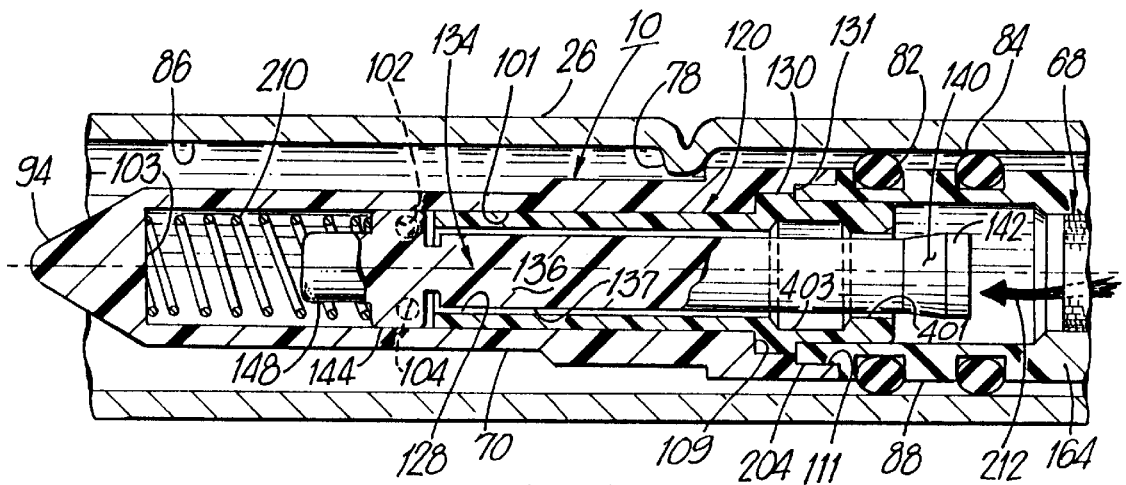
FIGS. 31, 32 and 33 are views similar to each other and to, for example, FIGS. 29 and 30 wherein each of FIGS. 31, 32 and 33 depict an other modified valving structure, employing teachings of the invention, with the movable elements thereof being shown in differing operating positions.
Figure 32:
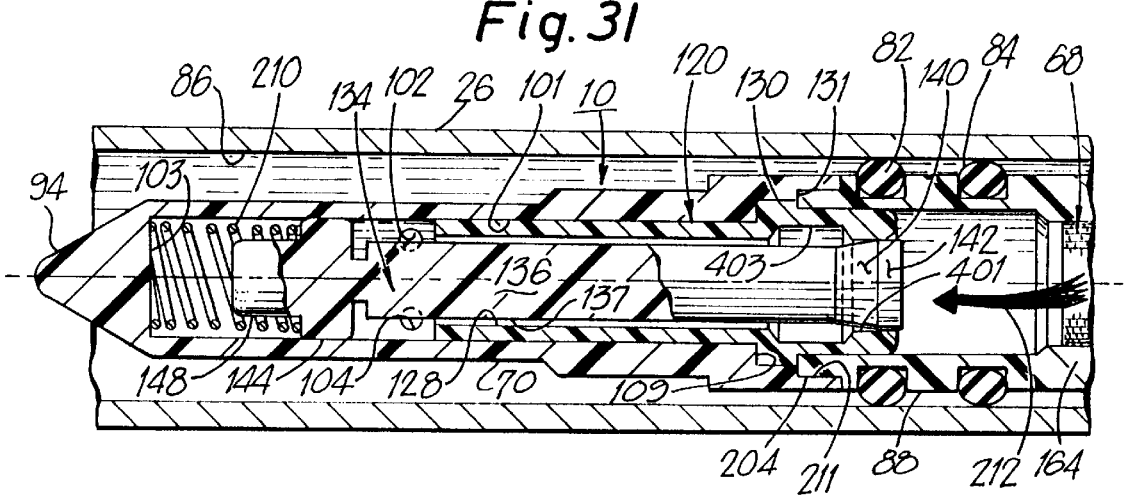
Figure 33:
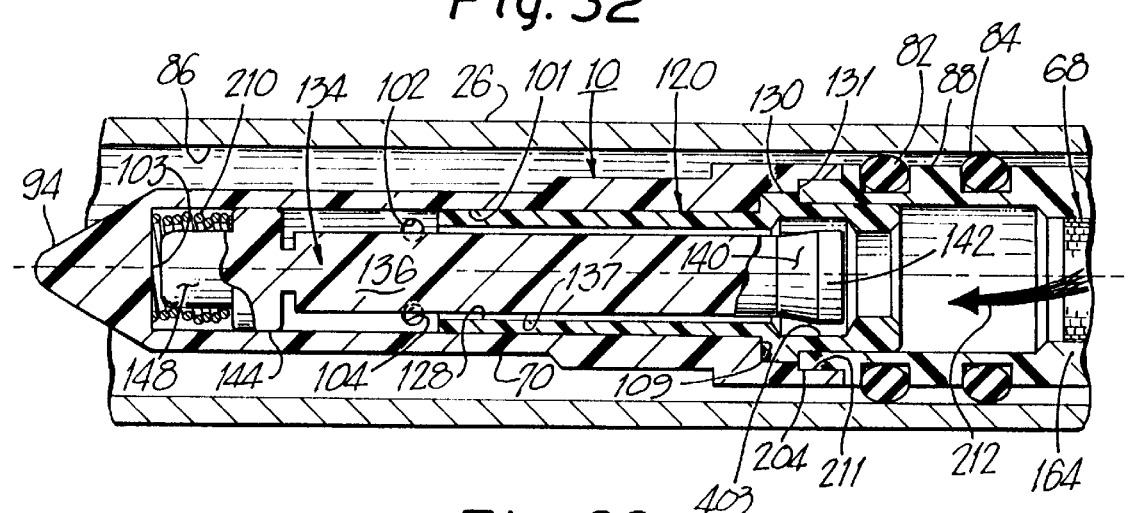

FIGS. 31, 32 and 33 illustrate a valving assembly much as those hereinbefore disclosed as at FIGS. 15, 16, 27, 28, 29 and 30. Elements in FIGS. 31, 32 and 33 which are like or similar to, for example, FIG. 15 are identified with like reference numbers, except as may be noted to the contrary.

Referring to FIG. 31, the position of the valving member 134 may be considered functionally equivalent to that of FIG. 15. That is, the valve member 134 is in its most open position and the force generated by the upstream fluid pressure (212) is insufficient to move valving member 134 to the left against the resilient resistance of spring means 210.

When the upstream fluid pressure (212) sufficiently increases, the contoured valving surface and portion 142 slidingly pass into a coacting metering passage or orifice 401 carried as at the end of valve body or housing 120. This, as previously explained with reference to FIGS. 15 and 16 produces a minimum flow path (between 140, 142 and 401) for the upstream fluid.

Even though such occurrences may be considered somewhat rare, nevertheless they do occur. That is, the return or biasing spring means 210 may experience failure. At that time, if the metering valve member 134 were to remain in a position resulting in either a minimum flow of fluid therepast, or the compressor 14 (FIG. 1) especially at high load high speed would be effectively starved of fluid resulting, most probably, in such compressor 14 being damaged.

Therefore, the modification of the invention as shown in FIGS. 31, 32 and 33 provides what may be considered as an enlarged cylindrical chamber 403. Consequently, if the biasing spring 210 were to fail, as generally depicted in FIG. 33, the force of the upstream pressure (212) would move the valving member 134 as to a position generally shown in FIG. 33 whereby the contoured valving surface 140 and surface 142 would be situated generally within such chamber 403. As can be seen in FIG. 33, such a location of 140 and 142 does not restrict the rate of flow of the fluid to a rate less than the annular space between surfaces 128 and 137 permits because the flow merely passes through the radially outermost portion of bypass chamber 403 and around 142 and 140. Consequently, a maximum flow of such fluid is achieved and the compressor 14 is saved from becoming damaged. This re-opening feature, if desired, could also be utilized at abnormally high pressure differentials.

Figure 34:
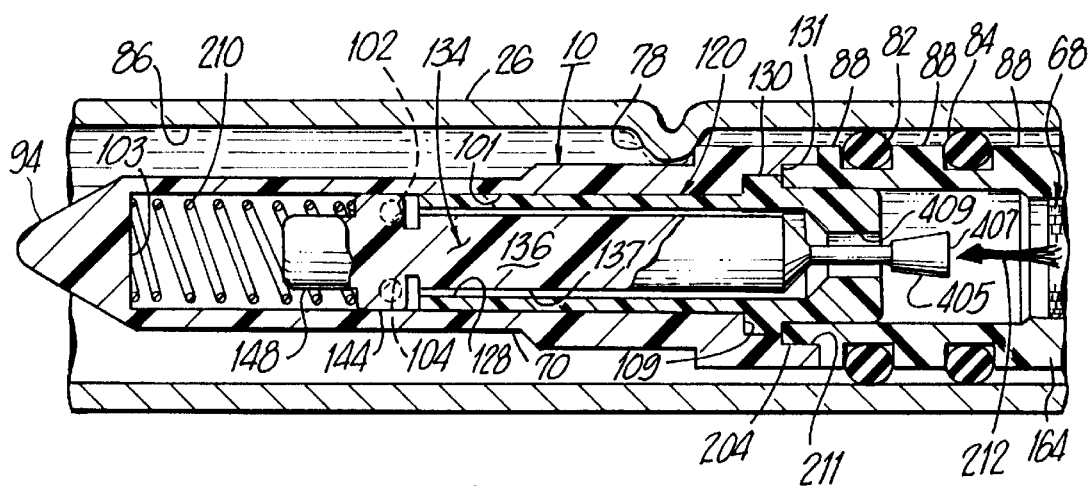
FIGS. 34, 35 and 36 are also views similar to each other and to, for example, FIGS. 31, 32 and 33 wherein each of FIGS. 34, 35 and 36 depict an other modified valving structure, employing teachings of the invention, with the movable elements thereof being shown in differing operating positions.
Figure 35:
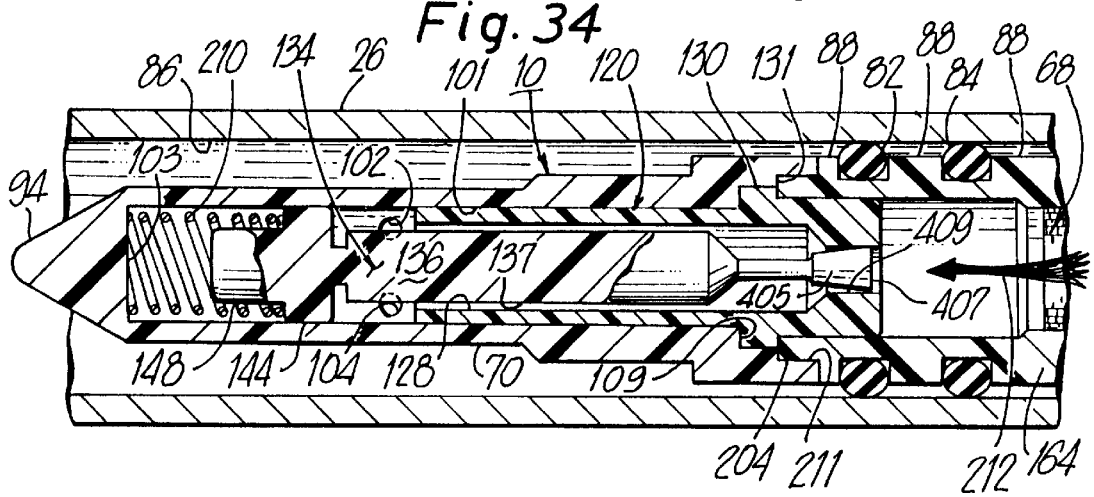
Figure 36:
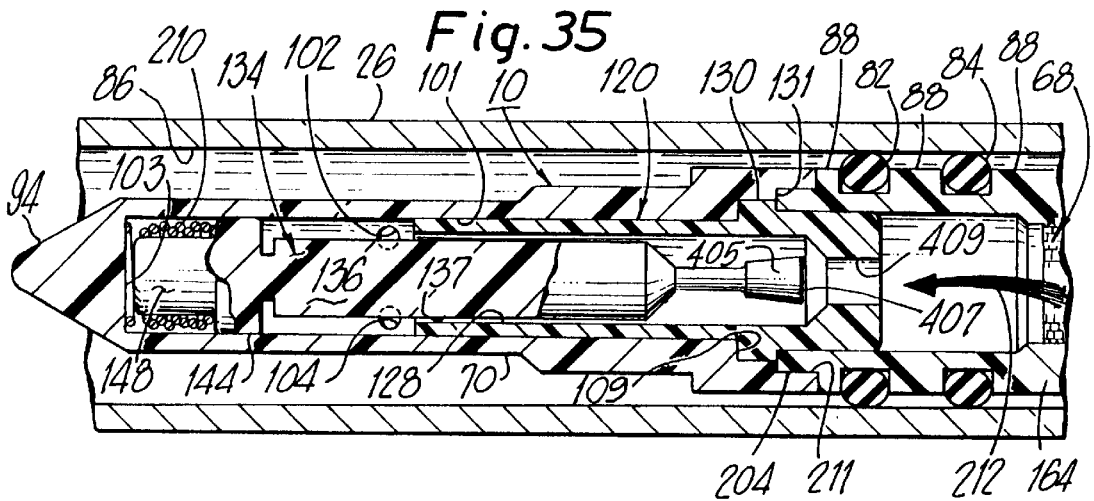

FIGS. 34, 35 and 36 disclose an other modification of the invention wherein such modification is primarily concerned with the problem as described with regard to FIGS. 31, 32 and 33. Elements in FIGS. 34, 35 and 36 which are like or similar to, for example, FIG. 15 are identified with like reference numbers, except as may be noted to the contrary.

Referring to FIG. 34, the position of the valving member 134 may be functionally equivalent to that of either FIG. 15 or FIG. 31. That is, the valve member 134 is in its most open position and the force generated by the upstream fluid pressure (212) is insufficient to move valving member 134 to the left against the resilient resistance of spring means 210.

When the upstream fluid pressure (212) sufficiently increases, the contoured valving surface 405, of valve member 407, slidingly passes into a coacting metering passage or orifice 409 carried as at the end of valve body or housing 120. This, as previously explained with reference to FIGS. 15 and 32 produces a minimum flow path (between 409 and 405) for the upstream fluid.

Even though such occurrences may be considered somewhat rare, nevertheless they do occur. That is, the return or biasing spring means 210 may experience failure. At that time, if the metering valve member 134 were to remain in a position resulting in either a minimum flow of fluid therepast, or, the compressor 14 (FIG. 1) especially at high speed high load conditions would be effectively starved of fluid resulting, most probably, in such compressor 14 being damaged.

Therefore, as in FIGS. 31, 32 and 33, the modification of the invention as shown in FIGS. 34, 35 and 36 provides what may be considered as an enlarged cylindrical chamber 128 which, in the embodiment shown, actually slidably contains the valving member 134. Consequently, if the biasing spring 210 were to fail, as generally depicted in FIG. 36, the force of the upstream pressure (212) would move the valving member 134 as to a position generally shown in FIG. 36 whereby the contoured valving surface 405 would be situated generally within such chamber 128. As can be seen in FIG. 36, such a location of valving portion 405 does not restrict the rate of flow of fluid to a rate less than the annular space between surfaces 128 and 137 permits because the flow merely passes through the radially outermost portion of the chamber 128 and around valving portion 405. Consequently, a maximum flow of such fluid is achieved and the compressor 14 is saved from becoming damaged.

FIGS. 37–54 depict respective modifications which can be made to the various valving assemblies of the invention hereinbefore disclosed.

For ease of disclosure, let it be assumed that the fragmentarily shown valve housings or valve metering bodies, i.e., (a) 410 in FIGS. 37 and 38; (b) 412 in FIGS. 39 and 40; (c) 414 in FIGS. 41 and 42; (d) 416 in FIGS. 43 and 44; (e) 418 in FIGS. 45 and 46; (f) 420 in FIGS. 47 and 48; (g) 422 in FIGS. 49 and 50; (h) 424 in FIGS. 51 and 52; and (i) 426 in FIGS. 53 and 54 may, for sake of better understanding, be considered as sequentially comprising the valve housing or valve metering body as at 120 of FIG. 15 or in fact such appropriate body 70b as in FIG. 29.

In FIGS. 37–54 elements which are the same or functionally the same as in preceding Figures are identified with like reference numbers. However, some of such like reference numbers are provided with varying suffixes as to still better distinguish such elements as between and among FIGS. 37–54.

Each of the valve configurations in FIGS. 37–54 provide for differing flows or paths of flow of fluid through the valving assembly.

In FIGS. 37 and 38 the main slidable body 136K of the overall valving member 134K is formed as to be rectangular in cross-section as shown in FIG. 38. It should be mentioned, even though such is already suggested by the structure per se, that all of body 136K, 136L, 136M, 136N, 136P, 136Q, 136R, 136S and 136T, even though closely fitted to their respective passages 128—128 are nevertheless readily slidable in such respective passages.

Still referring to FIGS. 37 and 38, the main body 136K of the overall valving member 134K is formed to be generally rectangular thereby defining a first pair of cross-sectional substantially equal fluid flow passages 500 and 502. At the same time the rectangular body 134K defines a second pair of cross-sectional substantially equal fluid flow passages 504 and 506.

In FIGS. 39 and 40 the main body 136L of the overall valving member 134L is formed to be generally trapezoidal thereby defining a first pair of cross-sectional substantially equal fluid flow passages 508 and 510. Another fluid flow passage, of a cross-sectional flow area greater than flow passages 508 or 510, is defined at 512, while a largest flow passage is defined at 514.

In FIGS. 41 and 42 the main body 136M of the overall valving member 134M is formed to have a cross-sectional configuration much approaching that of a cross-section of an ax head. A relatively small cross-sectional area flow passage 516 exists generally above the body 136M. Also, a pair of cross-sectional substantially equal fluid flow passages 518 and 520 are generally on either side of the member 136M.

In FIGS. 43 and 44 the main body 136N of the overall valving member 134M is formed to have a cross-sectional configuration much approaching the configuration of an ellipse which, in turn, defines two flow passages 522 and 524 which are generally equal in cross-sectional flow area and have a generally crescent configuration.

In FIGS. 45 and 46 the main body 136P of the overall valving member 134P is formed to have a hexagonal cross-sectional configuration. As between passage 128 and the respective six sides of the hexagonal body respective fluid passages 526, 528, 530, 532, 534 and 536 are formed.

In FIGS. 47 and 48 the main body 136Q of the overall valving member 134Q is formed to have an octagonal cross-sectional configuration. As between passage 128 and the respective eight sides of the octagonal body, respective fluid passages 538, 540, 542, 544, 546, 548, 550 and 552 are formed.

In FIGS. 49 and 50 the main body 136R of the overall valving member 134R is formed to have a square cross-sectional configuration. As between passage 128 and the respective four sides of the square body, respective fluid passages 554, 556, 558 and 560 are formed.

In FIGS. 51 and 52 the main body 136S of the overall valving member 134S is formed to have a triangular cross-sectional configuration. As between passage 128 and the respective three sides of the triangular body, respective fluid passages 562, 564 and 566 are formed.

In FIGS. 53 and 54 the main body 136T of the overall valving member 134T is formed to have a somewhat cross-like configuration preferably wherein the arms of such configuration at least approach being sectors or segments of an ellipse. As between passage 128 and pairs of respective arms of the member 134T, respective fluid passages 568, 570, 572 and 574 are formed.

FIG. 55 depicts an other modification of the invention. All elements which are like or similar to, for example, FIG. 15 or any of FIGS. 37–54 are, in the main, identified with like reference numbers provided with a suffix In FIG. 55 as the valving member 136X moves generally to the left (as shown in the drawings) the fluid flows as between the orifice 401X and the contoured surface 140X, as generally depicted by the arrows in chamber 128X from where such fluid flows through initially separated passages or conduits 600, 602 and merge into a single conduit 604. The fluid thusly flowed passes out into the surrounding structure (as conduits 26 shown in previous Figures) and urges movement to the left by valve member 136X. The compression biasing spring 210X, of course, extends to a cooperating spring perch as previously disclosed.

The elements of FIGS. 58 and 59 are, for the most part, as those of FIG. 15. To the extent necessary reference numbers are applied to FIGS. 58 and 59 and such reference numbers as are employed are from the structure of FIG. 15 and from the elements thereof which are like or similar to those of FIGS. 58 and/or 59. The housing 70 extends to 630, which is cylindrical. The portion to the right is also provided with a housing which extends to 632 and which also is cylindrical. The generally tubular valve housing or body 634 has a cylindrical radially extending flange 636 which is received between juxtaposed ends 638 and 640 of members 630 and 632, respectively. A band 642 matching in configuration to that of 630, 638, 636, 640, 642 and 632 is applied, as depicted and wrapped about 10. The band 640 and cooperating elements may be joined as by suitable cement or, for example, by ultrasonic welding.

The apparatus of FIGS. 58 and 59 further differs by having transversely extending abutment means 175 and 177 operatively carried as by the portion 172.

Figure 60:
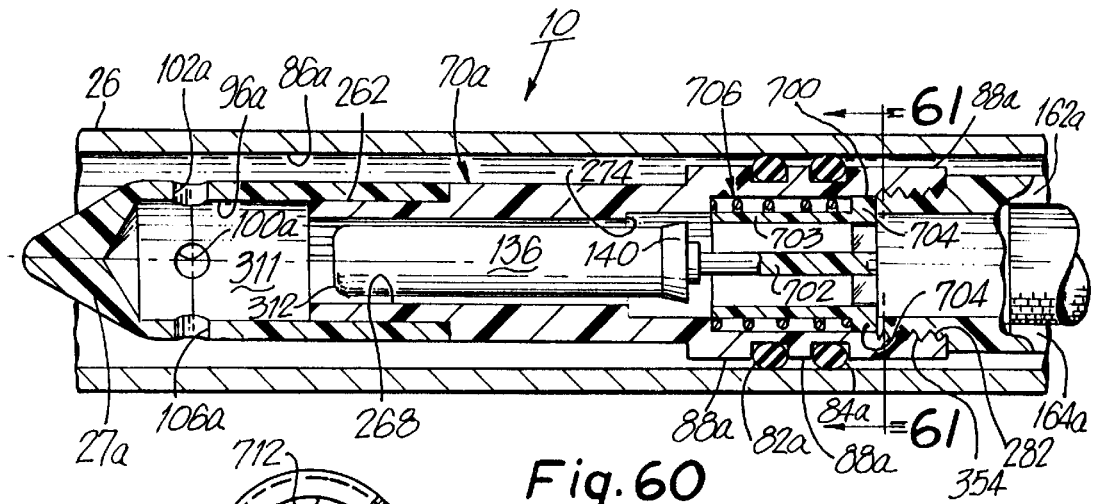
FIG. 60 is an axial cross-sectional view of yet an other modification of the invention.
Figure 61:
FIG. 61 is an elevational view of an element in FIG. 60, taken generally on the plane of line 61—61 and looking in the direction of the arrows.

FIGS. 60 and 61 disclose a further embodiment of the invention. In FIGS. 60 and 61 any elements which are like or similar to those of either FIGS. 15 or 27 are identified with like reference numbers except where noted to the contrary.

Referring in particular to FIGS. 60 and 61, a cup-like member 700 of generally cylindrical configuration is operatively carried by the valving member 136 as by a medially situated extension 702 suitably connected to the cup-like member 700.

The cup-like member 700 has an axially extending cylindrical wall 703 which at its right-most end (viewed in FIG. 61) has a radially outward portion 704 which engages the biasing spring 706. When the fluid flows toward the valving member 136 it to some degree strikes the cup-like member at its top portion 708 and flows through the apertures 710, 712, 714 and 716. As such flow continues the biasing spring 706, although undergoing deflection is otherwise protected by the cylindrical tubular portion 703 as it progresses to the left as viewed in FIG. 61.

Figure 62:
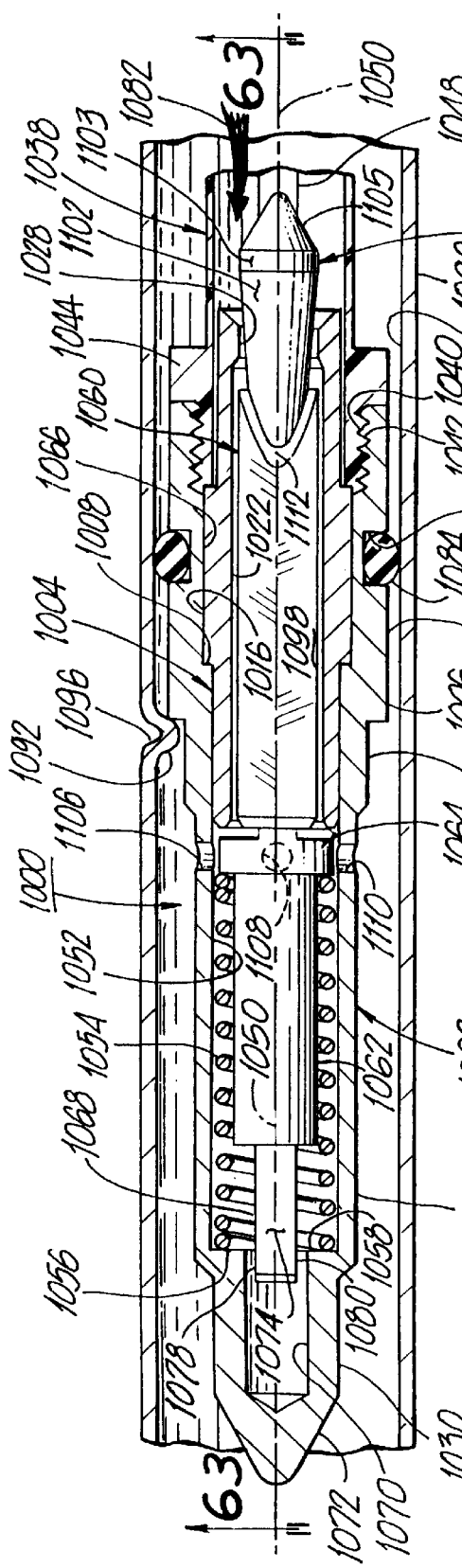
FIG. 62 is a view similar to, for example, FIG. 27 showing, in axial cross-section, an other valving assembly employing teachings of the invention.
Figure 63:
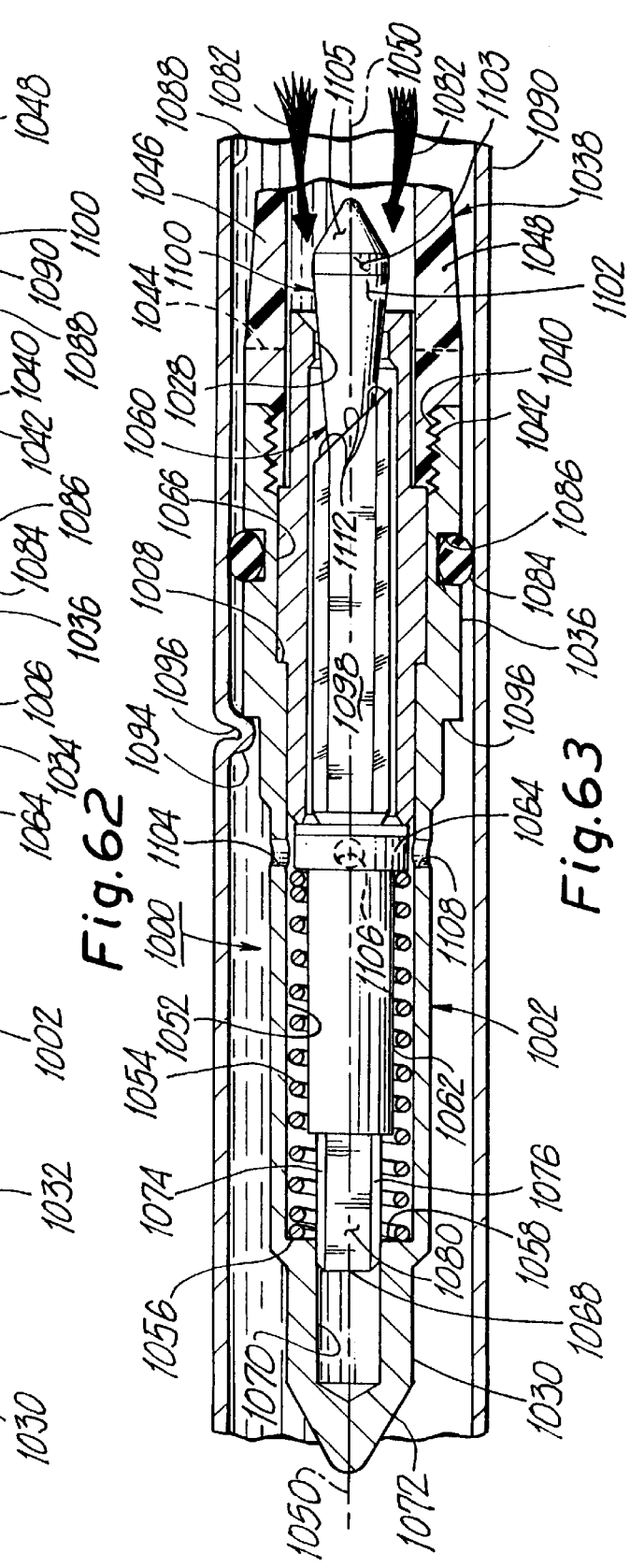
FIG. 63 is a cross-sectional view taken generally on the plane of line 63—63 of FIG. 62 and looking in the direction of the arrows.

Referring primarily to FIGS. 62 and 63, the valving assembly 1000, employing teachings of the invention, is shown as comprising a valve housing 1002 closely receiving therein a cylindrical bushing or sleeve 1004 in a manner whereby a radially outwardly extending annular flange portion 1006 is operatively abutting against a cooperating annular seat 1008 carried by the housing 1002.

Figures 68, 69:
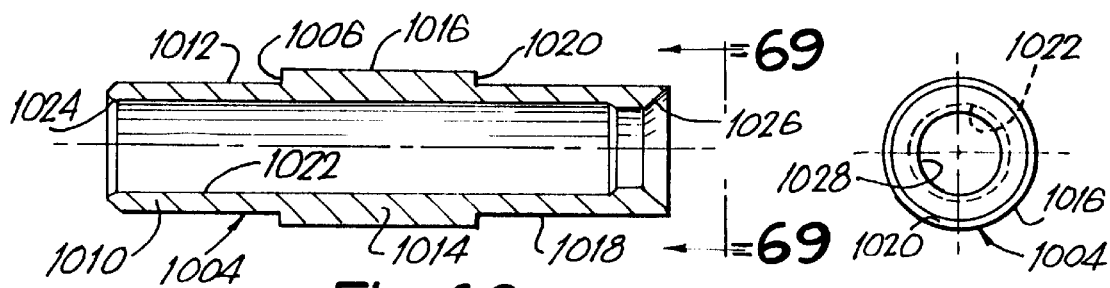
FIG. 68 is an axial cross-sectional view of one of the elements shown in FIGS. 62 and 63.
FIG. 69 is an elevational view taken generally on the plane of line 69—69 of FIG. 68 and looking in the direction of the arrows.

FIGS. 68 and 69 illustrate, in greater detail, the preferred embodiment of bushing or sleeve 1004 as comprising a generally tubular body 1010 having a first outer cylindrical surface 1012 which axially terminates as at the annular flange portion 1006 which is carried as by a relatively diametrically enlarged body portion 1014 which, also, has an outer cylindrical surface 1016.

Similarly, body 1010 has a second outer cylindrical surface 1018 which axially terminates as at an annular flange portion 1020 which is carried as by the enlarged body portion 1014.

Preferably, a cylindrical passage 1022 is formed through body portion 1010 as to have a first open end 1024 and a second open end 1026. In the preferred embodiment, the right portion (as viewed in FIG. 68) of the bushing or sleeve 1004 is provided with a cylindrically necked-down (i.e., diametrically reduced as compared to the remainder of passage 1022) portion or surface 1028.

Referring again to FIGS. 62 and 63, the housing 1002 is shown as comprising a first generally cylindrical housing or body portion 1030 preferably integrally formed with a second relatively diametrically enlarged axially extending generally cylindrical housing or body portion 1032 which, in turn, is preferably integrally formed with a third diametrically relatively enlarged axially extending body or housing portion 1034 which, as generally depicted is, in turn, preferably integrally formed with a fourth diametrically relatively enlarged axially extending body or housing portion 1036. The right end (as viewed in FIGS. 62 and 63) of housing 1002 is shown suitably operatively connected to an inlet filter assembly 1038 (shown fragmentarily). The filter assembly 1038 may be as that disclosed, for example, in FIGS. 2, 3, 13 and 14 or as disclosed, for example, in FIGS. 25, 26, 27 and 28. For purposes of disclosure, the inlet filter assembly 1038 may be considered as being as that shown in FIGS. 25–28.

In the embodiment of FIGS. 62 and 63, the shown right end of housing or body means 1002 is provided with an internally formed threaded portion 1040 which threadably coacts with a tubular outer threaded portion 1042 carried as by a generally cylindrical end wall 1044. As also generally depicted in FIGS. 25–28, the inlet filter assembly 1038 is similarly provided with a pair of generally longitudinally extending ribs or body portions 1046 and 1048 which are preferably molded as to each be integrally formed with and to the cylindrical end wall 1044 which extends transversely of the axis 1050 of the inlet assembly 1000.

The various elements, details and relationship thereof, in FIGS. 62 and 63 will be considered as such are also described relative to the assembling thereof into the assembly as depicted in FIGS. 62 and 63.

The general sequence of assembly could be as follows. That is, a preferably cylindrical passage 1052, formed axially as in body portion 1032, may first receive therein a coiled compression spring 1054 having one end 1056 in operative abutting relationship to a generally annular end wall 1058 at the shown left end of passage 1052.

Next, the piston-valve 1060 could be inserted in a manner whereby the spring 1054 would become piloted about axial extension 1062 and axially contained between the diametrically enlarged portion 1064 and end wall 1058. Thereafter, the sleeve or bushing 1004 is slid about and axially along the piston-valve 1060 and along the inner surfaces 1052 and 1066 of valve housing 1002 until annular flange 1006 abuts against annular stop means 1008. As generally depicted, housing inner surface portion 1052 closely receives cylindrical surface 1012 of sleeve 1004 while, preferably, housing inner surface portion 1066 closely receives cylindrical surface 1016 of bushing 1004. Then the inlet filter assembly 1038 is threadably secured to the shown right end of valve housing 1002 by threadable coaction of housing thread 1040 and filter assembly thread 1042 and, in so doing, the end of the tubular threaded portion of inlet assembly 1038 axially bears against annular abutment surface 1020 and urges the sleeve or bushing 1004 to the left (as viewed in FIG. 62 and 63) locking such bushing 1004 axially against annular abutment 1008 of valve housing 1002.

The pressure responsive piston 1060, in the preferred embodiment, comprises an axially extending portion 1068 which is slidably received by a cooperating axially extending chamber 1070 formed in housing portion 1030 which is preferably provided with a generally outer end tapered surface 1072.

In the preferred embodiment, the surface of chamber 1070 is axially circularly cylindrical and extension 1068 is provided with opposite sectors 1074 and 1076 which have cylindrical curvature slidably received by the axially extending surface of chamber 1070. Further, it is preferred that flow venting means be provided functionally as between chamber 1070 and extension 1068. In the embodiment disclosed, such venting means is effectively provided by flatted surfaces 1078 and 1080 formed on the extension 1068. The venting could be provided by other arrangements as, for example, longitudinally extending grooves or recesses in the side wall of chamber 1070 and/or the radially outer surfaces of extension 1068. In view of the foregoing and the related drawing Figures, it should be apparent that as valving structure 1060 moves to the left, as viewed in FIGS. 62 and 63, the extension 1068, serving as a guide-like support, moves axially into the chamber 1070. In so doing the extension or guide 1068 displaces some of the volume of fluid, or the like, within chamber 1070 and because of the flow spaces provided as between flatted surfaces 1078 and 1080 and the juxtaposed portions of the cylindrical surface of chamber 1070 no significant hydraulic resistance need be experienced by valving apparatus 1060 and extension 1068 carried thereby.

Referring to FIGS. 62 and 63, the arrows 1082 depict the flow of, in this illustration, refrigerant. The arrows 1082, as drawn, represent such fluid flow as has already passed, from an area upstream, through the filtering element or elements of the inlet filter assembly 1038 and flowing toward the inlet of the piston or valving means of the assembly 1000. The refrigerant is, of course, prevented from flowing generally about and past valve assembly 1000 because of O-ring 1084 carried as by a groove 1086 circumferentially formed in housing portion 1036 whereby such O-ring 1084 forms a fluid seal with both housing portion 1036 and the inner surface 1088 of an outer generally main conduit 1090.

The assembly 1000 is prevented from moving downstream by having such assembly 1000 operatively engage suitable abutment or stop means which may be considered as being typically shown at 1092 and 1094. The stop means 1092 and 1094 are each depicted as operatively engaging, in an abutting relationship, a flange-like portion 1096 of the housing portion 1036.

The valving or piston means 1060 is illustrated as comprising a longitudinally extending main body 1098 which carries an axially extending valving head 1100 which cooperates with passage 1028 in determining an annular area of flow therebetween for the fluid depicted by arrows 1082. In the preferred embodiment, the main valve body 1098, when viewed in axially transverse cross-section, defines a hexagonal configuration with the apexes, formed by adjoining longitudinally extending sides of the body 1098, being closely received by and yet axially movable relative to the inner cylindrical surface 1022 (FIG. 68).

The relatively higher pressure of the refrigerant (represented by arrows 1082) causes a pressure differential generally axially across valve or piston means 1060, including portion 1062, which urges valving means or structure 1060 to the left as viewed in FIGS. 62 and 63. As such valving member 1060 thusly moves to the left, the generally conical or tapered valving surface or portion 1102, of the valving head 1100, becomes axially moved relative to metering passage 1028 thereby reducing the effective annular area for flow as between valving head 1100 surface 1102 and metering passage 1028.

Upon continued movement of the valving member 1060 to the left, the tapered valving surface continues to function generally as an increasing flow restrictor and continues to decrease the rate of flow of said refrigerant because of the increasing closure of the passage 1028 by the generally conical surface 1102. All of this time, of course, the resilient means 1054, shown as being a coiled compression spring, provides an increasing resilient resistant force axially against valving member 1060 and against the movement thereof by said upstream refrigerant 1082. Whatever fluid flow is experienced through the effective flow area of passage 1028, is flowed generally longitudinally or axially as between valve body 1098 and juxtaposed passage 1022 (also see FIG. 68).

Whatever flow of refrigerant occurs, for example starting with the valving or metering head 1100 being in a maximum opened condition, as generally depicted, and continuing through the axially changing position of the valving member 1060 until it reaches its maximum closed condition, whatever refrigerant flow is experienced past valve member 1060 is, in turn, exhausted through apertures or passages 1104, 1106, 1108 and 1110 formed through housing 1002, for further downstream flow through conduit 1090.

When the generally cylindrical member or portion 1064 is in alignment or juxtaposition with apertures or passages 1104, 1106, 1108 and 1110, member 1064 permits, to a preselected degree, the venting or flow therethrough of the refrigerant as has flowed through the sleeve 1004.

When the valve 1060 is moved its maximum distance to the left, or approaches such maximum distance to the left, the cylindrical surface 1103 of the valving head 1100 moves into passage 1028 and produces the minimum annular flow area as between then coacting surfaces 1103 and 1028. Further, it is preferred that the valving head 1100 be provided with an upstream end or face portion 1105 which may be considered a lead portion of the piston or valve 1060. As depicted, the preferred configuration of such lead portion 1105 may be generally conical.

In those situations wherein, possibly, the valve body 1098 and valve head 1100 are caused to move to the left, as viewed in FIGS. 62 and 63, a distance such that the cylindrical metering surface 1103 not only moves into juxtaposition with coacting metering passage 1028 but actually passes through and moves out of such juxtaposition by moving axially to the left (viewed in FIGS. 62 and 63) as to be axially beyond such metering passage or orifice 1028. If the valve head 1100 were not provided with the extension 1105 and there was to be some lateral movement of the valve head 1100 (without extension or guide portion 1105) movement of the valve body 1098 might result in the valve head 1100, sans extension 1105, to become jammed as against the portion of the sleeve body, which provides for the passage 1028, and consequently not permit the valve body 1098 and its valve head 1100 (sans 1105) to be functionally operative. In the preferred embodiment, even if the valve head 1100 is moved to the left as hereinbefore described and surface 1103 passes out of registry with passage surface 1028 and even if the valve member 1060, at that time, is caused to move valve head 1100 somewhat laterally, the lead portion 1105 will still in part be received in passage 1028 and thereby enable the valve body 1098 and valve head 1100 to be moved to the right (as viewed in FIGS. 62 and 63) and have the valve head 1100 again pass through the passage 1028 to a position as generally depicted in FIGS. 62 and 63.

Further, still referring to FIGS. 62 and 63, the valve body 1098 is preferably provided with an angular surface 1112 which is generally transverse to the axis 1050 and formed as to at least appear to surround the tapered metering surface 1102 of the valve head 1100. An inclined surface as 1112 when acted against by fluid flow thereagainst produces a force tending to move or urge the valve body 1098 transversely at the end thereof where the inclined surface exists. This tendency then precludes lateral instability of the valve 1060 and eliminates any transverse rattling as might otherwise occur.

Figures 70, 71:
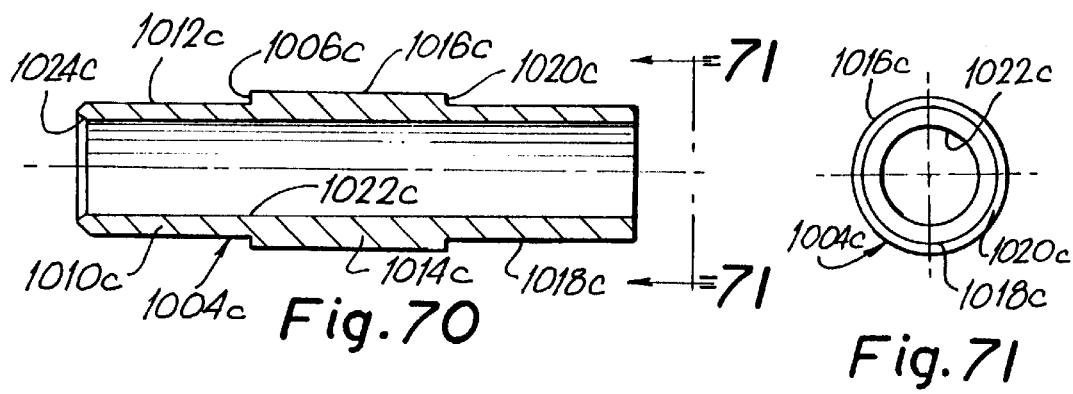
FIG. 70 is an axial cross-sectional view of one of the elements shown in FIGS. 64, 65, 66 and 67.
FIG. 71 is an elevational view taken generally on the plane of line 71—71 of FIG. 70 and looking in the direction of the arrows.

FIGS. 64 and 65 illustrate a still further embodiment of a valving assembly employing teachings of the invention. In FIGS. 64 and 65, such elements thereof which are like or functionally similar to those of FIGS. 62 and 63, except as may be noted to the contrary, are identified with like reference numbers provided with a suffix "C". The same applies to FIGS. 70 and 71. That is, except as may be noted to the contrary, all elements of the structure of FIGS. 70 and 71, as well as the structures, per se, of FIGS. 70 and 71 which are like or functionally similar to those of FIGS. 68 and 69 are identified with like reference numbers provided with a suffix "C".

The main difference between the structures of FIGS. 62 and 63 and FIGS. 64 and 65 resides in the piston or valve member. That is, in the embodiment of FIGS. 64 and 65 neither the valve head 1100 nor the ring-like metering surface 1028 are employed. Instead, the valving structure 1060c, which preferably has a main body 1098c of transverse hexagonal configuration, is provided with a valving end portion 1114 which, in the preferred embodiment comprises a first generally right cylindrical metering valve portion 1116 which, when the valving body 1098c undergoes movement to the left, as viewed in FIGS. 64 and 65, such first valving or metering portion 1116 coacts with the inner surface 1022c to meter the rate of flow of the fluid 1082c passing through the sleeve or bushing 1004c.

As shown in each of FIGS. 64 and 65 the valving end portion 1114 is preferably formed as to also comprise and carry a second right cylindrical metering valve portion 1118 of a diametrical dimension functionally larger than the diametrical dimension of metering or valving surface 1116. Consequently, when the valve main body 1098c and the valving end portion 1114 are made to move against the resilient resistance a distance sufficient to cause the relatively larger cylindrical metering portion 1118 to be introduced into passage 1022c of sleeve 1004c, the metering portion 1118 and the then juxtaposed portion of passage 1022c cooperatingly define an annular flow area which is smaller than that defined by the passage 1022c and valving surface 1116.

In view of the foregoing, it should be clear that the embodiment of FIGS. 64 and 65 provides an arrangement whereby two metering steps or ranges are available.

Figure 66:
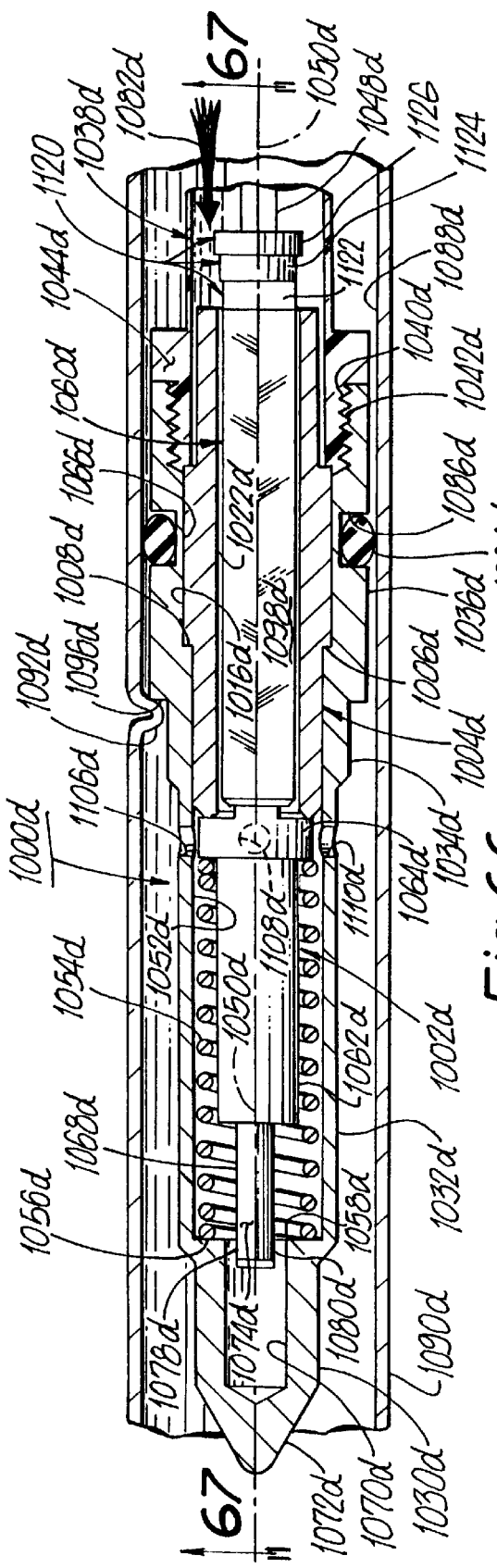
FIG. 66 is a view similar to, for example, FIG. 64 showing in axial cross-section, an other valving assembly employing teachings of the invention.
Figure 67:
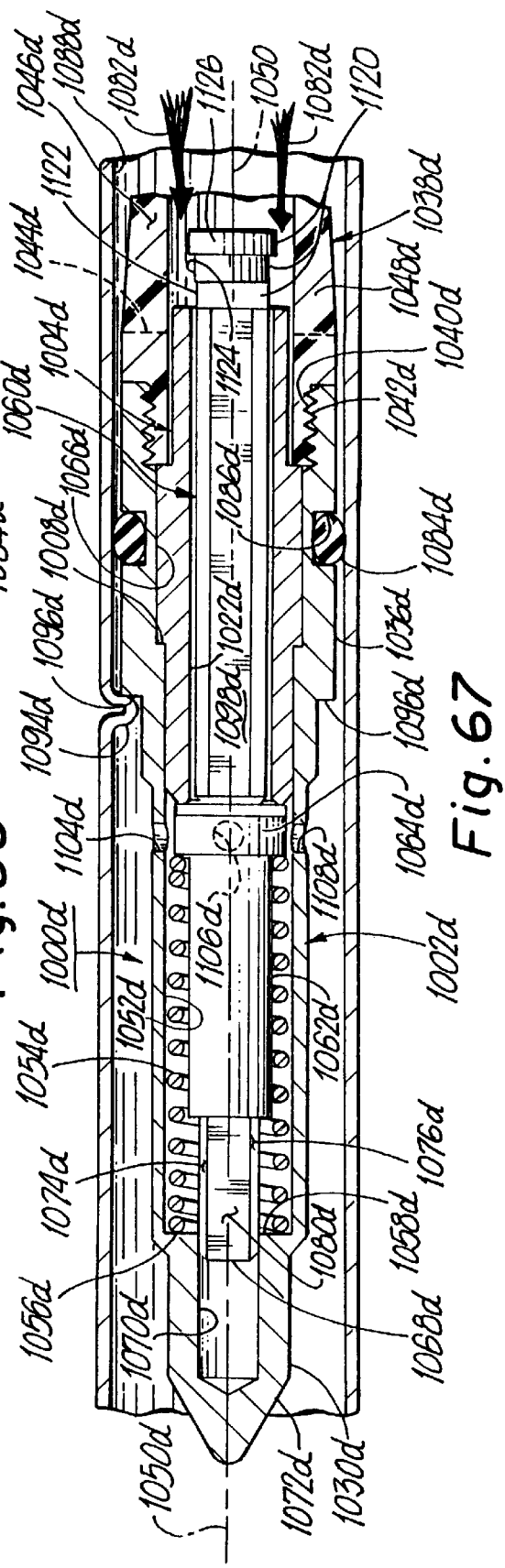
FIG. 67 is a cross-sectional view taken generally on the plane of line 67—67 of FIG. 66 and looking in the direction of the arrows.

FIGS. 66 and 67 illustrate yet another embodiment of a valving assembly employing teachings of the invention. In FIGS. 66 and 67, such elements thereof which are like or functionally similar to those of FIGS. 64 and 65, except as may be noted to the contrary, are identified with like reference numbers provided with a suffix "d".

The main difference between the structures of FIGS. 64 and 65 and FIGS. 66 and 67 again resides in the pressure responsive piston or valve member. That is, instead of the two step metering provided by valving end portion 1114 of FIGS. 64 and 65, the valving structure 1060d, which preferably has a main body 1098d of transverse hexagonal configuration, is provided with a valving end portion 1120 which, in the preferred embodiment comprises a first generally right cylindrical metering valve portion 1122 which, when the valving body 1098d undergoes movement to the left, as viewed in FIGS. 66 and 67 the first valving or metering portion 1122 coacts with the inner surface 1022d to meter the rate of flow of the fluid 1082d passing through the sleeve or bushing 1004d.

As shown in each of FIGS. 66 and 67 the valving end portion 1120 is preferably formed as to also comprise and carry a second right cylindrical metering valve portion 1124 of a diametrical dimension functionally larger than the diametrical dimension of metering or valving surface 1122. Consequently, when the valve main body 1098d and the valving end portion 1120 are made to move against the resilient resistance of spring 1054d a distance sufficient to cause the relatively larger cylindrical metering portion 1124 to be introduced into passage 1022d of sleeve 1004d, the metering portion 1124 and the then juxtaposed portion of passage 1022d cooperatingly define an annular flow area which is smaller than that defined by the passage 1022d and valving surface 1122.

Further, as shown in each of FIGS. 66 and 67 the valving end portion 1120 is preferably formed as to also comprise and carry a third right cylindrical metering valve portion 1126 of a diametrical dimension functionally larger than the diametrical dimension of metering or valving surface 1124. Consequently, when the valve main body 1098d and the valving end portion 1120 are made to further move against the resilient resistance of spring means 1054d a distance sufficient to cause the further relatively larger cylindrical metering portion 1126 to be introduced into passage 1022d of sleeve 1004d, the metering portion 1126 and the then juxtaposed portion of passage 1022d cooperatingly define an annular flow area which is smaller than that defined by the passage 1022d and valving surface 1124.

In view of the foregoing, it should be clear that the embodiment of FIGS. 66 and 67 provides an arrangement whereby three metering steps or ranges are available.

FIGS. 72–79 illustrate further embodiments of valving means employing teachings of the invention. For sake of clarity, the drawings of FIGS. 72–79 are of substantially increased scale. The modifications or embodiments disclosed in FIGS. 72–79 may be incorporated into any of the embodiments as in, for example: FIGS. 15, 23, 24, 27, 29, 30, 31, 34, 37, 38, 39, 40, 41, 42, 43, 44, 45, 46, 47, 48, 49, 50, 51, 52, 53, 54, 55, 58, 59, 60, 62, 64 and 66. For ease of disclosure, let it be assumed that the fragmentarily shown valve housings or valve metering bodies, i.e., (a) 1200 in FIGS. 72 and 73; (b) 1202 in FIGS. 74 and 75; (c) 1204 in FIGS. 76 and 77; and (d) 1206 in FIGS. 78 and 79, respectively, comprise the valve housing or valve metering body as at, for example, 120 of FIG. 15 or any of the valve bodies disclosed herein.

Figure 72:
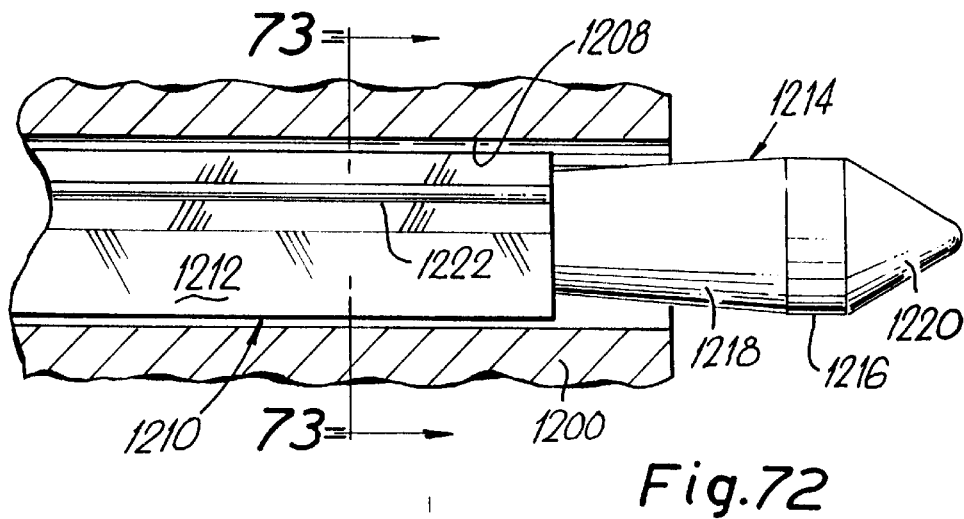
FIG. 72 is a generally axially extending cross-sectional view, in considerably enlarged scale, of a modified form of valving member and cooperating valving passage means with such valving member or valving body being shown in elevation with only a longitudinally fragmentary portion thereof being depicted.
Figure 73:
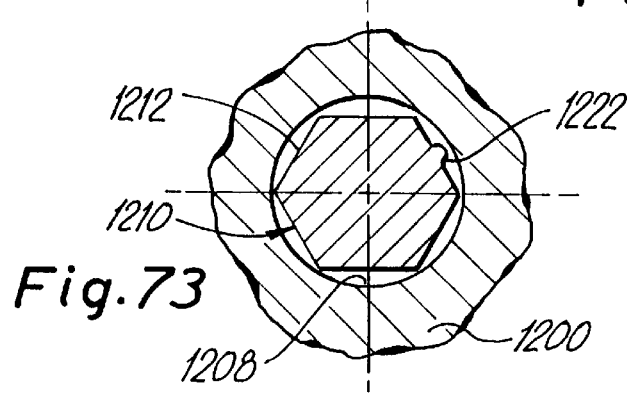
FIG. 73 is a cross-sectional view taken generally on the plane of line 73—73 of FIG. 72 and looking in the direction of the arrows.

In FIGS. 72 and 73 the housing or valving metering body 1200 has a flow passage 1208 which slidably receives a piston or valving member 1210 which has a main axially extending valve body 1212 which is depicted as being hexagonal in transverse cross-section. Even though not so restricted or limited, the valving member 1210 may also comprise a valve head portion 1214 having a first tapered metering portion 1218, a second cylindrical metering portion 1216 and a conical extension 1220 which may be equivalent to conical portion 1105 of FIGS. 62 and 63. In practicing the invention it may occur that the rate of fluid flow as between passage 1208 and valve body 1212 may be greater than deemed desirable. In such situations a filler may be provided to partially fill the available flow space as between the passage 1208 and valve body 1212. FIGS. 72 and 73 depict such filler as preferably comprising an elongated generally axially or longitudinally extending filler strip 1222 carried by the valve body 1212. In the embodiment shown, the filler strip 1222 is depicted as being integrally formed with the valve body 1212. However, it should be apparent that the filler strip 1222 may actually be a member separate from the valve body 1212 and suitably secured to valve body 1212 as by, for example, a suitable adhesive or cement.

Figure 74:
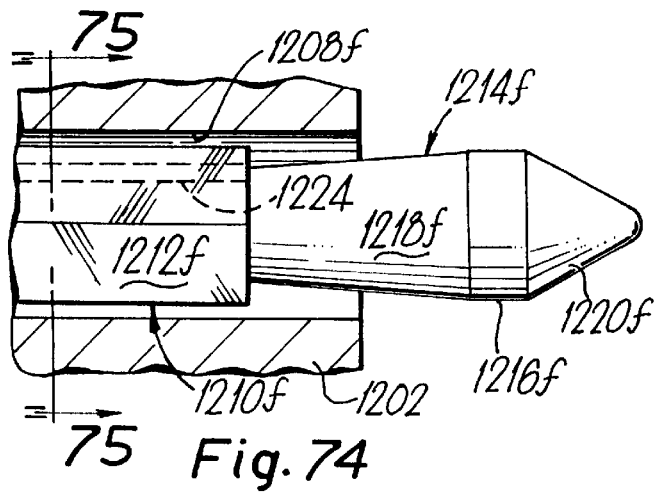
FIG. 74 is a generally axially extending cross-sectional view in considerably enlarged scale, of an other modified form of valving member or body and cooperating valving passage means with such valving member or valving body being shown in elevation with only a longitudinally fragmentary portion thereof being depicted.
Figure 75:
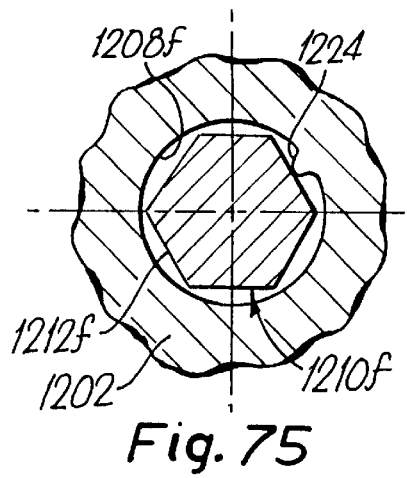
FIG. 75 is a cross-sectional view taken generally on the plane of line 75—75 of FIG. 74 and looking in the direction of the arrows.

The embodiment of FIGS. 74 and 75 also depicts a filler 1224 which is functionally equal to 1222 of FIGS. 72 and 73. In FIGS. 74 and 75 the housing or body 1202 slidably contains the valving member 1210*f* in passage 1208*f* with such valving member 1210*f* shown as comprising a longitudinally extending valve main body 1212*f* and valve head 1214*f* shown as comprised of a first tapered metering surface 1218*f*, a second cylindrical metering portion 1216*f* and conical extension 1220*f*. The embodiment of FIGS. 74 and 75 differs from that of FIGS. 72 and 73 by having the filler 1224 carried by the cylindrical surface of passage 1208*f* instead of the valving member 1210*f*. Again, the filler strip 1224, longitudinally extending within passage 1208*f* is illustrated as being integrally formed with the body or housing 1202; just as in FIGS. 72 and 73, it is possible that the filler strip 1224 may actually be a member separate from the valve passage 1208*f* or housing 1202 and suitably secured in its depicted position as by a suitable adhesive or cement.

In both of the embodiments of FIGS. 72 and 73 and FIGS. 74 and 75 a single filler strip is depicted. It is, of course, possible and contemplated that embodiments comprising a plurality of such filler strips 1222 and 1224 may be employed. Also, even though such filler strip or strips may be employed, the dimensions and configurations thereof are such as to still assure the free movement of the valving member 1210 and 1210*f* within the respective passages 1208 and 1208*f*.

FIGS. 76 and 77 and FIGS. 78 and 79 are generally related in that each is concerned with increasing the rate of fluid flow to a desired rate instead of decreasing the rate of flow as the embodiments of FIGS. 72 and 73 and FIGS. 74 and 75.

Figure 76:
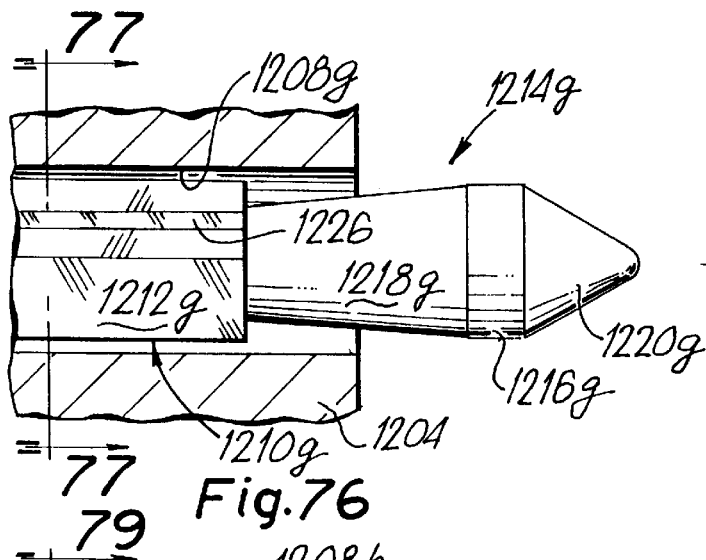
FIG. 76 is a generally axially extending cross-sectional view, in considerably enlarged scale, of an other modified form of valving member or body and cooperating valving passage means with such valving member or valving body being shown in elevation with only a longitudinally fragmentary portion thereof being depicted.
Figure 77:
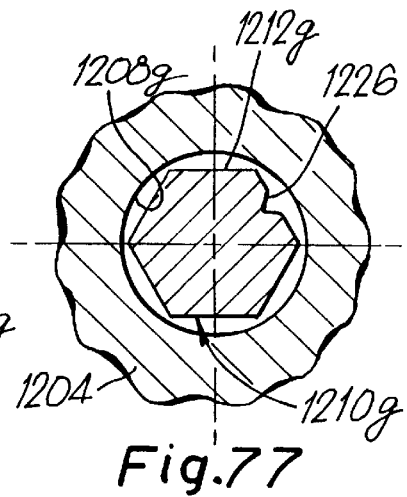
FIG. 77 is a cross-sectional view taken generally on the plane of line 77—77 of FIG. 76 and looking in the direction of the arrows.

Referring in greater detail, FIGS. 76 and 77 illustrate the housing or body 1204 provided with a passage 1208*g* formed therethrough and slidably receiving therein valving member 1210*g* with a main valving body 1212*g*. Also, as shown, the valving member 1210*g* may comprise a valve head 1214*g* which, in turn, may comprise a tapered metering surface 1218*g*, a cylindrical metering surface 1216*g* and a conical extension 1220*g*. In the embodiment of FIGS. 76 and 77 the rate of desired flow is achieved by the increasing of the flow area between valve body 1212*g* and passage 1208*g* by the forming in the valve body 121*g* of a longitudinally extending groove or recess 1226 formed in the side of valve body 1212*g*.

Figure 78:
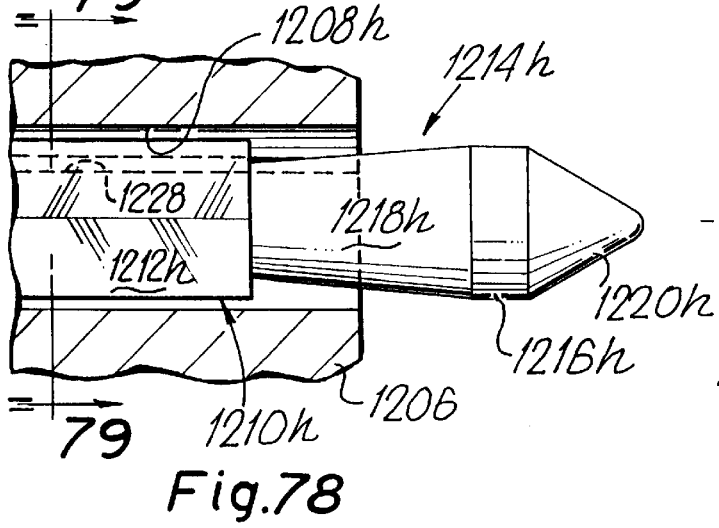
FIG. 78 is a generally axially extending cross-sectional view, in considerably enlarged scale, of an other modified form of valving member or body and cooperating valving passage means with such valving member or valving body being shown in elevation with only a longitudinally fragmentary portion thereof being depicted.
Figure 79:
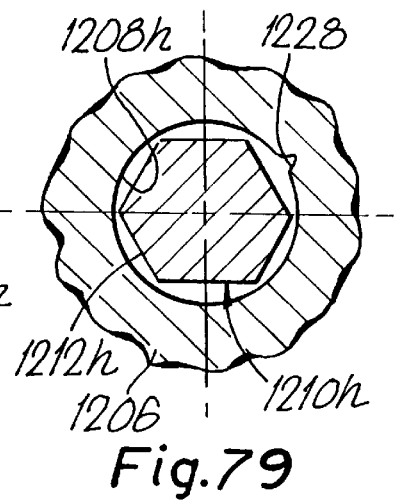
FIG. 79 is a cross-sectional view taken generally on the plane of line 79—79 of FIG. 78 and looking in the direction of the arrows.
Figure 80:
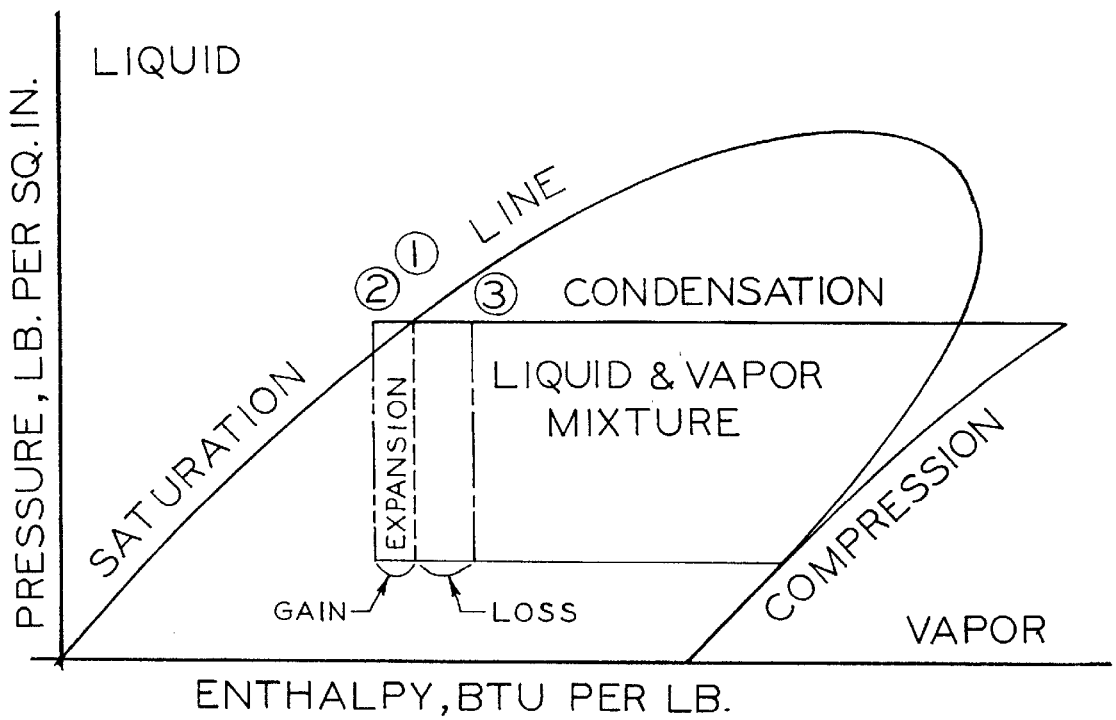
FIG. 80 is a pressure-enthalpy diagram for a simple saturation cycle.

In FIGS. 78 and 79 the housing or body 1206 is provided with a passage 1208*h* formed therethrough and slidably receiving therein valving member 1210*h* with a main valving body 1212*h*. Also, as shown, the valving member 1210*h* may comprise a valve head 1214*h* which, in turn, may comprise a tapered metering surface 1218*h*, a cylindrical metering surface 1216*h* and a conical extension 1220*h*.

In the embodiment of FIGS. 78 and 79 the increased flow area is attained as by the longitudinally extending groove or recess 1228 formed in the cylindrical wall of passage 1208*h*.

In all of the embodiments of FIGS. 72–79: (a) there may be a plurality of inserts (1222; 1224); (b) there may be a plurality of grooves or recesses (1226; 1228); (c) a valve head as 1214, 1214*f*, 1214*g* or 1214*h* may be omitted and other valving ends as shown and described in this application may be employed; (d) the left ends, as viewed in the Figures, of the valving members 1210, 1210*f*, 1210*g* and 1210*h* may be formed, if desired, as generally depicted in any of FIGS. 15, 27, 29, 30, 31 and 37–55; and (e) the various elements as shown by FIGS. 72–79 as well as the modifications thereof as herein contemplated by FIGS. 15, 27, 29, 30, 31 and 37–55 may be comprised of any suitable material with plastics being one source thereof.

Various piston shapes, for example, ranging from a round pin up to an octagonal pin sliding in a round hole, formed in the housing or sleeve, have been illustrated. While it is impossible to draw all possibilities, this application endeavors to disclose the concept that any shape of piston will suffice wherein the clearance between the piston and its confinement is used as part or all of the flow restriction. This invention, as one of its objectives, discloses that this clearance must be large enough to pass debris which was allowed by the inlet screen. In automotive use the filter screen is designed to generally pass spheres of approximately 0.008 inch in diameter and less. Too fine a filter screen would plug-up rapidly. An example of another shape of piston would be a sharp tooth gear sliding in a round hole confinement. Blocking some of the space between the teeth as the piston travel progresses tends to meter or restrict flow as would a tapered appendage. FIG. 54 shows this gear shape as a four tooth embodiment but this invention should not be limited to just the four teeth. Also the gear or multifaced shape could be the housing and the movable piston round.

The preferred embodiment is a hex-shaped piston. This shape is consistent with the dimension requirements of the current automotive liquid lines. It gives the proper flow area while allowing debris to pass through between the hex flat and the housing or sleeve confinement. The multiple passages produce less apparent flow noise than the currently used fixed single orifice tube. The hex edges also act as guides to confine radial movement. An optional guide at the exit or inlet end may also be used to confine radial movement. Clearances between the housing or sleeve and the piston are relatively loose, as compared to prior art variable orifices, thereby precluding "sticking".

The muffler described herein has at least two functions. One of such functions is to reduce flow noise and the second is to provide a restriction which varies with flow rate. By proper sizing of the exit apertures the pressure in the muffler is designed to be in the range of 25.0 psi. at low refrigerant flow rates and approximately 100.0 psi. at high flow rates. This pressure is relative to the outside of the muffler. Since the force acting on the movable member is the difference between inlet pressure and the pressure within the muffler times the effective piston area it can be seen that the piston will be actuated at higher pressure differential across the assembly at higher flow rates. For instance, at low blower idle conditions the pressure differential to start the piston moving may be 175.0 psi. but at high flow rates it may increase 250.0 psi. which is very desirable and not a feature of the prior art variable valves. As mentioned previously since the orifice tube or restrictor operates at sonic velocity this muffler restriction will not influence flow as long as its internal pressure is below the pressure at which sonic velocity occurs. (Sonic flow occurs when downstream pressure is approximately one-half of inlet pressure absolute.)

The embodiments disclosed herein have a common trait in that all or part of the fluid flow path is the clearance between the movable piston and the confining sleeve, body or housing. This results in relatively loose fits between these components. For instance, in the preferred embodiment the space between the hex flat and its confinement member is about 0.011 inch (0.2794 mm.). This is adequate to allow debris passing through the inlet screen to continue through the device of the invention. The edges of the hex act as stabilizing guides but still have a clearance of 0.002 inch (0.0508 mm.) to 0.004 inch (0.1016 mm.) per side, well within high production manufacturing tolerances. Even this tolerance may be increased if at least one more suitable guide is utilized on the piston end or ends as shown in FIGS. 62, 63, 64, 65, 66 and 67. This guide(s) preferably should have flow reliefs (shown) to eliminate trapping of debris in the confluent cavity. In essence the piston "floats" in the oily fluid flow with very low friction and thus low hysteresis. This is a vast improvement over prior art variable orifice valves which use O-rings between the movable member and its confinement surfaces.

The preferred embodiment uses a hexagonal shaped piston for maximum flow control area. This is partly because the hex geometry is coincident with the proper flow area when constrained by the present liquid line size used in automobiles. A larger line size may require an octagonal shape for instance if the device is also enlarged. Additional changes in flow area using a round or multifaced movable member may be accomplished by either a groove formed longitudinally on the movable or confining member or a filler formed in same. FIGS. 72–79 illustrate this. These methods may be used when designing flow areas for specific applications from one piston size and is a manufacturing consideration.

The embodiments of this invention described to now include a maximum flow area, a minimum flow area and an infinitely variable flow area disposed operatively between the two. It will be evident why this intermediate flow area is quite important. Some of the prior art variable flow valves use only a two stage design. Shown in FIGS. 64 and 65 is a two stage valve using the teachings of this invention. Also FIGS. 66 and 67 illustrate a multiple stage variable valve with at least three stages. Instead of the conical metering end a step or steps are used. The conical metering end has slight hysteresis advantages but the multiple steps also operate very satisfactorily.

When operating at a given evaporator load and compressor speed such as at idle the orifice size must be reduced as head pressure rises in order to maintain a subcooled or at least saturated liquid flow into the expansion device. For that reason a two stage orifice valve cannot optimize performance as well as one with more stages. Significant performance gains can be achieved at idle over prior art fixed area orifice tubes in the range of 225.0 psi. head to 425.0 psi. using optimal orifice sizes. After 425.0 psi. the compressor is disengaged by the safety switch. For reference, a 225.0 psi. head may be obtained at idle on an 80° F. day while the 425.0 psi. head may be a 110° F. ambient idle condition. The optimal orifice size will not be the same at both conditions. An infinitely variable orifice area best achieves the goal of optimization but a three or four stage performs very well.

Two stage variable orifice valves which engage the minimum orifice at a given pressure differential present operational problems. Assume that a 175.0 psi. pressure differential is the preferred "trigger point" for the smaller orifice. Under many operating conditions this is probably true. However, during hot ambient soak and cool down the minimum orifice will be engaged at road speeds since the pressure differential may exceed 250.0 psi in the initial stages of this high load condition. Even in the absence of hysteresis the orifice valve will not re-open to the larger size as the load decreases thus creating compressor durability problems. This is because at ambients above 100° F. many systems have normal high to low side differential exceeding 175.0 psi. Once triggered, the smaller orifice increases head pressure thus increasing further this differential.

A solution would be to significantly raise the "triggering" pressure differential to say 300.0 psi. but this would eliminate any performance gains at most operating low speed and idle conditions except for the extended idle in very hot ambients. Another solution would be to design the minimum orifice large enough so as not to create the compressor durability problems but the refrigerant charge level would need to be increased and there would be a sacrifice in high ambient performance as this orifice would be still too large at high head pressures.

Figure 81:
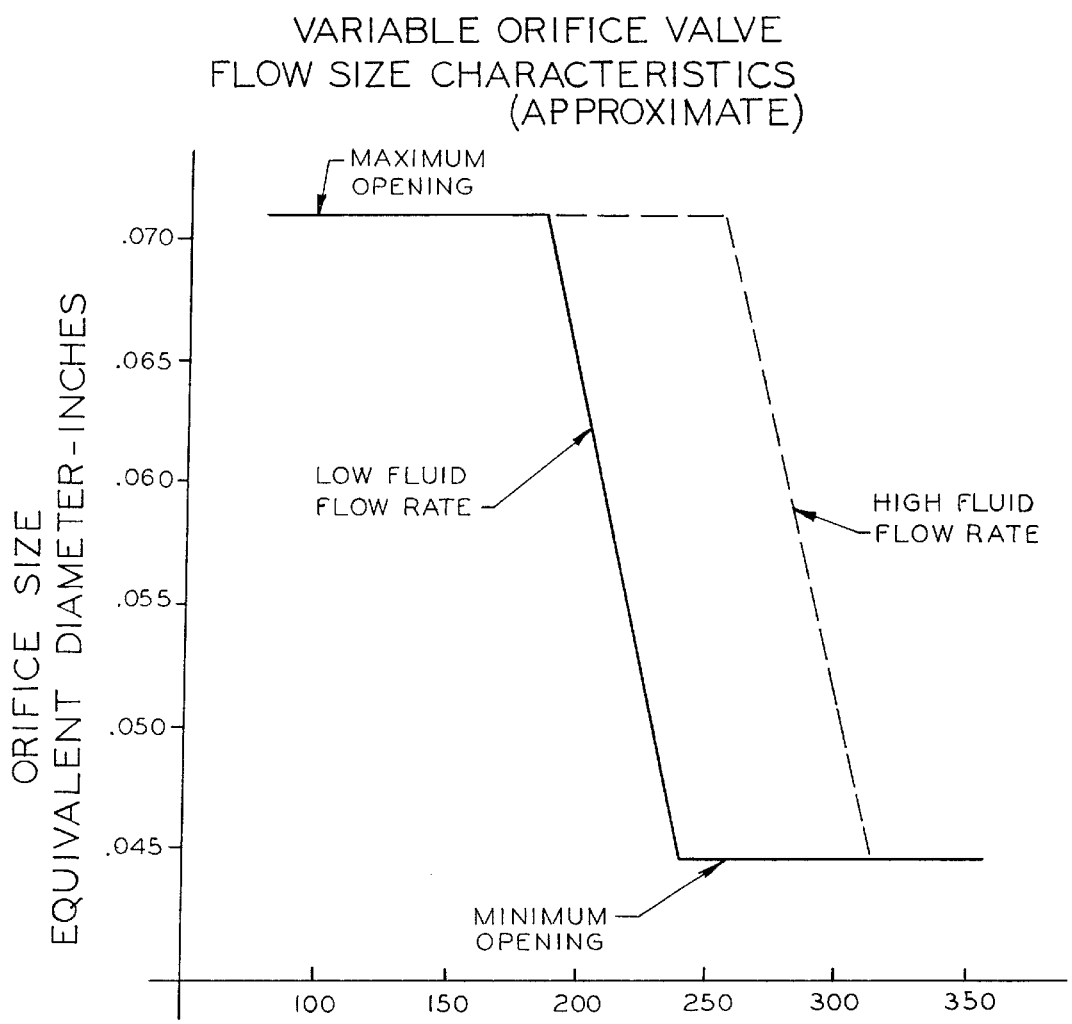
FIG. 81 is a graph illustrating operational characteristics of the invention.

It becomes obvious that a design using three or more stages is preferred. Also preferred would be a design which requires that pressure differential to move the piston raises as refrigerant flow is increased, resulting in the "trigger points" being higher at high speed high load as compared to low speed and idle. This invention embodies both. FIG. 81 illustrates the operational characteristics of the invention. Note that at high flow rates and 250.0 psi. differential the large orifice is engaged while at low flow idle at the same differential the smaller orifice is in.

The prior art fixed orifice tube expansion device exhibits an objectionable pulsating hissing noise which is audible in the vehicle interior under certain operating conditions particularly when gas is present at the orifice inlet. Some vehicles have resorted to placing the orifice tube in a muffler to lower this noise.

This invention at least significantly reduces, if not actually eliminates, this pulsating noise. The breakup of the flow into multiple passages increases the length to diameter ratio which is beneficial for flow stability and flow noise. The preferred embodiment uses a hexagonal piston shape which splits the flow into six paths. Also, at higher head pressures the valve actuates to a smaller flow area thus reducing quality (gas at inlet) and thus flow noise.

FIGS. 62 and 63 also disclose unequal length flow paths which may be tuned for further noise reduction if desired.

The noise attenuation via the muffler has been covered prior in this writing.

It is important for satisfactory spring life that harmful harmonic vibrations are not excited in the spring by fluid flow. This invention discloses various arrangements whereby isolation of the spring, from the main flow, can be achieved as by either the sleeve shown in FIG. 60 or by placement of the spring in the muffler section.

Among the many benefits and improvements provided by the invention disclosed herein are such things as being significantly more quiet in its operation as compared to the prior art, and, the invention enables an increased cool-down, as at idle engine operation, as compared to the prior art.

In view of the disclosure herein made, it should be obvious that the various elements comprising the preferred embodiment as well as those embodiments described as modifications may be comprised of any suitable material even though for descriptive purposes, for the most part, the valving assembly employing teachings of the invention is described as being comprised of plastics material.

Throughout this application, reference is made to fluid and/or fluid flow; such expressions are intended to encompass conditions of liquid flow, gas flow and/or a mixture thereof.

Even though only a preferred embodiment of the invention, and selected modifications thereof, have been disclosed and described other embodiments and modifications of the invention are possible within the scope of the appended claims.

What is claimed is:

1. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending valving member slidably received by said passage, wherein said inlet end comprises generally inner annular metering surface means, wherein said valving member comprises a metering head portion having outer valving surface means, wherein said outer valving surface means is received in and radially inwardly spaced from said inner annular metering surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving surface means and said inner annular metering surface means and to at least tend to axially move said axially extending valving member generally in a direction toward said outlet end, and resilient means operatively connected to said axially extending valving member and resiliently resisting the tendency of said axially extending valving member to move in said direction toward said outlet end.

2. A valving assembly for controlling the rate of flow of a fluid from an area generally upstream of said valving assembly and of varying fluid pressure, comprising an axially extending housing, an axially ex-tending passage formed in said housing, said passage comprising an inlet end for said fluid and an outlet end for said fluid, an axially extending valving member slidably received by said passage, wherein said inlet end comprises generally inner annular metering surface means, wherein said valving member comprises a metering head portion having outer valving surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving surface means and said inner annular metering surface means and to at least tend to axially move said axially-extending valving member generally in a direction toward said outlet end, and resilient means operatively connected to said axially extending valving member and resiliently resisting the tendency of said axially extending valving member to move in said direction toward said outlet end, wherein said axially extending passage formed in said housing comprises in transverse cross-section an axially extending cylindrical passage wall, wherein said valving member comprises an axially extending main body portion, wherein said main body portion comprises in transverse cross-section a configuration having a plurality of axially extending main body wall-like surfaces generally juxtaposed to said axially extending cylindrical passage wall.

3. A valving assembly according to claim 2 wherein said configuration is that of a rectangle, wherein said plurality of wall-like surfaces define said rectangular configuration, wherein first and second of said plurality of wall-like surfaces are relatively short when viewed in said transverse cross-section, wherein said first and second of said plurality of wall-like surfaces when viewed in said transverse cross-section are spaced from each other, wherein third and fourth of said plurality of wall-like surfaces are relatively long when viewed in said transverse cross-section, wherein said third and fourth of said plurality of wall-like surfaces when viewed in said transverse cross-section are spaced from each other, wherein said first of said plurality of wall-like surfaces is joined to said third and fourth of said plurality of wall-like surfaces and wherein said second of said plurality of wall-like surfaces is joined to said third and fourth of said plurality of wall-like surfaces.

4. A valving assembly according to claim 2 wherein said configuration is rectangular, wherein said main body of rectangular configuration is closely received as a slip fit by said cylindrical passage, wherein a plurality of axially extending conduits are defined between said rectangular configuration and said cylindrical passage wall, wherein said plurality of axially extending conduits comprises a first pair of axially extending conduits of relatively small cross-sectional flow area, and wherein said plurality of axially extending conduits comprises a second pair of axially extending conduits of relatively large cross-sectional flow area.

5. A valving assembly according to claim 2 wherein said configuration is trapezoidal, wherein said trapezoidal configuration comprises four of said main body wall-like surfaces, wherein said main body portion of trapezoidal configuration is closely received in said cylindrical passage but is a slip fit permitting said main body portion of trapezoidal configuration to move relative to said cylindrical passage, and wherein respective axially extending conduits are defined between respective ones of said wall-like surfaces and said cylindrical passage wall.

6. A valving assembly according to claim 5 wherein the cross-sectional fluid flow areas of all of said axially extending conduits are not the same.

7. A valving assembly according to claim 2 wherein said configuration is that of an ax head, wherein said ax head configuration comprises at least four of said main body wall-like surfaces, wherein said main body of said ax head configuration is closely received as a close slip fit in said cylindrical passage, wherein a first and second of said at least four of said main body wall-like surfaces cooperate with a juxtaposed first portion of said cylindrical passage to define a first axially extending conduit, and wherein a third and fourth of said at least four of said main body wall-like surfaces cooperate with a juxtaposed second portion of said cylindrical passage to define a second axially extending conduit.

8. A valving assembly according to claim 7 wherein the cross-sectional fluid flow areas of said first and second axially extending conduits are generally the same.

9. A valving assembly according to claim 7 and further comprising a fifth of said main body wall-like surfaces, wherein said fifth wall-like surface cooperates with a further juxtaposed portion of said cylindrical passage to define a third axially extending conduit, and wherein the cross-sectional flow area of said third axially conduit is less than the cross-sectional flow areas of said first and second axially extending conduits.

10. A valving assembly according to claim 2 wherein said configuration is hexagonal having six axially extending side walls, wherein said main body of hexagonal configuration is closely received as a slip fit by said cylindrical passage, and wherein each of said six axially extending side walls cooperates with a juxtaposed portion of said cylindrical passage wall to define a respective axially extending conduit.

11. A valving assembly according to claim 10 and further comprising a muffler having a muffler chamber, wherein said muffler chamber is in communication with said outlet end of said axially extending passage formed in said housing, and at least one passage formed in said muffler as to communicate between said muffler chamber and an area externally of said muffler.

12. A valving assembly according to claim 10 wherein the cross-sectional flow areas of each of the axially extending conduits are generally equal to each other.

13. A valving assembly according to claim 2 wherein said configuration is octagonal having eight axially extending side walls, wherein said main body of octagonal configuration is closely received as a slip fit by said cylindrical passage, and wherein each of said eight axially extending side walls cooperates with a juxtaposed portion of said cylindrical passage wall to define a respective axially extending conduit.

14. A valving assembly according to claim 13 wherein the cross-sectional flow areas of each of the axially extending conduits are generally equal to each other.

15. A valving assembly according to claim 2 wherein said configuration is a square having four axially extending side walls, wherein said main body of square configuration is closely received as a slip fit by said cylindrical passage, and wherein each of said four axially extending side walls cooperates with a juxtaposed portion of said cylindrical passage wall to define a respective axially extending conduit.

16. A valving assembly according to claim 2 wherein said configuration is triangular having three axially extending side walls, wherein said main body of triangular configuration is closely received as a slip fit by said cylindrical passage, and wherein each of said three axially extending side walls cooperates with a juxtaposed portion of said cylindrical passage wall to define a respective axially extending conduit.

17. A valving assembly according to claim 2 wherein said configuration comprises a plurality of outwardly radiating axially extending arms, wherein each of said arms comprises a respective axially extending arm surface, wherein said plurality of outwardly radiating axially extending arms is closely received as a slip fit by said cylindrical passage, and wherein the arm surfaces of next adjoining arms and that portion of said cylindrical passage generally spanning the space between said next adjoining arms define respective axially extending conduits.

18. A valving assembly according to claim 2 wherein said configuration is cross-like having at least four outwardly radiating axially extending cross arms, wherein each of said cross arms comprises a respective axially extending cross arm surface, wherein said main body of cross-like configuration is closely received as a slip fit by said cylindrical passage, and wherein the cross arm surfaces of next adjoining cross arms and that portion of said cylindrical passage generally spanning the space between said next adjoining cross arms define respective axially extending conduits.

19. A valving assembly according to claim 2 wherein said configuration is elliptical having two axially extending major side walls, wherein said main body of elliptical configuration is closely received as a slip fit by said cylindrical passage, wherein a first of said two axially extending major side walls and the juxtaposed portion of said cylindrical passage wall cooperate to define a first axially extending passage having a crescent-like cross-sectional flow area, and wherein a second of said two axially extending major side walls and the juxtaposed portion of said cylindrical passage wall cooperate to define a second axially extending passage having a crescent-like cross-sectional flow area.

20. A valving assembly according to claim 19 and further comprising a muffler having a muffler chamber, wherein said muffler chamber is in communication with said outlet end of said axially extending passage formed in said housing, and a plurality of muffler passages formed in said muffler as to communicate between said muffler chamber and to an area externally of said muffler.

21. A valving assembly according to claim 1 wherein said axially extending valving member comprises an axially extending valve body carrying said metering head portion, wherein said valve body is situated downstream of said metering head portion and is made slidably received by said passage because of clearance between said passage and said axially extending valve body, wherein said fluid as is flowed between said outer valving surface means and said inner annular metering surface means is permitted to flow to and through said outlet end by flowing through said clearance.

22. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending valving member slidably received by said passage, wherein said inlet end comprises generally inner annular metering surface means, wherein said valving member comprises a metering head portion having outer valving surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving, surface means and said inner annular metering surface means and to at least tend to axially move said axially extending, valving member generally in a direction toward said outlet end, resilient means operatively connected to said axially extending valving member and resiliently resisting the tendency of said axially extending valving member to move in said direction toward said outlet end, wherein said axially extending valving member is made slidably received by said passage because of clearance therebetween, wherein said fluid as is flowed between said outer valving surface means and said inner annular metering surface means is permitted to flow to and through said outlet end by flowing through said clearance, wherein said axially extending valving member comprises a guide-like body portion closely slidably received by said axially extending passage, wherein said guide-like body portion is operatively carried in a manner resulting in said guide-like body portion being situated generally at one axial end of said valving member opposite to said inlet end, and wherein said resilient means operatively acts against said guide-like body portion.

23. A valving assembly according to claim 21 wherein said axially extending valving member comprises a guide-like body portion closely slidably received by said axially extending passage, wherein said guide-like body portion is operatively carried in a manner resulting in said guide-like body portion being situated generally at one axial end of said valving member opposite to said inlet end, and additional flow passage means formed in said guide-like body portion for said fluid as is flowed through said clearance to flow through said additional flow passage means.

24. A valving assembly according to claim 23 wherein said resilient means comprises at least one coiled compression spring, and further comprising a spring pilot operatively carried by said guide-like body portion, wherein said coiled compression spring is situated about said spring pilot and axially operatively engaged with said guide-like body portion.

25. A valving assembly according to claim 24 and further comprising fluid discharge conduit means formed in said spring pilot, and wherein said additional flow passage means formed in said guide-like body portion is in communication with said fluid discharge conduit means.

26. A valving assembly according to claim 25 wherein said additional flow passage means comprises a plurality of additional flow passages, and wherein said fluid discharge conduit means communicates with said plurality of additional flow passages.

27. A valving assembly according to claim 1 wherein said resilient means comprises at least one coiled spring operatively connected to said axially extending valving member, said coiled spring being physically located as to result in said outer valving surface means being axially generally between said outlet end and said coiled spring.

28. A valving assembly according to claim 27 and further comprising a generally cylindrical wall member in general axial alignment with said axially extending valving member, a motion transmitting member operatively interconnecting said generally cylindrical wall member and said axially extending valving member so that axial movement of said axially extending valving member causes like axial movement of said generally cylindrical wall member, a seating portion carried by said generally cylindrical wall member for movement in unison therewith, wherein said at least one coiled spring is situated about said generally cylindrical wall member and radially outwardly thereof, and wherein said at least one coiled spring is axially between a fixed spring abutment and said seating portion whereby said at least one coiled spring resiliently resists the movement of said generally cylindrical wall member and said outer valving surface means generally toward said inner annular metering surface.

29. A valving assembly according to claim 28 wherein said generally cylindrical wall member comprises first and second axial ends, wherein said first axial end is relatively axially closer to said outer valving surface means than is said second axial end of said generally cylindrical wall member, and wherein said motion transmitting member is operatively connected to said axially extending valve member and to said second axial end of said generally cylindrical wall member.

30. A valving assembly according to claim 1 wherein an annular axially extending space exists as between said passage and said axially extending valving member for the downstream flow therethrough of said fluid at a rate as controlled by the coaction of said generally inner annular metering surface means and said outer valving surface means, and further comprising an additional axially extending fluid flow conduit formed through said axially extending valving member.

31. A valving assembly according to claim 30 wherein the rate of flow of said fluid downstream through said annular axially extending space decreases as said axially extending valving member is moved in the downstream direction and said outer valving surface means more nearly approaches said generally inner annular metering surface means, and fluid flow shut-off means operatively positioned by said axially extending valving member and closed to the flow of said fluid downstream through said annular axially extending space when said axially extending valving member has moved downstream to a preselected position, and wherein when said fluid flow shut-off means thusly closes the flow of said fluid downstream through said annular axially extending space said additional axially extending fluid flow conduit remains open to fluid flow therethrough.

32. A valving assembly according to claim 30 and further comprising a muffler having a muffler chamber, wherein said muffler chamber is in communication with said outlet end of said axially extending passage formed in said housing, and a plurality of muffler passages formed in said muffler as to communicate between said muffler chamber and to an area externally of said muffler.

33. A valving assembly according to claim 31 wherein said axially extending valving member comprises a first axially extending portion downstream of and connected to said outer valving surface means, wherein said axially extending valving member comprises a second axially extending portion upstream of and connected to said outer valving surface means, wherein said resilient means comprises at least one coiled compression spring, wherein said second axially extending portion carries a spring abutment movable with said axially extending valving member, and wherein said at least one coiled compression spring is situated about said second axially extending portion and axially contained between a fixed spring seat and said movable abutment.

34. A valving assembly according to claim 1 wherein said axially extending housing comprises a first generally outer cylindrical housing portion and a second generally inner cylindrical housing portion, sealing means carried by said first outer cylindrical housing portion and generally circumscribing said first outer cylindrical housing portion, wherein said second generally inner cylindrical housing portion is held by said first generally outer cylindrical housing portion, abutment means carried by said first outer cylindrical housing portion, securing means situated generally upstream of said abutment means for holding said second inner cylindrical housing portion axially against said abutment means, and wherein said axially extending passage which comprises an inlet end and an outlet end is formed in said second generally inner cylindrical housing portion.

35. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending, valving member slidably received by said passage, wherein said inlet end comprises generally inner annular metering surface means, wherein said valving member comprises a metering head portion having outer valving surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving surface means and said inner annular metering surface means and to at least tend to axially move said axially extending valving member generally in a direction toward said outlet end, and resilient means operatively connected to said axially extending valving member and resiliently resisting the tendency of said axially extending valving member to move in said direction toward said outlet end, wherein said axially extending housing comprises a first generally outer cylindrical housing portion and a second generally inner cylindrical housing portion, wherein said second generally inner cylindrical housing portion is held by and within said first generally outer cylindrical housing portion, and wherein said axially extending passage which comprises an inlet end and an outlet end is formed in said second generally inner cylindrical housing portion, and further comprising filter means for filtering dirt out of said fluid before said fluid flows toward and to said axially extending valve member, wherein said filter means comprises a filter body and filter screen carried by said filter body, and wherein said filter body is engaged with and connected to both said first generally outer cylindrical housing portion and said second generally inner cylindrical housing portion.

36. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending valving member slidably received by said passage, wherein said inlet end comprises generally inner annular metering surface means, wherein said valving member comprises a metering head portion having outer valving surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving surface means and said inner annular metering surface means and to at least tend to axially move said axially extending valving member generally in a direction toward said outlet end, resilient means operatively connected to said axially extending valving member and resiliently resisting the tendency of said axially extending valving member to move in said direction toward said outlet end, wherein said axially extending housing comprises a first generally outer cylindrical housing portion and a second generally inner cylindrical housing portion, wherein said second generally inner cylindrical housing portion is held by and within said first generally outer cylindrical housing portion, wherein said axially extending passage which comprises an inlet end and an outlet end is formed in said second generally inner cylindrical housing portion, wherein said first outer cylindrical housing portion also defines an enclosed chamber, wherein said chamber is in communication with said outlet end, wherein said enclosed chamber serves as a muffler, and wherein a plurality of conduits are formed as to communicate between said chamber and an area externally of said chamber.

37. A valving assembly according to claim 36 wherein said resilient means comprises at least one coiled compression spring, wherein said at least one coiled compression spring is situate in said chamber and in operative engagement with said axially extending valving member as to resiliently urge said axially extending valving member toward a more open condition for the flow of said fluid therepast.

38. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending valving member slidably received by said passage, wherein said inlet end comprises generally inner annular metering surface means, wherein said valving member comprises a metering head portion having outer valving surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving surface means and said inner annular metering, surface means and to at least tend to axially move said axially extending valving member generally in a direction toward said outlet end, and resilient means operatively connected to said axially extending valving member and resiliently resisting the tendency of said axially extending valving member to move in said direction toward said outlet end, wherein said fluid acting against said axially extending valving member urges said axially extending valving member in a generally downstream direction, wherein said resilient means comprises at least one coiled compression spring operatively resiliently resisting movement of said axially extending valving member in said downstream direction, a generally radially extending space enlargement formed in said axially extending passage formed in said housing, wherein said space enlargement is situated downstream of said inner annular metering surface means, and whenever said axially extending valving member is moved downstream a distance sufficient to place said outer valving surface means operatively juxtaposed to said space enlargement the rate of flow of said fluid is enabled to be increased as by a significant extent flowing through said space enlargement and to that extent bypassing the fluid flow control otherwise exhibited by said outer valving surface means.

39. A valving assembly according to claim 38 wherein said space enlargement comprises a generally cylindrical enlargement formed in said housing, and when said outer valving surface means is operatively juxtaposed to said space enlargement the cylindrical enlargement actually radially outwardly circumscribes said outer valving surface means permitting fluid to flowingly bypass anywhere and everywhere along said outer valving surface means.

40. A valving assembly according to claim 1 wherein said fluid acting against said axially extending valving member urges said axially extending valving member in a generally downstream direction, wherein said resilient means comprises at least one coiled compression spring operatively resiliently resisting movement of said axially extending valving member in said downstream direction, wherein said axially extending valving member comprises a generally cylindrical axially extending main body portion of a first transverse diameter, wherein said axially extending valving member further comprises said cylindrical contoured generally tapered valving surface, wherein said outer valving surface means has a major second transverse diameter which is significantly smaller than said first transverse diameter, wherein said inner annular metering surface means is of a transverse diameter for closely receiving and performing a metering function with said outer valving surface means, wherein said axially extending passage formed in said housing comprises an inner diameter which is larger than said first transverse diameter as to result in an operating slip fit therebetween, and wherein when said inner valving surface means is moved downstream a distance sufficient to move said outer valving surface means out of said inner annular metering surface and into said comparatively large-diameter axially extending passage said outer valving surface means ceases to be a controlling factor in controlling the rate of flow of said fluid.

41. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending valving member slidably received by said passage, wherein said inlet end comprises generally inner annular metering surface means, wherein said valving member comprises a metering, head portion having outer valving surface means, wherein said outer valving surface means is received in and radially inwardly spaced from said inner annular metering surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving surface means and said inner annular metering surface means and to at least tend to axially move said axially extending valving member generally in a direction toward said outlet end, resilient means operatively connected to said axially extending valving member and resiliently resisting the tendency of said axially extending valving member to move in said direction toward said outlet end, and further comprising an outer conduit for operatively containing said valving assembly, and at least one annular seal situated generally between said valving assembly and the inner portion of said outer conduit in order to prevent the flow of fluid in any path except through the valving assembly.

42. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston-like valving member disposed within said fluid flow passage wherein said piston-like valving member comprises a metering valve head and an axially extending valving member body portion, wherein said fluid flow passage comprises an axially extending wall which when viewed in axially transverse cross-section defines a configuration generally circumscribing at least said valving, member body portion, wherein said valving member body portion is radially inwardly spaced from said fluid flow passage means as to thereby define a generally axially extending space between said fluid flow passage means and said valving member body portion, wherein said fluid flows through said axially extending space, a biasing spring resiliently urging said movable piston in a first direction, and sealing means forming a generally circumferential seal with said housing.

43. A fluid flow metering device according to claim 42 and further comprising a sleeve member disposed generally in said housing, and wherein said fluid flow passage is formed in said sleeve.

44. A fluid flow metering device according to claim 42 wherein said fluid flow passage comprises an axially extending continuous wall, and wherein said continuous wall when viewed in axially transverse cross-section defines an elliptical configuration.

45. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing sprig resiliently urging said movable piston in a first direction, and sealing means forming a generally circumferential seal with said housing, wherein said fluid flow passage is axially extending and continuous, and wherein when said fluid flow passage is viewed in axially transverse cross-section said fluid flow passage is seen to be comprised of at least three axially extending and continuous fluid flow passage walls.

46. A fluid flow metering device according to claim 42 wherein said fluid flow passage comprises at least seemingly two axially extending conduits for flowingly conveying said fluid, and wherein said at least two axially extending conduits define cross-sectional fluid flow areas different from each other.

47. A fluid flow metering device according to claim 42 wherein said muffler means is formed as to be separate from but operatively joined to said housing.

48. A fluid flow metering device according to claim 42 wherein said muffler means comprises a muffler structure formed separate from said housing and operationally situated as to be downstream of said outlet and separated from said housing.

49. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housings said filter screen being effective to filter undesired foreign particles from said fluid as said fluid flows to said inlet, a movable piston disposed within said fluid flow passage, a biasing spring resiliently urging said movable piston in a first direction, and sealing means forming a generally circumferential seal with said housing, wherein said muffler means comprises at least a muffler body portion with a receiving passage formed therein for receiving said fluid flow as is discharged by said outlet, and further comprising at least one exit passage formed through said muffler body portion as to communicate between said receiving passage and an area outwardly of said muffler body portion.

50. A fluid flow metering devices comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging said movable piston in a first direction, and sealing means forming a generally circumferential seal with said housing, wherein said muffler means comprises at least a muffler body portion with a receiving passage formed therein for receiving said fluid flow as is discharged by said outlet, and further comprising exit passage means formed through said muffler body portion as to communicate between said receiving passage and an area outwardly of said muffler body portion, and wherein said exit passage means at least at times is effective to create a bias fluid pressure differential across said movable piston reflective of the rate of flow of said fluid flow.

51. A fluid flow metering device according to claim 42 wherein said movable piston comprises a generally axially elongated main body slidably received by said fluid flow passage, and wherein said elongated main body is circular in axially transverse cross-section.

52. A fluid flow metering device according to claim 42 wherein said movable piston comprises a generally axially elongated main body slidably received by said fluid flow passage, and wherein said elongated main body is elliptical in axially transverse cross-section.

53. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging said movable piston in a first direction, and sealing means forming a generally circumferential seal with said housing, wherein said movable piston comprises a generally axially elongated main body slidably received by said fluid flow passage, wherein when said elongated main body is viewed in axially transverse cross-section said main body is seen to comprise a plurality of generally axially extending main body side walls, and wherein said plurality of generally axially extending main body side walls comprises at least three of said main body side walls.

54. A fluid flow metering device according to claim 42 wherein said movable piston comprises a generally axially elongated main body slidably received by said fluid flow passage, and wherein at least one conduit is formed generally axially through said axially elongated main body which is slidably received by said fluid flow passage.

55. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging said movable piston in a first direction, and sealing means forming a generally circumferential seal with said housing, wherein said movable piston comprises a generally axially elongated main body slidably received by said fluid flow passage, and wherein said axially elongated main body is solid when viewed in axially transverse cross-section.

56. A fluid flow metering device according to claim 42 wherein said piston exhibits at least a degree of control of the rate of flow of said fluid flow through said fluid flow passage, wherein said piston comprises a fluid metering portion, and wherein said metering portion comprises at least one metering step to thereby provide at least a two stage metering area.

57. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging said movable piston in a first direction, and sealing means forming a generally circumferential seal with said housing, wherein said movable piston comprises a generally axially elongated main body slidably received by said fluid flow passage, and further comprising a guide structure operatively connected to said elongated main body for guiding said main body as it slidably moves with respect to said fluid flow passage.

58. A fluid flow metering device according to claim 57 and further comprising areas of fluid flow relief, said areas of fluid flow relief being carried by said guide structure.

59. A fluid flow metering device according to claim 42, and further comprising spring guide means for guiding said biasing spring as it undergoes resilient movement, wherein said spring guide means is carried by said axially extending valving member body portion, and wherein said spring guide means extends in a direction axially away from said axially extending valving member body portion.

60. A fluid flow metering device according to claim 42, and further comprising stop means, said stop means being effective to provide a stop for said movable piston-like valving member as said movable piston-like valving member moves relative to said fluid flow passage in a second direction opposite to said first direction.

61. A fluid flow metering device according to claim 49 and further comprising a covering portion operatively carried by said movable piston as to at least at times partially restrict flow out of at least said at least one exit passage.

62. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging said movable piston in a first direction, and sealing means forming a generally circumferential seal with said housing, and further comprising means for isolating said biasing spring to prevent impingement upon said biasing spring by said fluid flow.

63. A fluid flow metering device according to claim 42 and further comprising an outer conduit means containing said fluid flow metering device, and wherein said sealing means also serves to provide a fluid seal with the interior of said outer conduit.

64. A fluid flow metering device, comprising a housing, axially extending fluid flow passage means extending through said housing, wherein said axially extending fluid flow passage means comprises an inlet for the flow thereinto of said fluid and an outlet for the discharge therefrom of said fluid, an axially extending valving member slidably received by said axially extending fluid flow passage means, wherein said axially extending fluid flow passage means comprises generally inner fluid metering surface means, wherein said axially extending valve member comprises generally outer fluid metering surface means, wherein a variably controlled dimensional flow clearance exists as between said inner fluid metering surface means and said outer fluid metering surface means for the metered flow of said fluid flow therethrough, wherein said fluid flow through said flow passage means is metered in response to the axial positioning of said axially extending valve member in said axially extending fluid flow passage means and consequent positioning of said outer fluid metering surface means relative to said inner fluid metering surface means, wherein said axially extending flow passage means comprises in transverse cross-section an axially extending cylindrical passage wall, wherein said axially extending valve member comprises an axially extending main body portion, wherein said main body portion comprises in transverse cross-section a configuration having a plurality of axially extending main body wall-like surfaces generally juxtaposed to said axially extending cylindrical passage wall, wherein said configuration is hexagonal having six axially extending side walls with adjoining side walls forming longitudinally extending corners of said hexagonal configuration, wherein said axially extending valve member is supported in said axially extending fluid flow passage means by certain of said longitudinally extending corners being in sliding engagement with said axially extending cylindrical passage wall, a biasing spring resiliently urging said axially extending valve member in a first direction, wherein said axially extending valve member during flow of said fluid into said inlet through said axially extending fluid flow passage means and out through said outlet experiences thereagainst a pressure differential at least tending to axially move said axially extending valve member in a second direction opposite to said first direction, wherein said axially extending valve member comprises a metering head portion, wherein said metering head portion comprises said outer fluid metering surface means, wherein as said axially extending valve member is first moved by said pressure differential in said second direction said outer fluid metering surface means and said inner fluid metering surface means coact with each other to reduce in magnitude said variably controlled dimensional flow clearance, wherein as said axially extending valve member is further moved by said pressure differential in said second direction said outer fluid metering surface means and said inner fluid metering surface means are axially positioned with respect to each other as to increase the rate of flow of said fluid flow into said inlet, a spring guide for guiding said biasing spring during axial movement of said axially extending valve member, wherein said spring guide serves as a travel abutment for limiting said axial movement of said axially extending valve member in said second direction, and further comprising a muffler having a muffler chamber, wherein said muffler chamber is in communication with said outlet of said axially extending fluid flow passage means, at least one passage formed in said muffler as to communicate between said muffler chamber and an area externally of said muffler, and at least one seal member forming a generally circumferential seal for preventing said fluid flow to bypass said inlet.

65. A fluid flow metering device according to claim 64 wherein said housing comprises a separate generally tubular sleeve, wherein said axially extending fluid flow passage means is formed through said sleeve, further comprising filter screen means secured to said housing as to filter foreign particles from said fluid flow upstream of said inlet, and wherein said filter screen is operatively secured to said housing and maintains said tubular sleeve assembled to said housing.

66. A fluid flow metering device according to claim 64 wherein said muffler is formed integrally with said housing.

67. A fluid flow metering device according to claim 64 wherein each of said six axially extending side walls cooperates with a juxtaposed portion of said axially extending cylindrical wall to thereby define six axially extending conduits.

68. A fluid flow metering device according to claim 67 wherein some of said six axially extending conduits are shorter in axial length than other of said six axially extending conduits.

69. A fluid flow metering device according to claim 67 wherein the cross-sectional flow areas of said six axially extending conduits are substantially equal to each other.

70. A fluid flow metering device according to claim 64 wherein said outer fluid metering surface means comprises a tapered contour.

71. A fluid flow metering device according to claim 64 wherein said outer fluid metering surface means comprises a stepped contour.

72. A fluid flow metering device according to claim 64 and further comprising a stationary guide portion carried by said housing and for slidably receiving at least a part of said spring guide, and wherein said spring guide and said stationary guide portion define generally therebetween fluid flow relief means.

73. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging, said movable piston in a first direction, and sealing means forming a generally circumferential seal with said housing, wherein said fluid flow passage comprises an axially extending continuous wall, wherein said continuous wall when viewed in axially transverse cross-section defines a circular configuration, and further comprising at least one groove formed into said continuous wall and extending longitudinally with said axially extending continuous wall thereby increasing the flow area of said fluid flow passage by the transverse cross-sectional area of said at least one groove.

74. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging said movable piston in a first direction, sealing means forming a generally circumferential seal with said housing, and further comprising a longitudinally extending groove formed into said movable piston and exposed to said fluid flows within said fluid flow passage.

75. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending valving member slidably received by said passage, wherein said inlet end comprises generally inner annular metering surface means, wherein said inner annular metering surface means circumferentially surrounds a conduit portion, wherein said valving member comprises a metering head portion having outer valving surface means, wherein said outer valving surface means is received in said conduit portion as to define a circumferential space between said outer valving surface means and said inner annular metering surface means, wherein as said fluid pressure increases said fluid acts against said axially extending valving member and urges said axially extending valving member in a direction whereby said outer valving surface means moves within said conduit portion and said inner annular metering surface means to at least tend to reduce the rate of flow of said fluid through said circumferential spaced between said outer valving surface means and said inner annular metering surface means and to at least tend to axially move said axially extending valving member generally in a direction connected to said axially extending valving member and resiliently resisting the tendency of said axially extending valving member to move in said direction toward said outlet end.

76. A valving assembly for controlling the rate of flow of a fluid from an area generally upstream of said valving assembly and of varying fluid pressure, comprising an axially extending housing, an axially extending passage formed in said housing, said passage comprising an inlet end for said fluid and an outlet end for said fluid, an axially extending valving member slidably received by said passage, wherein said inlet end comprises generally inner annular metering surface means, wherein said valving member comprises a metering head portion having outer valving surface means, wherein as said fluid pressure increases said fluid acts against said axially extending valving member and urges said axially extending valving member in a direction whereby said outer valving surface means cooperates with said inner annular metering surface means to at least tend to reduce the rate of flow of said fluid between said outer valving surface means and said inner annular metering surface means and to at least tend to axially move said axially extending valving member generally in a direction toward said outlet end, and resilient means operatively connected to said axially extending valving member and resiliently resisting the tendency of said axially extending valving member to move in said direction toward said outlet end, wherein said axially extending valving member comprises a guide-like body portion closely slidably received by said axially extending passage, wherein said guide-like body portion is operatively carried in a manner resulting in said guide-like body portion being situated generally at one axial end of said valving member opposite to said inlet end, and wherein said resilient means operatively acts against said guide-like body portion.

77. A fluid flow metering device, comprising a housing, a fluid flow passage extending through said housing, wherein said fluid flow passage comprises an inlet for the flow thereinto of said fluid, said fluid flow passage comprising an outlet for the discharge therefrom of said fluid, muffler means at said outlet for minimizing undesired sound as said fluid is discharged from said outlet, a filter screen operatively connected to said housing, said filter screen being effective to filter undesired foreign particles from said fluid as said fluid flows to said inlet, a movable piston disposed within said fluid flow passage, a biasing spring resiliently urging said movable piston in a first direction, sealing means forming a generally circumferential seal with said housing, wherein said fluid flow passage comprises an axially extending wall which when viewed in axially transverse cross-section defines a configuration generally circumscribing said movable piston, and further comprising at least one groove formed into said continuous wall and extending longitudinally with said axially extending continuous wall thereby increasing the flow area of said fluid flow passage by the transverse cross-sectional area of said at least one groove.

78. A fluid flow metering device, comprising a housing, axially extending fluid flow passage means extending through said housing, wherein said axially extending fluid flow passage means comprises an inlet for the flow thereinto of said fluid and an outlet for the discharge therefrom of said fluid, an axially extending valving member slidably received by said axially extending fluid flow passage means, wherein said axially extending fluid flow passage means comprises generally inner fluid metering surface means, wherein said axially extending valve member comprises generally outer fluid metering surface means, wherein a variably controlled dimensional flow clearance exists as between said inner fluid metering surface means and said outer fluid metering surface means for the metered flow of said fluid flow therethrough, wherein said fluid flow through said flow passage means is metered in response to the axial positioning of said axially extending valve member in said axially extending fluid flow passage means and consequent positioning of said outer fluid metering surface means relative to said inner fluid metering surface means, wherein said axially extending flow passage means comprises in transverse cross-section an axially extending cylindrical passage wall, wherein said axially extending valve member comprises an axially extending main body portion, wherein said main body portion is slidably received by said axially extending flow passage means, a biasing spring resiliently urging said axially extending valve member in a first direction, wherein said axially extending valve member during flow of said fluid into said inlet through said axially extending fluid flow passage means and out through said outlet experiences thereagainst a pressure differential at least tending to axially move said axially extending valve member in a second direction opposite to said first direction, wherein said axially extending valve member comprises a metering head portion, wherein said metering head portion comprises said outer fluid metering surface means, wherein as said axially extending valve member is first moved by said pressure differential in said second direction said outer fluid metering surface means and said inner fluid metering surface means coact with each other to reduce in magnitude said variably controlled dimensional flow clearance, wherein as said axially extending valve member is further moved by said pressure differential in said second direction said outer fluid metering surface means and said inner fluid metering surface means are axially positioned with respect to each other as to increase the rate of flow of said fluid flow into said inlet, a spring guide for guiding said biasing spring during axial movement of said axially extending valve member, wherein said spring guide serves as a travel abutment for limiting said axial movement of said axially extending valve member in said second direction, and further comprising a muffler having a muffler chamber, wherein said muffler chamber is in communication with said outlet of said axially extending fluid flow passage means, at least one passage formed in said muffler as to communicate between said muffler chamber and an area externally of said muffler, and at least one seal member forming a generally circumferential seal for preventing said fluid flow to bypass said inlet.

79. A fluid flow metering device according to claim 78 wherein said housing comprises a separate generally tubular sleeve, wherein said axially extending fluid flow passage means is formed through said sleeve, further comprising filter screen means secured to said housing as to filter foreign particles from said fluid flow upstream of said inlet, and wherein said filter screen is operatively secured to said housing and maintains said tubular sleeve assembled to said housing.

* * * * *

UNITED STATES PATENT AND TRADEMARK OFFICE
CERTIFICATE OF CORRECTION

PATENT NO. : 5,901,750
DATED : May 11, 1999
INVENTOR(S) : Richard C. Kozinski

It is certified that error appears in the above-identified patent and that said Letters Patent is hereby corrected as shown below:

Column 8, line 41, change the period (.) to a semicolon (;).

Column 22, line 56, between "suffix" and "In" insert ---- "X" ----.

Column 29, line 51, change "121g" to ---- 1212g ----.

Column 36, line 36 (claim 22, line 17, thereof), immediately after "valving" delete the comma (,).

Column 36, line 38 (claim 22, line 19 thereof), immediately after "axially extending" delete the comma (,).

Column 38, line 48 (claim 35, line 7 thereof), immediately after "extending" delete the comma (,).

Column 39, line 54 (claim 37, line 4 thereof), change "situate" to read ---- situated ----.

UNITED STATES PATENT AND TRADEMARK OFFICE
CERTIFICATE OF CORRECTION

PATENT NO. : 5,901,750
DATED : May 11, 1999
INVENTOR(S) : Richard C. Kozinski

It is certified that error appears in the above-identified patent and that said Letters Patent is hereby corrected as shown below:

Column 41, line 46 (claim 42, line 17 thereof), between "valving" and "member" delete the comma (,).

Column 42, line 7 (claim 45, line 11 thereof), delete "sprig" and substitute therefor ---- spring ----.

Column 42, line 36 (claim 49, line 8 thereof), cancel "housings" and substitute therefor ---- housing, ----.

Column 42, line 49 (claim 50, line 1 thereof), cancel "devices" and substitute therefor ---- device, ----.

Signed and Sealed this

Nineteenth Day of October, 1999

Q. TODD DICKINSON

Attest:

Attesting Officer

Acting Commissioner of Patents and Trademarks